United States Patent
Dyer et al.

(10) Patent No.: US 10,410,297 B2
(45) Date of Patent: Sep. 10, 2019

(54) DEVICES, SYSTEMS, AND METHODS OF ACTIVITY-BASED MONITORING AND INCENTIVIZATION

(71) Applicant: PJS of Texas Inc., Austin, TX (US)

(72) Inventors: Don Dyer, Austin, TX (US); Travis Dyer, Austin, TX (US); Rex Gore, Austin, TX (US); Andrew Graham, Cedar Park, TX (US)

(73) Assignee: PJS of Texas Inc., Austin, TX (US)

( * ) Notice: Subject to any disclaimer, the term of this patent is extended or adjusted under 35 U.S.C. 154(b) by 0 days.

(21) Appl. No.: 15/471,552

(22) Filed: Mar. 28, 2017

(65) Prior Publication Data

US 2017/0301039 A1    Oct. 19, 2017

Related U.S. Application Data

(63) Continuation-in-part of application No. 14/930,342, filed on Nov. 2, 2015.

(Continued)

(51) Int. Cl.
| | |
|---|---|
| *G06Q 50/00* | (2012.01) |
| *G06F 1/16* | (2006.01) |
| *G06Q 10/06* | (2012.01) |
| *H04M 1/00* | (2006.01) |
| *G06Q 10/10* | (2012.01) |

(Continued)

(52) U.S. Cl.
CPC ........... *G06Q 50/01* (2013.01); *G06F 1/1626* (2013.01); *G06F 1/1632* (2013.01); *G06F 1/1694* (2013.01); *G06Q 10/06398* (2013.01); *G06Q 10/063114* (2013.01); *H04M 1/00* (2013.01); *G06Q 10/105* (2013.01);

(Continued)

(58) Field of Classification Search
CPC ........... G06Q 50/01; G06Q 10/063114; G06Q 10/06398; G07C 9/00571; G07C 9/00896
USPC .............................................. 340/5.1, 539.11
See application file for complete search history.

(56) References Cited

U.S. PATENT DOCUMENTS

| | | | |
|---|---|---|---|
| 5,960,085 A * | 9/1999 | de la Huerga ........ | A61J 1/1437 340/5.61 |
| 7,216,802 B1 * | 5/2007 | De La Huerga .... | G06F 19/3462 235/380 |

(Continued)

OTHER PUBLICATIONS

PCT/US15/58636, International Search Report and Written Opinion, dated Feb. 26, 2016, 7 pages.

(Continued)

*Primary Examiner* — Eric Blount
(74) *Attorney, Agent, or Firm* — Brian F. Russell; Russell Ng PLLC

(57) ABSTRACT

In some embodiments, a system may include a communication badge device including a communication device. The communication device can include a touchscreen interface and at least one sensor configured to generate a signal related to an orientation of the communication badge device. The communication device may further include a processor coupled to the touchscreen interface and the at least one sensor. The processor may be configured to determine a first mode and a second mode based on the orientation. The processor can be further configured to provide name tag data to the touchscreen interface in the first mode and to provide a user interface to the touchscreen interface in the second mode.

19 Claims, 55 Drawing Sheets

Related U.S. Application Data

(60) Provisional application No. 62/401,075, filed on Sep. 28, 2016, provisional application No. 62/074,528, filed on Nov. 3, 2014.

(51) Int. Cl.
*G06Q 30/00* (2012.01)
*H04W 4/02* (2018.01)

(52) U.S. Cl.
CPC ....... *G06Q 10/1097* (2013.01); *G06Q 30/016* (2013.01); *H04W 4/026* (2013.01)

(56) References Cited

U.S. PATENT DOCUMENTS

| | | | |
|---|---|---|---|
| 7,392,944 B2* | 7/2008 | Shieh | G06Q 10/02 340/5.21 |
| 8,284,024 B2* | 10/2012 | Toleti | G06F 21/32 340/5.8 |
| 9,391,782 B1* | 7/2016 | Mironenko | H04L 9/3247 |
| 2004/0114779 A1* | 6/2004 | Blazey | G07C 9/00007 382/100 |
| 2004/0176131 A1* | 9/2004 | Hilerio | H04M 1/275 455/556.1 |
| 2007/0135264 A1 | 6/2007 | Rosenberg | |
| 2007/0279852 A1 | 12/2007 | Daniel et al. | |
| 2008/0309508 A1* | 12/2008 | Harmon | G06F 1/1626 340/686.1 |
| 2009/0070797 A1 | 3/2009 | Ramaswamy et al. | |
| 2009/0174633 A1* | 7/2009 | Kumhyr | G09F 3/0294 345/82 |
| 2010/0241465 A1 | 9/2010 | Amigo et al. | |
| 2011/0208648 A1 | 8/2011 | Alothaimeen | |
| 2011/0215911 A1 | 9/2011 | Cassels et al. | |
| 2013/0176142 A1 | 7/2013 | Drysdale et al. | |
| 2013/0290427 A1 | 10/2013 | Proud | |
| 2014/0074265 A1 | 3/2014 | Arginsky et al. | |
| 2014/0114699 A1 | 4/2014 | Amigo et al. | |
| 2014/0232632 A1* | 8/2014 | Hodges | G06F 3/017 345/156 |
| 2014/0249891 A1 | 9/2014 | Olguin et al. | |
| 2014/0266590 A1* | 9/2014 | Guillaud | G07C 9/00111 340/5.65 |
| 2014/0270375 A1 | 9/2014 | Canavan et al. | |
| 2014/0278219 A1 | 9/2014 | Canavan et al. | |
| 2014/0327545 A1* | 11/2014 | Bolling | G08B 21/245 340/573.1 |

OTHER PUBLICATIONS

European Patent Office, European Search Report, PCT/US2015058636, dated Feb. 21, 2018, 9 pages.

\* cited by examiner

3100

3200

Sally J.
Manager

Edit Account — Logout

| Home | Schedule | Missions Wizard | Achievements Wizard | Messages | Employees |

[Table View ▼]  [Schedule Wizard]                          [Edit Schedule]

| Date | Job Name | Employee # | Employee Name | Start Time | Stop Time | Role |
|---|---|---|---|---|---|---|
| 9/28/2015 | Plaza | 40086 | Julia | 7:45am | 3:00pm | Electronics |
| 9/28/2015 | Plaza | 47532 | Hugo | 7:45am | 3:00pm | Hardware |
| 9/28/2015 | Plaza | 48009 | Juan | 7:45am | 3:00pm | Cashier |
| 9/28/2015 | Plaza | 51548 | Alfonso | 7:45am | 3:00pm | Cashier |
| 9/28/2015 | Plaza | 50666 | Jennifer | 7:30am | 3:30pm | Manager |
| 9/28/2015 | Plaza | 51547 | Sergio | 7:45am | 3:00pm | Men's Clot |
| 9/28/2015 | Plaza | 52164 | Dolores | 7:45am | 3:00pm | Women's C |
| 9/28/2015 | Plaza | 45527 | Leonardo | 7:45am | 3:00pm | Sporting G |
| 9/28/2015 | Plaza | 48018 | Antonio | 2:30pm | 8:30pm | Manager |
| 9/28/2015 | Plaza | 47485 | Juana | 2:45pm | 8:00pm | Electronics |
| 9/28/2015 | Plaza | 51525 | Tomasa | 2:45pm | 8:00pm | Hardware |
| 9/25/2015 | Plaza | 51623 | Rosa | 2:45pm | 8:00pm | Cashier |
| 9/25/2015 | Plaza | 48009 | Juan | 2:45pm | 8:00pm | Cashier |
| 9/25/2015 | Plaza | 51548 | Alfonso | 2:45pm | 8:00pm | Men's Clot |
| 9/25/2015 | Plaza | 47532 | Hugo | 2:45pm | 8:00pm | Sporting G |
| 9/25/2015 | Plaza | 40086 | Julia | 2:45pm | 8:00pm | Women's C |
| 9/25/2015 | Plaza | 51547 | Sergio | 4:45pm | 10:00pm | Stockroom |
| 9/25/2015 | Plaza | 51035 | Ernesto | 4:45pm | 10:00pm | Stockroom |
| 9/25/2015 | Plaza | 48018 | Antonio | 4:45pm | 10:00pm | Stockroom |
| 9/25/2015 | Plaza | 47485 | Juana | 4:45pm | 10:00pm | Stockroom |

DEVICES, SYSTEMS, AND METHODS OF ACTIVITY-BASED MONITORING AND INCENTIVIZATION

CROSS-REFERENCE TO RELATED APPLICATION(S)

This application claims priority to and is a non-provisional of U.S. Provisional Patent Application No. 62/401,075 filed on Sep. 28, 2016 and entitled "Activity Data-Based Decision Systems and Methods," which is incorporated herein by reference in its entirety. Further, this application is a continuation-in-part of and claims priority to U.S. patent application Ser. No. 14/930,342 filed on Nov. 2, 2015 and entitled "Motion Tacking Wearable Element and System," which is a non-provisional of and claims priority to U.S. Provisional Patent Application No. 62/074,528 filed on Nov. 3, 2014 and entitled "Motion Tracking Wearable Element," which is incorporated herein by reference in its entirety.

FIELD

The present disclosure is generally related to devices, systems, and methods of activity-based monitoring and incentivization. More particularly, the present disclosure relates to a multi-function wearable electronic device that can be used to track activity, facilitate communications between employees, to enhance customer service, and to incentivize certain activities by gamifying certain activities. Additionally, the present disclosure relates to a manager interface that facilitates assignment of tasks, scheduling, messaging, and generation and communication of rewards and other incentives to other employees. The present disclosure may also include activity tracking and productivity analysis, which can be used to facilitate managerial decision-making and to identify and reward exemplary employees.

BACKGROUND

An organization may employ various types of systems, such as time-management systems, task or project tracking systems, personnel management systems, accounting systems, other systems, or any combination thereof, to maintain and track resources within the organization. Within service industries, such as janitorial services, maintenance service, construction, retail sales, security, or other service industries, it can be difficult to track and assess performance of their most important resources, namely their employees.

SUMMARY

In some embodiments, a system may include a communication badge device including a communication device. The communication device can include a touchscreen interface and at least one sensor configured to generate a signal related to an orientation of the communication badge device. The communication device may further include a processor coupled to the touchscreen interface and the at least one sensor. The processor may be configured to determine a first mode and a second mode based on the orientation. The processor can be further configured to provide name tag data to the touchscreen interface in the first mode and to provide a user interface including one or more user-selectable options to the touchscreen interface in the second mode.

In other embodiments, a system may include a plurality of communication badge devices. Each communication badge device may include a communication device having a network transceiver, and may include a holding clip configured to secure the communication device to a garment of a user to resemble a badge. Each communication badge device may be configured to display name tag data when in a first orientation and to display a user interface including one or more user-selectable options when in a second orientation. In some embodiments, the system may further include a computing system configured to communicate with the plurality of communication badge devices through a network.

In still other embodiments, a system includes a plurality of communication badge devices. Each communication badge device may include a communication device having a touchscreen interface and at least one sensor configured to generate a signal related to an orientation of the communication badge device. Each communication badge device may further include a processor coupled to the touchscreen interface and the at least one sensor. The processor may be configured to determine a first mode and a second mode based on the orientation determined from data received from the at least one sensor. The processor may also be configured to provide name tag data to the touchscreen interface in the first mode and to provide a user interface to the touchscreen interface in the second mode. The system may further include a human resources system configured to communicate with each of the plurality of communication badge devices to receive data including activity data, progress data, location data, and timing data. The human resources system may be configured to provide a social media portal through which users may selectively share data, communicate, and compete.

BRIEF DESCRIPTION OF THE DRAWINGS

FIG. 32 depicts a table of employee schedule information within an interface of a manager application executing on a computing device, in accordance with certain embodiments of the present disclosure.

FIG. 46 depicts the employee page of the management interface of FIG. 45 including a search feature accessible through a pull-down menu, in accordance with certain embodiments of the present disclosure.

In the following discussion, the same reference numbers are used in the various embodiments to indicate the same or similar elements.

DETAILED DESCRIPTION OF ILLUSTRATIVE EMBODIMENTS

Figure 1:
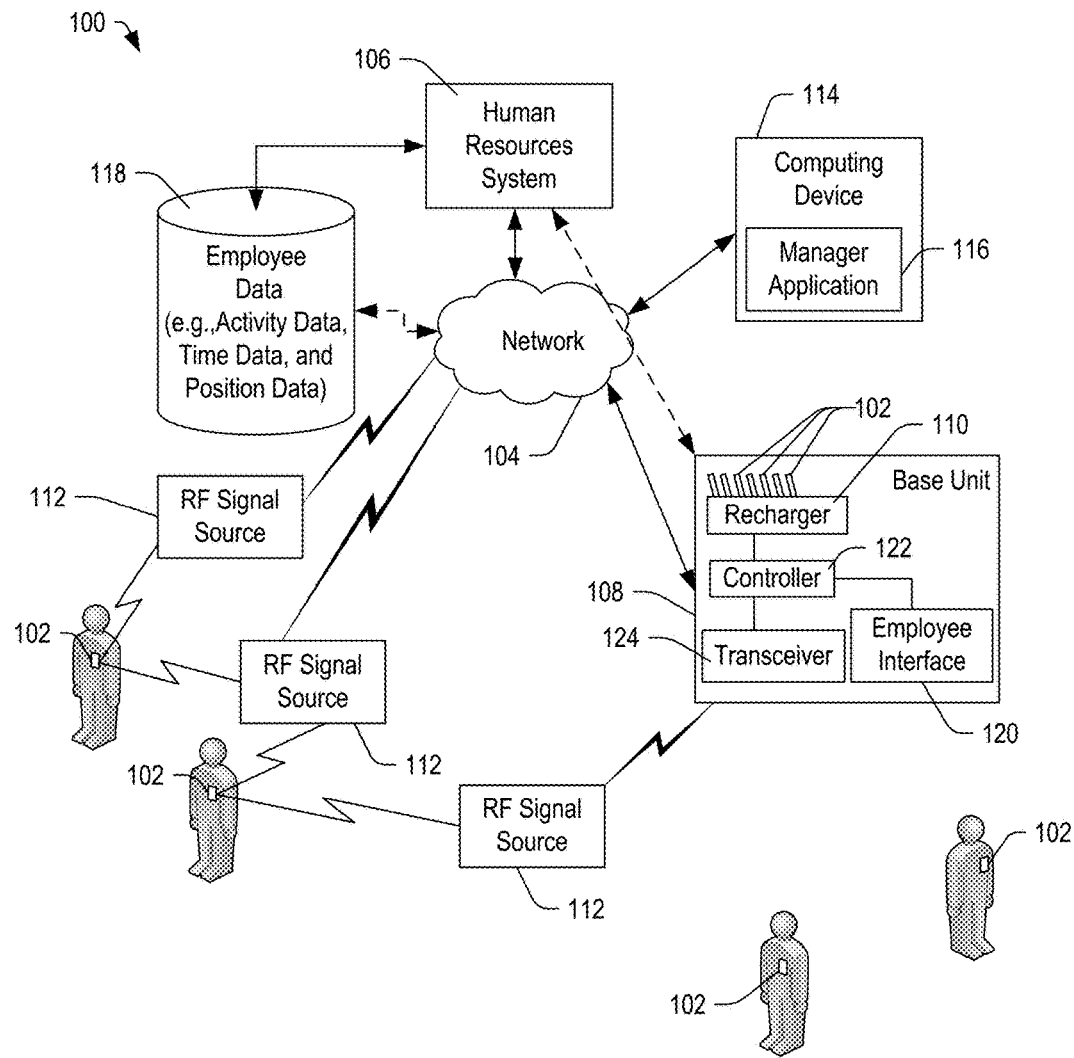
FIG. 1 depicts a block diagram of a system to provide activity-based monitoring and to incentivize certain activities, in accordance with certain embodiments of the present disclosure.

In some embodiments described below, an employee identification device may serve multiple purposes, including name tag functionality, authentication functionality to provide access secure areas of a building, communication functionality to facilitate text and optionally audio communication between employees and between employees and managers, and so on. In some embodiments, the employee identification device may also facilitate progress monitoring with respect to pre-determined achievement metrics as well as intra-personnel competition in order to incentivize hard work, customer service, training, and various other aspects of a job.

In some embodiments, the system may be configured to host a social networking interface through which employees may communicate with one another, customize their user profiles, review progress toward various achievements, provide positive feedback for other employees, send messages, and so on. In a particular example, an employee may also redeem rewards, connect with other employees, compete with other employees, and so on, using the system. Activities performed during shifts at work may be tracked by the employee identification device, and the data may be used to update the employee information on the social network interface. For example, when an employee performs five customer service tasks, he or she may earn a number of customer service points. When the accumulated points for the particular employee exceed a threshold, he or she may be awarded an achievement or another reward. The experience points earned by the employee may be part of an enterprise competition, and the employee may be ranked on a leaderboard of employees based on the earned experience points for each month.

In some examples, the employee's performance may be ranked against other similarly-situated employees, so that a department manager's performance may be compared to that of other department managers. Similarly, a cashier's performance may be ranked against that of other cashiers. In large enterprises, such as a retail chain, employee performance may be compared against equivalent roles across multiple stores. Other embodiments are also possible.

In certain embodiments, the performance of various tasks (timing, number of events, and so on) may be quantified through experience points. By earning experience points, the employee may earn rewards, advance in terms of seniority, and so on. By turning the earning of experience points into a friendly competition, overall performance (across a wide range of activities) can be enhanced by incentivizing the friendly competition.

In some embodiments, a system may include a communication badge device (e.g., the multipurpose employee identification device), a base unit, a human resources system, and one or more computing devices, which may be configured to communicate with one another through a network to determine information and to facilitate communications. The communication badge device may include a communications device and a holder configured to secure the communications device to a garment associated with an employee. The communication badge device may be configured to track and record employee activities during a work shift, receive and send messages to the human resources system, the base unit, the computing device, other communication badge devices, or any combination thereof. Further, the communication badge device may facilitate gamification of various activities, such as service activities, training activities, and so on.

The communication badge device may be distributed to the employee by a base unit that is configured to identify the employee, determine a start time of the employee's work shift, and distribute the communication badge device to the employee at the start of his or her shift. The base unit may also receive the communication badge device at the end of the employee's shift, identify the employee, and determine the end time of the employee's shift. The base unit may be configured to clean the wearable badge, to recharge the communications device, to download data to and from the communications device, to provide an interface through which the employee may log in, interact with a graphical interface to the system, log out, and so on.

The human resources system may include one or more computing devices configured to manage the employee shift schedules, provide and manage training information, track employee successes, determine other information, and perform a variety of other operations. In some examples, the communication badge device may be configured to communicate with other communication badge devices, and with computing devices as well as the base unit, such as via wireless communication links.

In some embodiments, a computing device (such as a tablet computer, a laptop computer, a smartphone, or another computing device) may be used by an employee to access a graphical interface including data associated with the employee and including data related to a leaderboard depicting the employee's rank relative to other similarly situated employees within the organization. In some examples, the employee may access the system via the Internet using his or her computing device.

Further, in some embodiments, a computing device (such as a tablet computer, a laptop computer, a smartphone, or another computing device) may be used by a manager to access a graphical interface including data associated with the plurality of employees, shift data, data related to a leaderboard depicting employee successes, and other information. Further, the graphical interface may include one or more user-selectable elements accessible by a manager to configure tasks, missions, achievements, schedules, other features, or any combination thereof, which may be performed by one or more employees. Further, the graphical interface may include a selectable element accessible by a user to send a message, a congratulatory note, a reminder, or another type of message to a particular employee, to a group of employees, or to all employees. In an example, a manager may utilize the computing device to assign a task to an employee.

In certain embodiments, the communication badge device may include a badge including a communication device, a wrist band, a watch, a pin, or another item or article of clothing or accessory designed to be worn by an employee. The communication badge device may be configured to capture activity data, including motion data, position data, and time data and to communicate the activity data to the data analysis system, continuously, periodically, or during recharge.

In some embodiments, the communication badge device may be implemented as a smart badge or that includes circuitry, such as a microprocessor and one or more transceivers configured to communicate with other communication badge devices, computing devices, the human resources system, the base unit, or any combination thereof. In certain embodiments, the transceiver may communicate via a wireless communication link, such as a short-range wireless signal (e.g., Bluetooth®), a local area wireless network signal (e.g., IEEE 802.11x), a cellular, digital or satellite signal, or any combination thereof. In other embodiments, the transceiver may communicate via a wired connection, an inductive link, optically, or through another physical or wireless communication link. In come embodiments, the communication badge device may also include a radio frequency identifier (RFID) circuit configured to communicate with a card reader to determine access to restricted areas of a building. In any of the above wireless communication embodiments, the wireless signals may also be used to determine a physical location of the communication badge.

In some embodiments, the data collected by the communication badge device may be processed to determine detailed motion and intensity data, position data (within a facility), audio signal processing data to determine audio interactions, time and attendance data, rest or inactivity data, location data, and other data. The data may be processed by a processor within the communication badge device, the human resources system, the base unit, the computing device, or any combination thereof.

In some embodiments, the system can make excellence visible through objective measurement metrics, providing a number of advantages over traditional subjective criteria. For example, by providing measured data of activity, hard-working employees can be identified, and inefficiencies in employee resource allocations can also be determined. The objective measures make it easier for hard work to be detected, quantified, and rewarded. Further, the system can encourage improvements in morale and performance by providing a consistent and visible standard of effort. Such objective metrics can lead to improvements in employee retention and engagement as well as better customer service and improved employee interactions.

As used herein, "activity data" may include time, motion, movement intensity, location (position), orientation data, audio data, other data, or any combination thereof. In some embodiments, the activity data may be related to a mission (customer service, training, and so on), a task, a customer service request, another activity, or any combination thereof.

In some embodiments, the wearable element may include heart rate, temperature, motion sensors, orientation sensors, other sensors or monitors, or any combination thereof, which measurement data can be included in the activity data. In certain embodiments, activity data may be analyzed to determine particular movements and may be correlated in time and space (and optionally in response to user input) to determine a particular action. The system may process the activity data to determine time and attendance, detailed motion and intensity data, fine grain position data, rest and inactivity data, other data, or any combination thereof. While such technology can be applicable to any type of movement or activity (e.g., exercise, rehabilitation, team sports, etc.), specific examples are given herein that discuss using such technology to allow an employer to determine activity data for employees. Such data may be used to objectively determine hard working employees, to assist management in making payroll and advancement decisions to reward hard work, to assist management in reallocating employee resources based on activity patterns, and so on.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. In some embodiments, features of the various embodiments and examples herein can be combined, exchanged, or removed without departing from the scope of the present disclosure.

In some embodiments, at least some of the functionality may be implemented as one or more software programs running on a processor or controller, which may be included within the employee badge, included within a base station configured to recharge and communicate with the employee badge, included within a computing system communicatively coupled to the base station to the employee badge, or any combination thereof. Dedicated hardware implementations (such as the wearable badge, a base station, or another electronic hardware device) including, but not limited to, application specific integrated circuits, programmable logic arrays, and other hardware devices can likewise be constructed to implement the methods and functions described herein. Further, in certain embodiments, at least some of the methods described herein may be implemented via a device, such as a computer readable storage device or memory device, including instructions that when executed cause a processor to perform the methods. The computer readable storage device or memory device may include an optical disk, a hard disc drive, a flash memory device, a read-only memory (ROM) device, a cache memory device, another physical memory apparatus, or any combination thereof.

FIG. 1 depicts a block diagram of a system 100 configured to provide activity-based monitoring and to incentivize certain activities, in accordance with certain embodiments of the present disclosure. The system 100 may include a plurality of communication badge devices 102. Each communication badge device 102 may include a communications device and a badge configured to secure the communications device to a garment of an employee. Each communication badge device 102 may be configured to communicate with one or more other devices through a network 104. The communication badge device 102 can communicate through the network 104 with other wearable devices 102, a human resources (HR) system 106, a base unit 108, one or more radio frequency (RF) signal sources 112, a computing device 114, or any combination thereof. The HR system 106 can be coupled to employee data 118, either directly or through the network 104. The employee data 118 may be a database configured to include activity data, location data, signal strength data, timing data, schedule data, mission data, achievement data, messages, images, audio data, other data, or any combination thereof.

The HR system 106 may communicate with the base unit 108 directly or through the network 104. The base unit 108 may be configured to receive, recharge, and dispense one or more communication badge devices 102. The base unit 108 may include a recharger 110, such as an inductive recharger, configured to recharge a battery of the communications device of the communication badge devices 102. Further, the base unit 108 may include a controller 122 configured to retrieve data from and provide data to the communication badge devices 102 during recharge and optionally to communicate data to the HR system 106, the computing device 114, other communication badge devices 102, or any combination thereof via one or more transceivers 124. The controller 122 may be configured to provide a graphical user interface to an employee interface 120, which may include a display and an input interface or a touchscreen. In some embodiments, the controller 122 may include a processor and a memory configured to store instructions that may be executed by the processor. Further, the controller 122 may be configured to control operation of the badge dispenser to receive, clean, recharge, and dispense the wearable device 102 to an employee for use.

In some embodiments, the base unit 108 may include a camera configured to capture an image associated with a user when he or she checks in or checks out (such as when he or she removes or returns a communication badge device 102 from or to a docking feature of the base unit 108). In some embodiments, the base unit 108 may include a biometric sensor configured to capture biometric data associated with an employee and to log in, authenticate, and dispense badges in response to a biometric match with biometric data included in employee data 118. In a particular example, the biometric data and image data may be used for authentication. Other embodiments are also possible.

In certain embodiments, the base unit 108 may communicate the data to and receive data from the HR system 106. The base unit 108 may be located at a building or job site where the employee is working. In other embodiments, the base unit 108 may be located at an employer's headquarters, and the employees may check in and check out at the headquarters at the beginning and the end of the shift, respectively. Other embodiments are also possible. The data received from the HR system 106 may include employee instructions, software or application instructions (e.g., upgrades, new software, and so on), other information, or any combination thereof.

Further, the one or more transceivers of the communication badge device 102 may include a wireless transceiver, a radio frequency identifier, or other wireless signaling element, which may communicate with one or more transceivers, such as radio frequency (RF) signal sources 112, to receive signals and optionally to transmit data. In some embodiments, the RF signal sources 112 may include wireless access points through which the communications badge device 102 may communicate with another device (such as another communications badge 102, the HR system 106, the base unit 108, the computing device 114, another device, or any combination thereof) via the network 104. In other embodiments, the RF signal sources 112 may be radio frequency identification (RFID) beacons that provide a wireless signal that can be detected by the transceiver of the communication badge device 102 to determine a relative distance between the communication badge device 102 and the transceiver (such as based on a received signals strength), from which the relative position (or physical location) of the communication badge device 102 can be determined. In some embodiments, the communication badge device 102 may include a Bluetooth® transceiver, which may be configured to receive and monitor Bluetooth® protocol signals.

In certain embodiments, each communication badge device 102 may include a communications device and a badge or holder configured to couple to the communications device and to secure the communications device to a garment worn by an employee. Each communication badge device 102 may include one or more transceivers, one or more magnetometers, one or more accelerometers, one or more gyroscopes (e.g., tri-axial gyroscopes), an altimeter, a microphone, one or more other sensors, or any combination thereof to capture sensor data corresponding to actions, movements, and interactions (activity data) of the employee. In some embodiments, the communication badge device 102 may include one or more other sensors, such as heart rate monitors, temperature sensors, moisture sensors, and so on, depending on the implementation. Each communication badge device 102 may be configured to collect and store activity data, including motion data, motion intensity data, position or location data, audio data, environment data, other data, or any combination thereof. In certain embodiments, the activity data may be correlated to time data from a clock (internal to the communication badge device 102, derived from a wireless radio frequency (RF) signal from a RF signal source 112, or determined from another signal or source). Further, the activity data may be correlated to position data derived from a global positioning satellite (GPS) signal, based on signal strength of multiple beacon signals (triangulation), from electronic door lock information, from Bluetooth® signals, from another source, or from any combination thereof.

Further, the communication badge devices 102 may include one or more transceivers configured to communicate with one or more other devices in real-time via the network 104. Such devices can include other communication badge devices 102, the HR system 106, the base unit 108, one or more computing devices 114, or any combination thereof. In an example, the communication badge devices 102 may communicate sensor data, event information (including an event identifier), messages, activity data, or any combination thereof.

In some embodiments, the computing device 114 may include a processor and a memory (such as a hard disk drive, a flash drive, or other non-volatile memory device) accessible to the processor. The computing device 114 may also include one or more transceivers configured to communicate with other devices through the network 104. The memory may store instructions that, when executed, may cause the processor of the computing device 114 to execute a manager application 116. The manager application 116 may be configured to provide a graphical interface including data and user-selectable elements (such as buttons, tabs, pull-down menus, selectable links, images, or other features). A user may interact with the graphical interface provided by the manager application 116 by interacting with a touchscreen interface, a keypad, or another input interface in order to set or review employee schedules, review employee performance data, send and receive individual or group messages, and so on. In some embodiments, a user may interact with the graphical interface to assign tasks to particular employees, to respond to requests, to review customer feedback, to award achievements to a selected employee or group of employees, to perform a variety of tasks, or any combination thereof.

In an alternative embodiment, the manager application 116 may be implemented as a web page interface or an application interface that provides different options based on authentication information presented by the user. In this alternative embodiment, an employee may access the application 116, and the application interface may present information related to the particular employee and may include a leaderboard showing the employee's ranking relative to other employees. Further, a manager may access the application 116, and the application interface may present information related to the manager and to employees that are under the manager's supervision.

In one possible embodiment, the activity data may be processed to determine work score statistics for each employee. Such work score statistics may include attendance (made versus missed shifts percentage), on time percentage (percentage of shifts for which the employee clocked in on time), activity percentage (percentage of time during the shift for which activity was recorded, indicating a level of effort), and rest minutes (measured or manually reported). The data may be aggregated, averaged, or otherwise processed to produce a work score (according to a pre-determined formula), which may be used by management to provide feedback, to encourage employees who are doing well, to request information for missed shifts, and so on. In certain embodiments, the term "activity intensity" may refer to a percentage of activity or movement time relative to a total time. Other measurements of the activity intensity may also be used.

In some embodiments, the communications badge device 102 may be configured to display an employee name and other information in a first mode, which may be determined automatically from a first orientation of a display of the communications device. For example, when a display of the device 102 is facing outward (away) from the employee, the display of the device 102 may present the employee's name and other information. The communications badge device 102 may be configured to display other information and one or more user-selectable elements in a second mode, which may be determined automatically from a second orientation of the display of the communications device. For example, when the display of the device 102 is turned toward the employee, the display of the device 102 may present messages, notifications, tasks, assignments, timing information, other information, or any combination thereof. Further, the display may present one or more user-selectable elements (such as by presenting the data in conjunction with a user-selectable link or button). In this second mode, the orientation of the displayed information may be altered to present the information to the user. Other embodiments are also possible.

In some embodiments, the communication badge device 102 may operate as a multi-function device that serves as a wearable name tag in a first mode and that can provide real-time missions, messaging, and achievement acknowledgment in the second mode. The communication badge device 102 may include a touchscreen display that can double as a name tag and as a user interface for the employee. In a first orientation (first mode), the communication badge device 102 may display the employee's name, title/department, experience level (experience points), badge icon (trophy or achievement indicator), and a notification icon (if there are pending, unread alerts, such as messages, missions, customer service requests, and so on). The content of the information displayed on the communication badge device 102 and its orientation may change into an interactive user interface when the communication badge device 102 is tilted, turned or flipped toward the wearer's face (away or upside down relative to another person).

An employee may interact with the user interface to review and select missions (assume responsibility for a particular mission), starting and pausing missions, and so on. In some embodiments, the communication badge device 102 may include motion sensors that can produce electrical signals in response to movements by the employee. The communication badge device 102 may include user-selectable options to enable the employee to provide user-initiated start and stop times of various missions and tasks to mark/label the motion data sets for subsequent analysis. Moreover, by tagging the beginning and ending of particular activities, the real-time processing of motion data is simplified because the motion data is pre-categorized according to the expected motion activity associated with the particular mission.

In some embodiments, the communication badge device 102 may be configured to provide a simple messaging system for receiving short messages from a manager or supervisor, or optionally from an artificial intelligence (AI) engine. In some embodiments, the communication badge device 102 may be configured to provide notifications of completed achievements by other employees in a social "friend" group associated with the employee. In some embodiments, the communication badge device 102 may be configured to provide bi-directional communication, such as by allowing an employee to respond to an "Achievement" notice related to one of his or her friends by sending a "Like", an "Applause", or another form of congratulations or acknowledgement through the message viewer. Further, the communication badge device 102 may be configured to display a progress indicator to indicate the employee's progress toward completion of a particular mission, task, achievement, or other experience threshold.

In some embodiments, an employee may interact with the communication badge device 102 to assume responsibility for a task, to respond to a customer service request, to view messages and other notifications, and so on. In a particular embodiment, the employee may interact with the communication badge device 102 to gain experience points, the accumulation of which may result in an award, a recognition of an achievement, and so on. In some examples, missions, achievements, awards, and other recognitions may be used to incentivize selected behaviors, such as by awarding points or other recognitions to a user for performing certain tasks, completing certain missions, and so on. For example, a mission may include assisting five customers during a work shift. By successfully assisting five customers, the user may earn a number of experience points. In certain embodiments, missions may be associated with various core categories or principles, such as mastery and skills development, productivity and efficiency development, service and connection development, and consistency and reliability development. The user may earn points toward one or more categories by completing a mission.

In some embodiments, a mission may be a work task or series of tasks to be performed by an employee. Each mission may have a pre-determined number of associated experience points, such that completion of the mission earns experience points for the employee. Missions may be recurring (scheduled missions that are repeated at a recurring interval), priority missions, and so on. In an example, a recurring mission might include rounding up shopping carts every day at 4:00 pm or checking each door after locking up, and so on. Other recurring missions are also possible. Recurring missions may be configured to recur for individual employees, for teams, departments, groups, or any combination thereof.

A priority mission may be a task or sequence of tasks that are dispatched by a manager, an associate, or a customer (or optionally by an AI engine). Priority missions may be sent to the communication badge devices 102 on an "as needed" basis with a priority level that determines a distribution tactic. In an example, a message defining a priority mission may be sent to a plurality of communication badge devices, where the message is set with a priority level selected to alert users of the timeliness required (e.g., low, medium, or high). Priority missions may be created and sent using a manager application 116 executing on the computing device 114.

In some embodiments, experience level points (EXP Points) may be earned with each completed mission and with each achievement. Further, experience points may be earned by completing tasks, by assisting customers, and so on. Over time, an employee or associate can gain experience points to increase his or her overall experience level. The experience level may begin at one (1) and may be accrued or earned through successful completion of missions and achievements. Depending on the implementation, experience points may be used to determine scheduling priorities, bonuses, awards, promotion, and other employment options. To move from one experience level to a next level, a pre-determined threshold number of experience points may be required, and the number of experience points needed to move to each subsequent level of achievement may vary. In some embodiments, the number of experience points may be specified at the time when the mission, task, or achievement is created within the system 100.

In some embodiments, an achievement may be made up of a series of completed missions or tasks. Achievements can have three levels, where level one is the easiest and it has a lesser requirement of completed activities or tasks to achieve, while the second and third levels within a particular achievement may have higher requirements. Stars, badges, or other visual indicators can be displayed and earned for completion of each achievement. Generally, achievements may follow the same core principles as missions. The user may earn experience points by completing an achievement.

Stars may be used as an alternate but parallel metric relative to experience points and experience levels. Stars can be earned by completing achievements. With the completion of level one of an achievement, a star may be awarded. Similarly, completion of levels two and three within an achievement may result in awarding of a star. Each achievement may have six possible stars to be earned and added to the employee's overall star count, which can be displayed on the employee's profile. In some embodiments, an achievement may represent successful completion of a plurality of missions, tasks, or any combination thereof.

Visual indicators, such as badges, trophies, medals, and other small icons can be displayed in an employee profile and on the touchscreen display of the communication badge device. Such indicators may be earned for completing each level (task or sequence of tasks, mission or sequence of missions, and so on) of an achievement track, and the icons may become larger and more ornate with each completed achievement.

Further, certain special indicators can be earned outside of the "Achievements" track. Such special indicators can be rare, in part, because the requirements for earning such special indicators may not be known to the employee or associate. The employee or associate may only learn the description of what it takes to earn the special indicator after it has been earned. In an example, a special indicator may be awarded for the fastest average response time to missions over a period of time, such as one month, three months, six months, and so on. Another special indicator could be awarded for the most missions completed over a period of time, such as one month, three months, six months, and so on. Such special indicators may also have experience points associated with them.

In some embodiments, the HR system 106 can include a graphical interface generator or module that may be accessible as a social media type of website interface through which various employees may interact with one another on their own time. Through this interface, an employee can establish multiple "connections" or "friends". In some embodiments, this social network hosted by the HR system 106 can assist in gamifying the experience of the system 100 for the employee. Part of the overall gamification may include social sharing of data and feedback, such as by presenting a leaderboard to create friendly competition between employees and by providing messaging capabilities to allow employees to communicate with one another. Within an employee portal accessible through the graphical interface, an employee may be able to add ("connect") friends to his or her social group. The employee can "connect" with others and, if the other employee accepts the connection, the interface allows the two "connected" employees to see each other's data and to send messages back and forth. Once the connection is established, the two employees can compete with one another with respect to missions and achievements. Additionally, the connection enables the ability to share feedback with one another. In an example, the employee portal may allow the employee to select a "like" button or link to give "kudos" to his or her friend in response to a notification of the other employee's accomplishment.

In some embodiments, such "likes" may be provided as a simple notification that can be displayed on the touchscreen interface of the communication badge device 102 for real-time instantaneous feedback from anyone in the employee's group. The communication badge device 102 may be configured to receive a message whenever anyone in the employee's group or circle of connections reaches a new experience level, completes a mission or an achievement, earns a new badge or commendation, sends kudos to the employee, or any combination thereof. The employee may interact with his or her communication badge device 102 to "Like" the achievement by another employee, causing the communication badge device 102 to send a notification to the other employee's communication badge device 102 or social media account of the friend or connection. The employee portal may also include a social dashboard with a list of friends.

In some embodiments, a manager may utilize a manager application 116 on the computing device 114 to construct various missions and to establish their relative priorities as well as to configure the number of experience points that can be earned for completion of such missions. Further, in some embodiments, the manager may utilize the manager application 116 to create campaigns, which may include both training missions as well as actual missions. Such campaigns may be designed to assist in meeting a goal of the organization, while at the same time allowing the individual employee to earn experience points. Such campaigns may include a war on shrinkage campaign, a conversion campaign, a safety campaign, a service campaign, and so on. With regard to each campaign, the manager may establish a plurality of roles, including a protagonist, an antagonist, and a supporting cast. Further, the manager may establish a corresponding story line, coordinate a "sting" operation, determine resolution of the operation, review what was learned, and celebrate completion. In general, a campaign may define a priority of the enterprise. Various missions, tasks, and achievements may then be created that fit within or serve the purpose defined by the campaign, so that the tasks performed by the employees are aligned to the priorities of the campaign.

In some embodiments, the base unit 106 may provide a user interface via the employee interface 120. The user interface may be separate from an "Employee Management Portal" that may be accessed by the employee via a computing device 114, such as a smartphone, tablet, laptop, or other computing device via the Internet. The base unit 106 may have different roles and different features depending on who logs in. The "Associate" role may present the employee's profile and allow the employee to see a brief overview of his or her statistics, experience level, stars, badges, and achievements as well as a headshot and optionally an avatar of the employee. The employee interface 120 may display missions (recurring missions as well as selected missions), achievements (completed and in progress), friends (friend profiles, messages, "Likes", and so on), and history (work history and future schedule as well as hours worked).

The "Supervisor" role may cause the employee interface 120 to provide a similar layout to that of the employee. However, the supervisor role may in provide access to added features to which the employee does not have access. For example, the supervisor role may allow access to schedules of multiple employees. Other embodiments are also possible. The "Manager" role may cause the employee interface 120 to provide a similar layout to that of employees or supervisors. However, there may be additional added features.

In some embodiments, the manager application 116 can be web-based. Further, the manager application 116 may be designed to run or be accessed on a tablet computer, such as computing device 114, so that the manager can view and interact with communication badge devices 102 in real-time. The manager application 116 can allow the manager to view a real-time status list of all the users and send messages or missions to individuals or groups of users. In some embodiments, the manager application 116 may display a line-by-line feed of accepted tasks and tasks (or missions) in progress. The feed may include the employee's name and a mission/description as well as timing information, status information, or any combination thereof. The employee's name can be a hyperlink to a subpage that shows the activity for that particular employee. The line-by-line feed can be color coded with employee profile pictures. Further, the line-by-line feed can include the time started and how long the mission has been going on. Further, the line-by-line feed can include achievements as they are completed, and a "Like" button and "Message" button on each line can be provided to promote instant feedback.

In some embodiments, the manager application 116 can include a "Team" tab that the manager can access to create and manage "groups" and departments. The "Team" tab may include "add" and "remove" functionality to allow the addition or removal of names from a group, a naming functionality that can be accessed to name or rename a group and to create sub-groups. Other embodiments are also possible.

In some embodiments, the manager application 116 can include a missions wizard that provides a simple user interface that allows the manager to quickly select some pre-determined missions and customize them as is appropriate for the real-time tasking in a store. In some examples, the mission wizard has an artificial intelligence (AI) engine built into the missions wizard (or configured to facilitate the creation of the missions). The AI engine may be configured to provide recommendations to the manager for who the best fit associated would be for the missions that the manager has created. The AI engine may check employee proximity, associates who are currently in progress with regard to a mission or task, anyone who is in progress of an achievement that would be benefited by completing the mission, and any associates who have not completed a mission in a while and are in need of something to do. Once one or more suitable employee candidates are identified, the AI engine may notify those employees of the mission.

Priority missions may include those missions that need to be sent in the moment for tasks that require immediate attention. Priority missions include quick dispatching of tasks and priority levels of low, medium or high. The AI engine may facilitate quick dispatching. Priority missions can be broadcast to multiple employees simultaneously. Alternatively, the manager application 116 may utilize a waterfall approach where one person at a time may be alerted, providing a brief waiting period before notifying a next employee only if the notified employee has not accepted to mission. Once the waiting period expires, the mission may be removed from the employee's list of missions and the next best candidate is notified. Other embodiments are also possible.

Recurring missions may be similar to a calendar invite that can include setting time intervals and invitees. These missions can be set to recur daily, weekly, monthly, at particular duration intervals, at particular times, or any combination thereof. The recurring missions may be sent to individuals, to groups, and so on. The manager application 116 can include a messages wizard including a simple user interface to send messages to individuals, departments, groups, the entire store, and so on. The messages wizard may include a plurality of standard message templates that can be customized or sent without editing. The AI may make each of the standard messages personalized when sending notices. Further, the messages wizard may provide an option to compose a message from scratch. Other embodiments are also possible.

The system 100 may also include an independent employee portal, which may be accessed by an Internet browser or by an application that can be downloaded and executed on a computing device of the employee. The independent employee portal can include a home portal that allows the employee to review and edit his or her profile. The independent employee portal keeps employees from hogging the base unit 106 at work or from editing their profiles while on the clock. The independent employee portal may resemble the employee interface 120 presented on the base unit 106.

While the system 100 is presented in the context of employee management, it should be appreciated that the system 100 may be configured to use in any environment in which it may be desirable to track and monitor activity of the participants. For example, in physical training context, performance of training activities, schedules, and rest periods may be monitored for peak performance training and coaching purposes. In a sports activity, performance of each athlete can be monitored to quantify effort and to determine other information. In other work environments, work activities may be monitored for safety, efficiency and other purposes. In some embodiments, work activities may be monitored for activity intensity. An example of a system including a communication badge device 102 configured to track and incentivize employee activity is described below with respect to FIG. 2.

Figure 2:
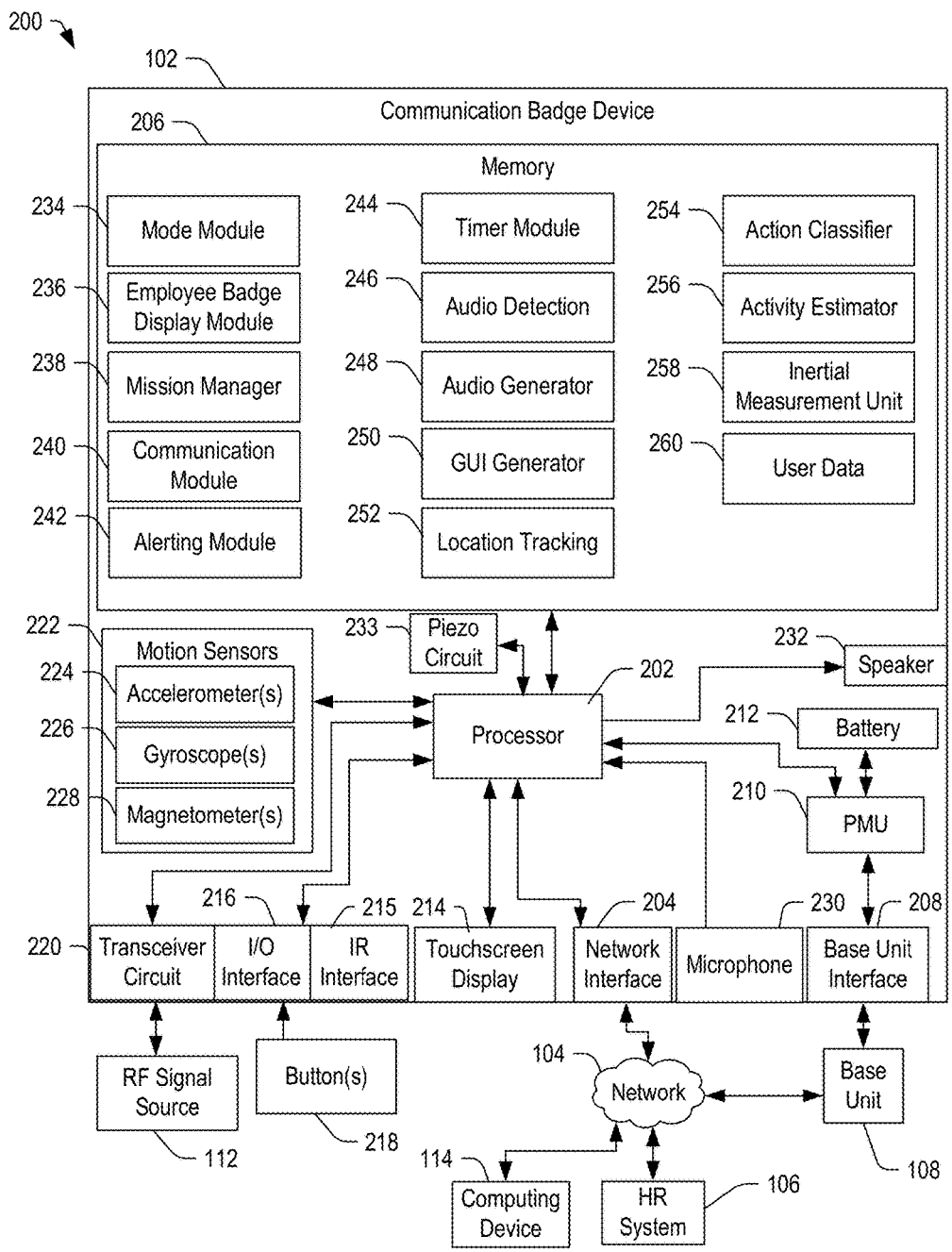
FIG. 2 depicts a block diagram of a system including a communication badge device that can be used to provide activity-based monitoring and to incentivize certain activities, in accordance with certain embodiments of the present disclosure.

FIG. 2 depicts a block diagram of a system 200 including a communication badge device 102 that can be used to provide activity-based monitoring and to incentivize certain activities, in accordance with certain embodiments of the present disclosure. In some embodiments, the communication badge device 102 may be configured to communicate with the HR system 106, the base unit 108, one or more computing devices 114, or any combination thereof, directly or through the network 104. Further, the communication badge device 102 may be coupled to or responsive to one or more buttons 218. Additionally, the communication badge device 102 can communicate with one or more RF signal sources 112. Other embodiments are also possible.

The communication badge device 102 can include a processor 202 coupled to a network 104 through a network interface 204. The processor 202 can be coupled to a memory 206. The processor 202 may be coupled to a base unit interface 208 configured to couple to the base unit 108. In some embodiments, the base unit interface 208 may include a recharge and communications interface. The base unit interface 208 may be coupled to a power management unit 210 that is coupled to a battery 212 and to the processor 202. The processor may also be coupled to a touchscreen display 214, which may be configured to display information, provide user-selectable options, and receive inputs from a user. The processor 202 may also be coupled to an infrared interface 215 configured to detect the presence of a customer, based on infrared data in front of the communication badge device 102. Additionally, the processor 202 may be coupled to one or more input/output (I/O) interfaces 216, at least one of which may be coupled to a button 218, such as an on-off button, a menu button, and so on. The processor 202 may also be coupled to a transceiver circuit 220, which may be configured to communicate wirelessly with one or more RF signal sources 112.

The processor 202 may be coupled to one or more motion sensors 222, such as one or more accelerometers 224, one or more gyroscopes 226, one or more magnetometers 228, other sensors, or any combination thereof. The processor 202 may also be coupled to a microphone 230 and to a speaker 232. In some embodiments, the processor 202 may be coupled to a piezo-electric circuit 233, which may vibrate in response to a control signal from the processor 202 to provide haptic feedback to the employee, such as a vibrational notification of a received message or alert.

The memory 206 may be configured to store data and to store instructions that, when executed, may cause the processor 202 to perform a variety of functions. In an example, the memory 206 may include a mode module 234 that, when executed, may cause the processor 202 to utilize data from the motion sensors 222 to determine an orientation of the communication badge device 102 and to determine an operating mode of the communications badge device 102 based on the orientation. In a first mode, the processor 202 may execute an employee badge display module 236 to display employee badge information, such as the employee's name, job function, and optionally recognition status. In a second mode, the processor 202 may alter the orientation of data displayed on the touchscreen display 214 and may also alter the content presented to the touchscreen display 214, as discussed above. The processor 202 may further include a mission manager 238 that, when executed, may cause the processor 202 to determine an employee's progress with regard to a mission or task accepted by the employee by interacting with the communication badge device 102. In the second mode, the mission status, notifications, other data related to the employee, or any combination thereof may be displayed on the touchscreen display 214.

The memory 206 further includes a communication module 240 that, when executed, may cause the processor 202 to facilitate communications between the employee and one or more other devices, such as via text messages, attachments, other information, and the like. The memory 206 can also include an alerting module 242 that, when executed, may cause the processor 202 to control at least one of the speaker 232 and the piezo-electric circuit 233 to alert the employee. The memory 206 may further include a timer module 244 that, when executed, may cause the processor 202 produce a time stamp that may be correlated to measured data.

The memory 206 can also include an audio detection module 246 that, when executed, may cause the processor 202 to determine audio data from the microphone 230 and optionally to determine information from the audio data. In an example, the audio detection module 246 may be used by the processor 202 to determine when the employee is conversing with a customer or another employee. In some instances, the audio detection module 246 may cause the processor 202 to detect raised voices and may automatically communicate an alert to the computing device 114, the HR system 106, another communication badge device 102, or any combination thereof, using the alerting module 242. The audio detection module 246 may cause the processor 202 to detect interactions with customers. An infrared sensor associated with the IR interface 215 may provide information to the processor 202 to confirm the presence of a person in front of the employee. The optical (IR) confirmation in conjunction with determination of audio tonality points may detect the presence of a customer in front of the associate.

The memory 206 can include an audio generator 248 that, when executed, may cause the processor 202 to generate an audio signal that may cause the speaker 232 to produce an audible sound. The memory 206 may include a graphical user interface (GUI) generator 250 that, when executed, may cause the processor 202 to generate an interface including data and one or more user-selectable elements that may be provided to the touchscreen display 214. The memory 206 can also include a location tracking module 252 that, when executed, may cause the processor 202 to determine a physical location of the communication badge device 102 relative to one or more RF signal sources 112 based, for example, on the received signal strength, global positioning satellite (GPS) data, WIFI location data, Bluetooth® signal data, other signal information, or any combination thereof. Further, the location tracking module 252 may cause the processor 202 to receive and process the location data to determine a physical location of the communication badge device 102.

The memory 206 can also include an action classifier 254 that, when executed, may cause the processor 202 to determine a particular activity or action performed by the employee based on at least one of motion sensor data from one or more of the motion sensors 222, user input data provided by the user, other data, or any combination thereof. In an example, the action classifier 254 may cause the processor 202 to receive an input indicating a start time associated with a task, mission or activity; one or more signals related to movement by the employee; and an input indicating an end time associated with the task. The processor 202 may utilize the action classifier 254 to process the motion signals received between the start and end of the activity, for example, for training purposes. In some embodiments, the action classifier 254 may utilize known motion signature patterns that may be stored in memory 206 to process real-time motion data and compare it to known signatures to determine an event code, which can be sent to at least one of the HR system 106, the computing device 114, the base unit 108, or any combination thereof. In some embodiments, in response to an event code, the HR system 106 can utilize other data sources and sensors like cameras and other things, which can trigger an alert to be sent to managers or to other employees to dispatch employees to a certain section of the store without the need for manual processing.

The memory 206 can also include an activity estimator 256 that, when executed, may cause the processor 202 to estimate the intensity of user activity. Further, the memory 206 can include an inertial measurement unit 258 that, when executed, may cause the processor 202 to evaluate the motion data from the motion sensors 222 to determine roll, pitch and yaw of the communication badge device 102. Further, in some embodiments, data may be collected based on various sensors, time stamps, user information, and other data, and the collected data may be stored as user data 260 in memory 206.

In some embodiments, the communication badge device 102 may be assigned to a particular employee. In a first mode, such as when the employee is wearing the communication badge device 102 and the communication badge device 102 is hanging as a normal name tag type of badge, the communication badge device 102 may display an interface including the employee's name, his assigned role for the particular shift, and possibly one or more icons representing an award, a status level, an achievement, or any combination thereof. When the employee tilts the communication badge device 102 to view the display (touchscreen display 214), in addition to changing the orientation of the display so that the employee can read the display 214, the communication badge device 102 may enter a second mode and may display messages, notifications, tasks, or other information particular to the employee. The communication badge device 102 can enable the employee to track his or her activities, to respond to requests for assistance, to assume responsibility for particular missions or tasks, to request assistance, to send "kudos" or other messages of support, and so on. In some embodiments, the communication badge device 102 can enable the employee to perform a wide range of tasks.

An example of a communication badge device 102 is depicted and described below with respect to FIGS. 10A and 10B. Further, interfaces that may be displayed by the communication badge device 102 are described below with respect to FIGS. 11A-24.

Before discussing the communication badge device 102 in further detail, the base unit 108 is described below with respect to FIGS. 3 and 4, and graphical interfaces that may be displayed on a display interface or touchscreen interface of the base unit 108 are described below with respect to FIGS. 7-9. Additionally, the HR system 106 is described below with respect to FIG. 5; and the computing device 114 is described below with respect to FIG. 6.

Figure 3:
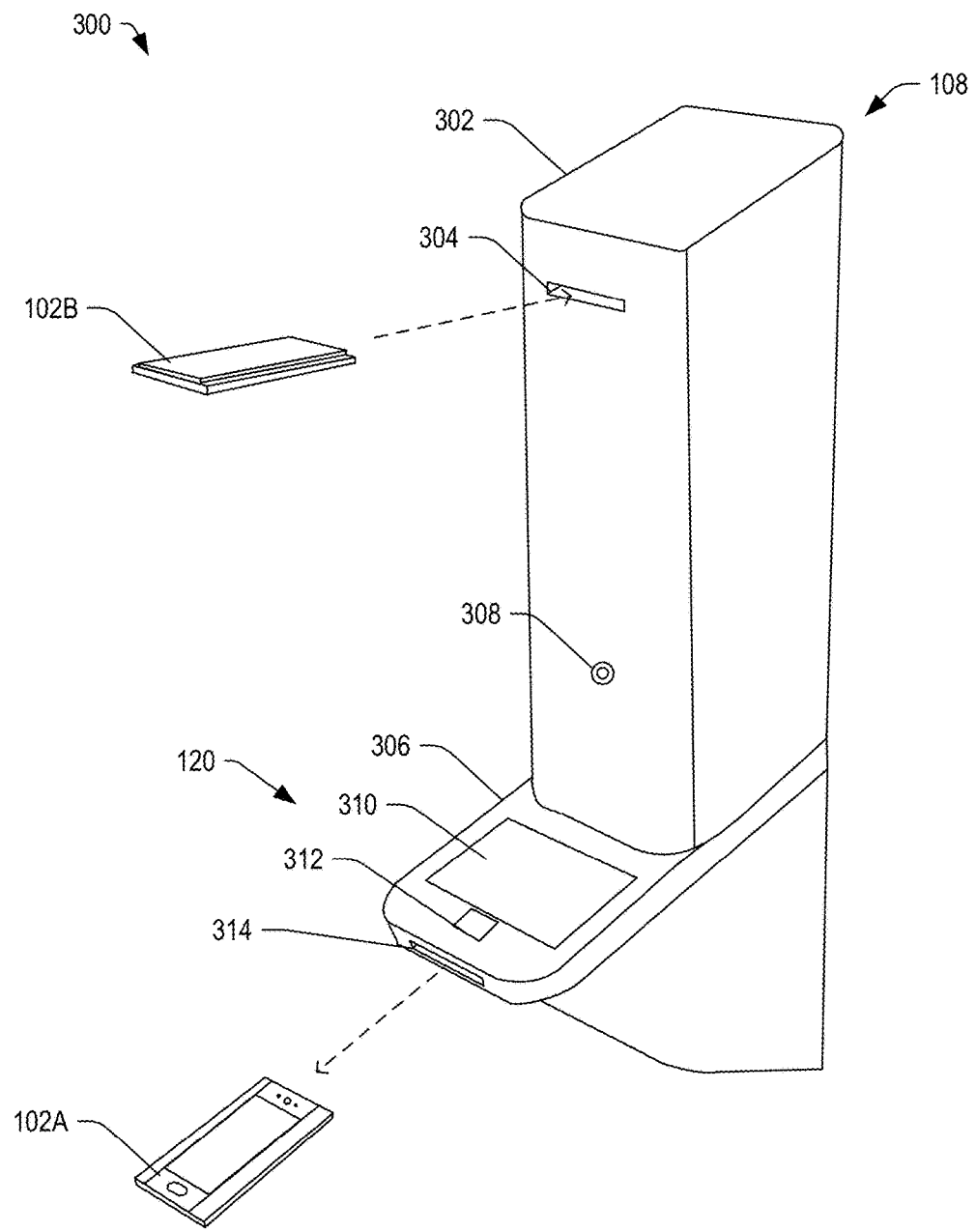
FIG. 3 illustrates an embodiment of a base unit configured to receive, recharge, clean, and dispense communication badge devices, in accordance with certain embodiments of the present disclosure.

Turning now to FIG. 3, a perspective view of a system 300 may include a base unit 108 configured to receive, recharge, clean, and dispense communication badge devices 102, in accordance with certain embodiments of the present disclosure. The base unit 108 may be an embodiment of the base units 108 in FIGS. 1 and 2. Further, the communication badge devices 102A and 102B may be embodiments of the communication badge device 102 in FIGS. 1 and 2.

The base unit 108 may include a housing 302 configured to define an enclosure sized to secure circuitry configured to secure and recharge unassigned communication badge devices 102, to receive employee information, and to receive and dispense communication badge devices 102. The base unit 108 may include a first opening 304 for receiving a communication badge device 102B and a second opening 314 for dispensing a communication badge device 102A. The base unit 108 may further include a table-type surface or ledge 306. In some embodiments, the second opening 314 may be associated with the ledge 106, such as being positioned along an edge of the ledge 306. Further, in some embodiments, the ledge 306 may include an employee interface 120 including a touchscreen 310 and optionally a biometric scanner 312. Further, base unit 108 may include a camera 308.

In an embodiment, a user may access the touchscreen 310 and the biometric scanner 312 to check in. In response to the check in process, the base unit 108 may provide instructions, leaderboard data, and other information to the touchscreen display 310. In some instances, to acquire a communication badge device 102A, the user may need to answer one or more questions via the touchscreen display 310. Once the user is authenticated and any instructions delivered, the base unit 108 may dispense a communication badge device 102A. In some embodiments, the base unit 108 may dispense the communication device, and the user may insert the communications device into a holding clip to form the communications badge device 102A. Alternatively, the base unit 108 may dispense a communication badge device 102A that is already assembled into the holding clip. Other embodiments are also possible.

When the employee is finished with his or her shift, he or she may insert the communication badge device 102 into the first opening 304 (communication device and clip or just the communication device). The base unit 108 may be configured to receive the communication badge device 102B, extract activity data from the communication badge device 102B, logout the user (determine "end of shift" time), clean and recharge the communication badge device 102B, and then store the communication badge device 102B until it is redistributed to another employee. Further, the base unit 108 may communicate the activity data and time information to the HR system 106, in FIGS. 1 and 2. Other embodiments are also possible.

Figure 4:
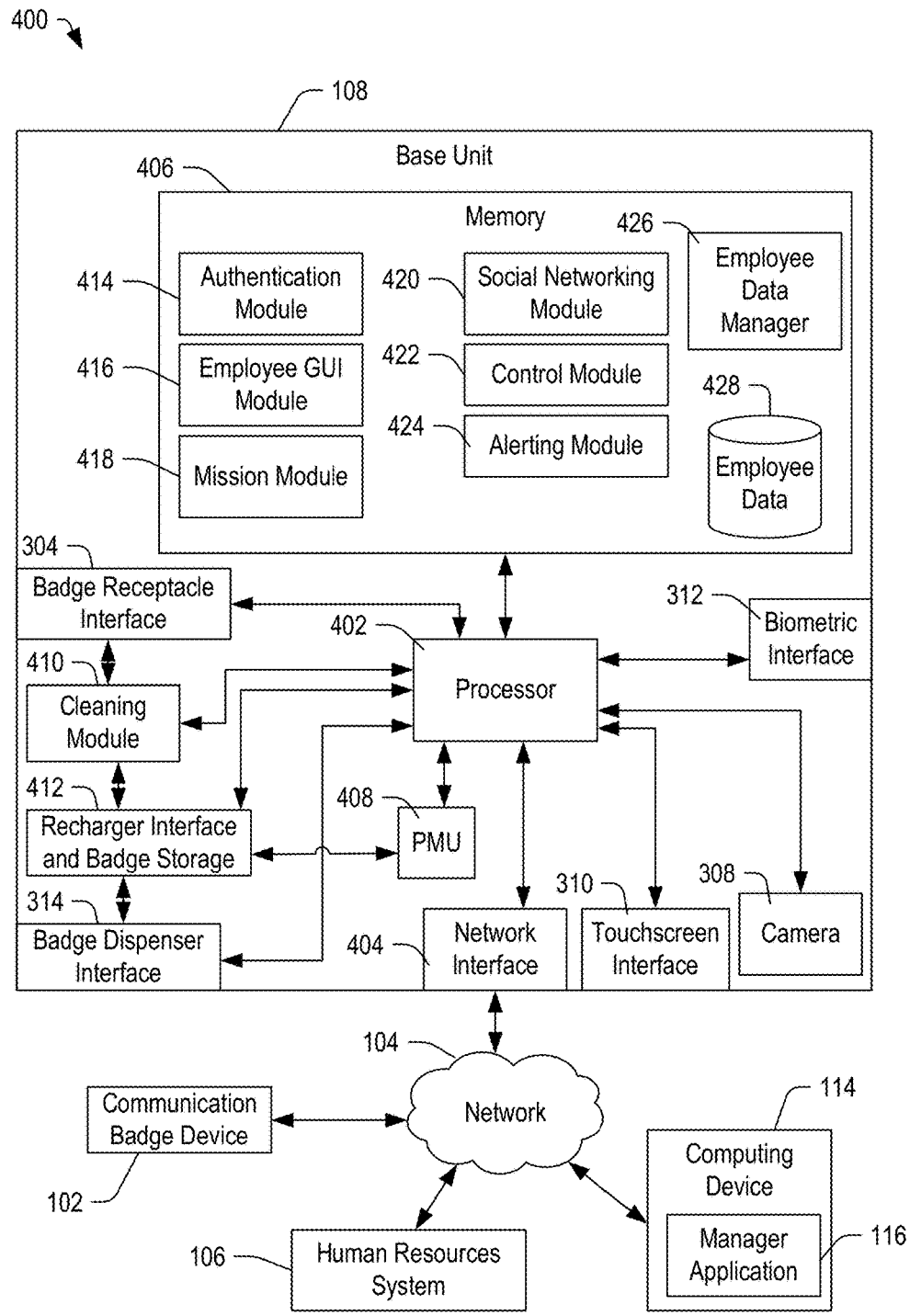
FIG. 4 depicts a block diagram of a system including the base unit of FIG. 3, in accordance with certain embodiments of the present disclosure.

FIG. 4 depicts a block diagram of a system 400 including the base unit 108 of FIGS. 1-3, in accordance with certain embodiments of the present disclosure. The base unit 108 may be configured to communicate with the communication badge device 102, the HR system 106, and the computing device 114 through the network 104.

In some embodiments, the base unit 108 may include a processor 402 coupled to the network 104 through a network interface 404. The processor 402 may also be coupled to a memory 406 configured to store data and instructions that may be executed by the processor 402. The processor 402 may also be coupled to the camera 308, the touchscreen interface 310, and the biometric interface 312. Further, the processor 402 may be coupled to the badge receptacle interface or first opening 304, a power management unit (PMU) 408, a cleaning module 410, a recharger interface and badge storage 412, and the badge dispenser interface or second opening 314. In certain embodiments, the processor 402 may be configured to control operation of the various badge processing elements 304, 410, 412, and 314. In a particular embodiment, at least one of the cleaning module 410 and the recharger interface and badge storage 412 may be configured to retrieve data from the communication badge device 102 and to communicate the data to the processor 402. Further, at least one of the cleaning module 410 and the recharger interface and badge storage 412 may be configured to update instructions stored in the memory 206 of the communication badge device 102. Other embodiments are also possible.

The memory 406 may include an authentication module 414 that, when executed, may cause the processor 402 to receive biometric data, image data, user name and password data, other credentials, or any combination thereof. The authentication module 414 may further cause the processor 402 to compare the received data to employee data 428 and, when a match is determined, the processor 402 may login and authenticate the employee to the base unit 108. The memory 406 may also include an employee graphical user interface (GUI) module 416 that, when executed, may cause the processor 402 to generate an interface for presentation via the touchscreen interface 310. The GUI can include data and user-selectable elements, such as data about missions, tasks, assignments, and so on, as well as user-selectable tabs or buttons that may be accessed by the employee to view messages, to review progress, to review achievements, and so on. Other embodiments are also possible.

The memory 406 may include a mission module 418 that, when executed, may cause the processor 402 to determine mission criteria and to determine data associated with the employee relative to one or more missions. The determined data may be included within the GUI produced by the processor 402 executing the employee GUI module 416.

The memory 406 can include a social networking module 420 that, when executed, may cause the processor 402 to provide data related to an employee leaderboard, data related to employee interactions, and other data for inclusion within the interface. The memory 406 can also include a control module 422 that, when executed may cause the processor 402 to control operation of the various components of the base unit 108, including the badge receptacle interface or first opening 304, the cleaning module 410, the recharger interface and badge storage 412, the badge dispenser interface or second opening 314, the camera 308, and the biometric interface 312, for example.

The memory 406 may include an alerting module 424 that, when executed, may cause the processor 402 to provide alerts related to the employee, which alerts may be presented on the touchscreen interface 310, for example, within the GUI produced using the employee GUI module 416. The memory 406 can include an employee data manager 426 that, when executed, may cause the processor 402 to update the employee data 428 with data determined from a returned communication badge device 102, from timing of the login, timing of the returned device 102, and other data.

Figure 5:
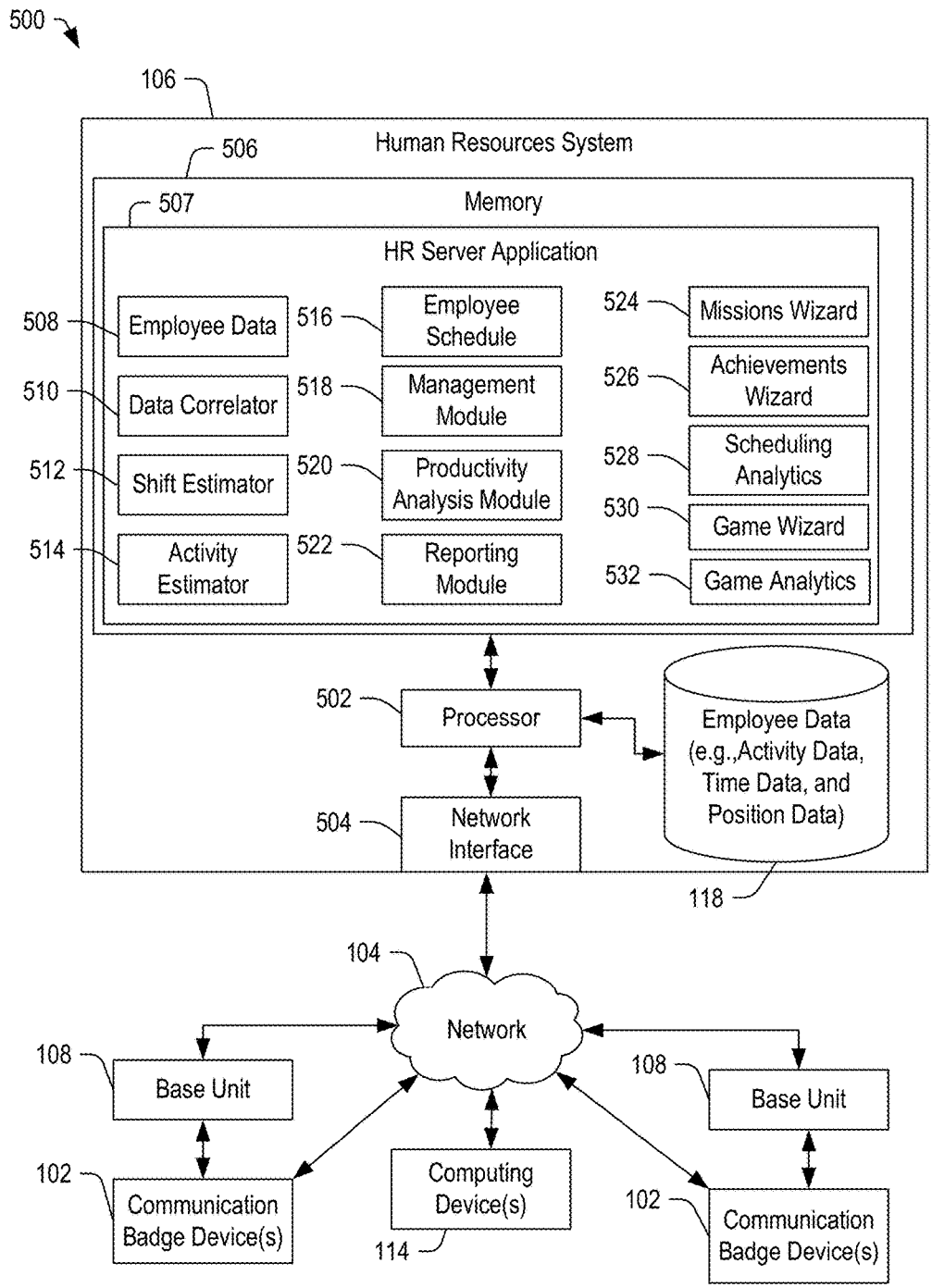
FIG. 5 depicts a block diagram of human resources system of the system of FIG. 1, in accordance with certain embodiments of the present disclosure.

FIG. 5 depicts a block diagram of a system 500 including HR system 106 of the system 100 of FIG. 1, in accordance with certain embodiments of the present disclosure. The HR system 106 may be configured to communicate with one or more base units 108 through the network 104. Further, the HR system 106 may also be configured to communicate with one or more communication badge devices 102 through the network 104. Additionally, the HR system 106 may be configured to communicate with one or more computing devices 114 through the network 104.

The HR system 106 can include a processor 502 coupled to a network interface 504, which can communicate with the network 104. The processor 502 may be coupled to the employee data 118 directly, by accessing a data file within a memory 506, or through the network 104. The processor 502 may be coupled to the memory 506, which may store data and instructions that, when executed, may cause the processor 502 to process data from the communication badge devices 102, from the computing devices 114, from the base units 108, and from other devices.

The memory 506 may include an HR server application 507 that, when executed, may cause the processor 502 to process information from various sources. The HR server application 507 may include an employee data module 508 that, when executed, may cause the processor 502 to receive data associated with one or more employees and to process the data. In some embodiments, the employee data module 508 may also cause the processor 502 to store the processed data in the employee data 118.

The HR server application 507 can include a data correlator 510 that, when executed, may cause the processor 502 to correlate data from various sources and times with a particular employee. The data correlator 510 may also correlate data from various similarly situated employees from one or more locations, for example, so that a leaderboard of employee performance can be related across multiple store locations, for example. The HR server application 507 can further include a shift estimator 512 that, when executed, may cause the processor 502 to determine information about an employee's shift, including analysis of performance as well as determination of other information. The HR server application 507 can include an activity estimator 514 that, when executed, may cause the processor 502 to estimate activities, task performance, activity intensity, and so on, based at least in part on the data received from the communication badge devices 102.

The HR server application 507 may include an employee schedule module 516 that, when executed, may cause the processor 502 to track and maintain employee schedule information. The HR server application 507 can include a management module 518 that, when executed, may cause the processor 502 to facilitate a number of administrative functions, such as adding new employees, removing former employees, creating notes related to employees, writing messages to employees, and so on. In some embodiments, the management module 518 can be used to provide a breadcrumb-type trail map by overlaying location data from the communication badge devices 102 onto a graphical map of the store, which can be useful in reviewing an employee's work day. The breadcrumb-type trail map may be used as a training tool to replay a route an employee took to complete a task and then to show an optimal route, for example. Further, the management module 518 can be used to collect data that can be analyzed to produce a heat map of employee whereabouts or employee density, which can be a strong indicator of employee coverage areas or lack thereof. A customer heat map derived from video data can be paired with the employee heat map data and analytics can lead to increase efficiency in real-time operations and customer service. In some embodiments, the location data may be determined by the communication badge devices 102 and sent to the HR system 106. The location data may then be processed by the processor 502 using the management module 518 to produce the map.

In certain embodiments, location tracking technology, whether Bluetooth®, ultrawide band, or WIFI, may be performed by the communication badge device 102 or within a "Store Brand Application". The RF signal sources 112 in FIG. 1 may be "dumb" beacons that omit an RF signal, and it may be left up to the communication badge device 102 to determine its location based on the location parameters programmed on those devices.

The HR server application 507 can include a productivity analysis module 520 that, when executed, may cause the processor 502 to determine productivity associated with a particular employee based on the information. The productivity analysis module 520 may cause the processor 502 to aggregate activity data corresponding to a plurality of communication badge devices 102. The productivity analysis module 520 may cause the processor 502 to track manager and user actions and activities within the platform, including, for example, keystrokes. The module 520 may cause the processor 502 to track a number of missions sent, the amount of feedback given, a number of messages sent, a number of times the user checks the live feed, the number of missions sent to each employee, other data, or any combination thereof. Other interactions may also be tracked. With respect to an associate, the module 520 may cause the processor 502 to determine how often the user checks notifications, time spent viewing the badge, time between when a mission is received at the communication badge device 102 and when it is read/accepted, how many missions the employee accepts versus how many they receive, other data, or any combination thereof. The HR server application 507 may include a reporting module 522 that, when executed, may cause the processor 502 to send data to a computing device 114, to a communication badge device 102, or any combination thereof.

The HR server application 507 can include a missions wizard 524 that, when executed, may cause the processor 502 to present user-selectable options and information configured to guide a user (such as a supervisor or manager) through a process of designing a mission (tasks, goals, and so on) to be completed by an employee. Completion of a mission may be recognized as an achievement, resulting in a change of status on a leaderboard and optionally an indicator for display on an interface of a communication badge interface 102. In some embodiments, the missions wizard module 524 may cause the processor 502 to generate training missions for products, services, and the like. In some embodiments, the missions wizard module 524 may cause the processor 502 to generate training missions that can presented on the communication badge devices 102 to walk an employee through a training process or through location-based training missions. The display on the communication badge device 102 or the base unit 114 can display instructions for training missions. Through real-time location tracking and based on input data received from the communication badge device 102, the HR system 106 can confirm completion by the employee. Training mission examples can include "Go find an item", "Learn the Store", "Product Qualification", "Safety", "Shrinkage", "Task Efficiency" or a variety of other missions.

In some embodiments, the training mission produced using the missions wizard 524 can include a pop quiz presented via the communication badge device 102. During slow times (e.g., times of low customer volume), a quiz can be pushed to trainees or to everyone. The quiz can ask multiple choice training questions. The answers may be determined by a manager and may be stored in memory 506, so that the answers to the quiz that were provided by the user may be evaluated.

The HR server application 507 can include an achievements wizard 526 that, when executed, may cause the processor 502 to provide an interface to facilitate creation of an achievement, award, indicator, or other information. In some embodiments, the achievements wizard 526 may facilitate creation of a threshold for determining an award to be associated with the employee. The achievements wizard 526 may also assist the user to determine a number of experience points that must be arned or a number of tasks to be completed in order to receive the recognition.

The HR server application 507 can include a scheduling analytics module 528 that, when executed, may cause the processor 502 to process scheduling data, attendance data, and other data. In a particular retail store example, the scheduling analytics module 528 can cause the processor 502 to utilize the data determined by the productivity analysis module 520 (including employee and customer density data) to determine a labor loading model based on store traffic, conversion rate, planned non-selling activity, minimum coverage, margin per hour after selling costs, projected promotional uplift, and so on. In some embodiments, the scheduling analytics module 528 can cause the processor 502 to also utilize weather data, local traffic data, traffic trends, and labor costs as a percentage of sales to make scheduling recommendations.

The HR server application 507 may further include a game wizard 530 that, when executed, may cause the processor 502 to facilitate communication between employees and managers to gamify tasks, missions, and performance. The game wizard 530 may cause the processor 502 to allow communication between employees to facilitate the gamification of the tasks, missions, and achievements.

In some embodiments, the HR server application 507 may also include a game analytics module 532 that, when executed, may cause the processor 502 to process data corresponding to the employee data and other analytics data as well as social interactions through the HR system 106 to determine the efficacy of the gamification. In some embodiments, the game analytics module 532 may cause the processor 502 to evaluate the employee data to determine improvements over time. Further, in some embodiments, the game analytics module 532 may determine point levels, tasks, missions, and other elements of an achievement that promote employee involvement. As the data is determined, the data may be used by the game wizard 530 to facilitate development of achievements and new missions.

In some embodiments, the HR server application 507 may be configured to generate a GUI including data and user-selectable options, such as tabs, pull-down menus, buttons, clicks, check-boxes, radio buttons, text fields, other selectable options, or any combination thereof. The GUI may be provided to a computing device 114 for presentation. In certain embodiments, a user may interact with the GUI from the HR system 106 using an Internet browser application or another application executing on a processor of a computing device 114.

Figure 6:
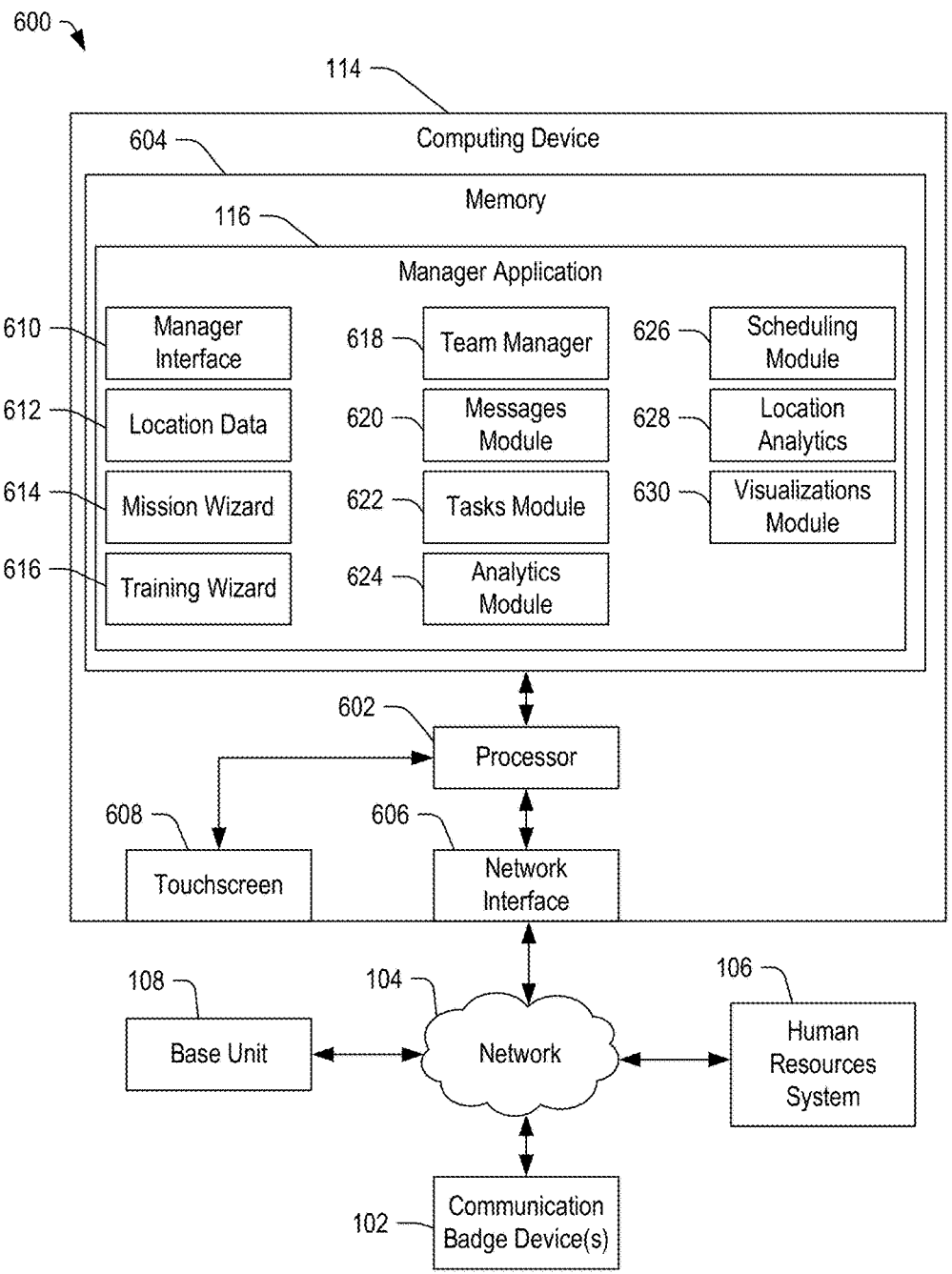
FIG. 6 depicts a block diagram of a computing device of the system of FIG. 1, which computing device can be operated by a manager, in accordance with certain embodiments of the present disclosure.

FIG. 6 depicts a block diagram of a system 600 including a computing device 114 of the system of FIG. 1, which computing device 114 can be operated by a manager, in accordance with certain embodiments of the present disclosure. The computing device 114 may communicate with the base unit 108, the HR system 106, and the communication badge devices 102 through the network 104.

The computing device 114 may include a processor 602 coupled to a network interface 606, which may communicate with the network 104. The processor 602 may be coupled to a memory 604 and to a touchscreen 608. The memory 604 may be configured to store data and instructions that may be executed by the processor 602 to provide a variety of functions. In some embodiments, the memory 604 may include the manager application 116.

The manager application 116 can include a manager interface 610 that, when executed, may cause the processor 602 to provide a graphical user interface (GUI) including data and including one or more user-selectable elements, such as buttons, clickable-links, tabs, or other selectable features with which an operator (such as a manager) may interact. The manager application 116 may further include location data 612 that, when executed, may cause the processor 602 to determine location information from data received from the communication badge devices 102.

The manager application 116 can include a mission wizard 614 that, when executed, may cause the processor 602 to assist a manager to configure missions that can be performed by employees. A mission may include one or more tasks that can be performed by an employee for the employee to earn an achievement or recognition. The manager application 116 can also include a training wizard 616 that, when executed, may cause the processor 602 to assist a manager in producing training missions that can be performed by employees. The manager application 116 may include a team manager module 618 that, when executed, may cause the processor 602 to assist a manager in forming a team of employees, in communicating with the team, and so on. In some embodiments, the team manager module 618 can be used to assist a manager in creating teams and in assigning particular employees to one or more teams.

The manager application 116 can include a messages module 620 that, when executed, may cause the processor 602 to send and receive messages. The manager application 116 may include a tasks module 622 that, when executed, may cause the processor 602 to display tasks, assign tasks, generate tasks, and so on. Further, the manager application 116 may include an analytics module 624 that, when executed, may cause the processor 602 to evaluate tasks, employee performance, and other data. The manager application 116 may also include a scheduling module 626 that, when executed, may cause the processor 602 to assist a manager in establishing employee schedules and configuring work shifts on behalf of a company. In some embodiments, the scheduling module 626 may communicate with the employee schedule module 516 of the HR system 106 to manage employee schedules.

The manager application 116 can include a location analytics 628 that, when executed, may cause the processor 602 to determine locations of various communication badge devices 102 and optionally to determine locations of various tasks that were performed. The manager application 116 can also include a visualization module 630 that, when executed, may cause the processor 602 to present data in a selected format. The selected format may include, for example, one or more of a table format, a list, a heat map, a graph, a line graph, a pie chart, a bar chart, other charts, or any combination thereof.

Figure 7:
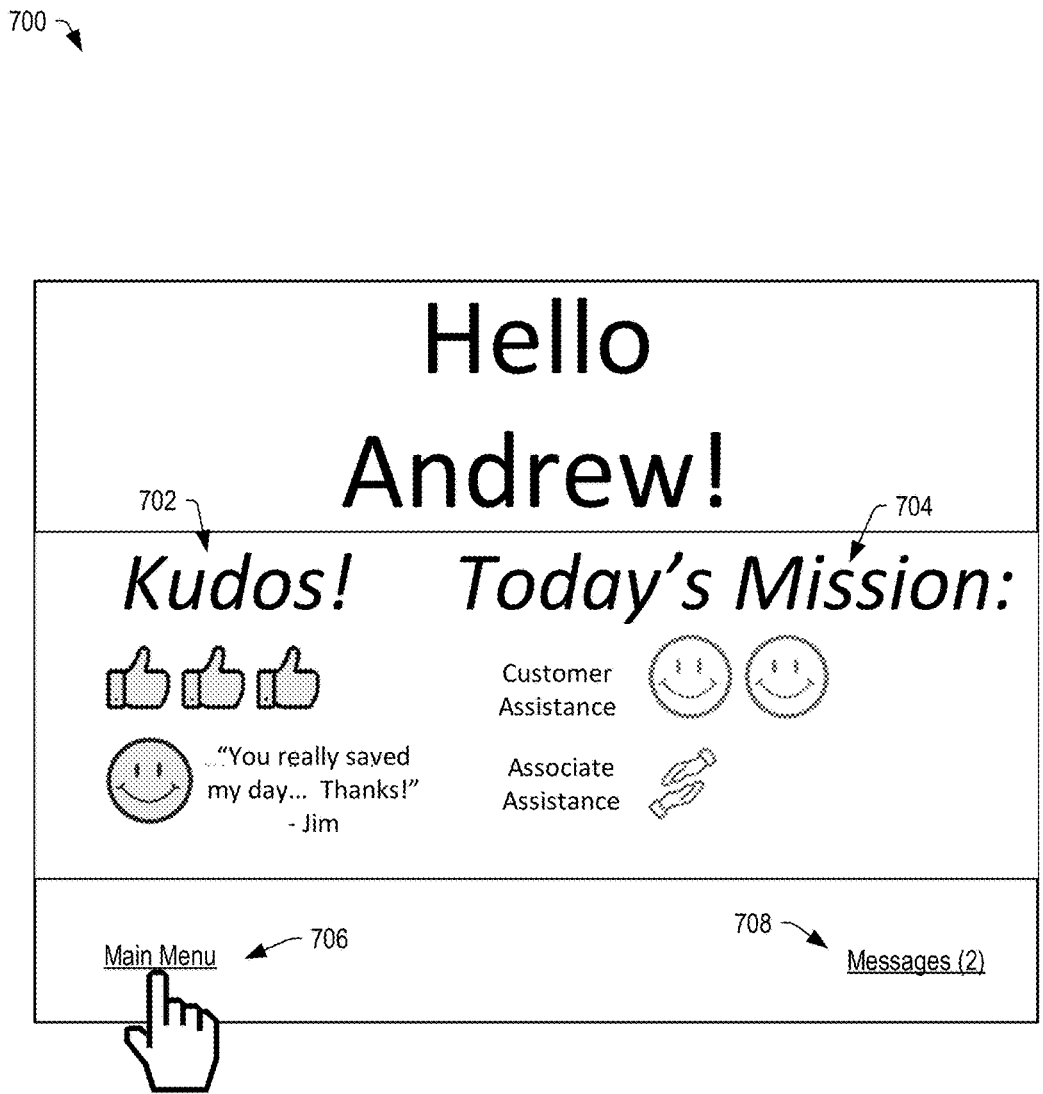
FIG. 7 illustrates a graphical interface that may be provided on a touchscreen display of the base unit of FIGS. 1-6 during a sign in process or on a computing device associated with the employee, in accordance with certain embodiments of the present disclosure.

FIG. 7 illustrates a graphical interface 700 that may be provided on a touchscreen display 310 of the base unit 108 of FIGS. 1-6 during a sign in process or on a computing device 114 associated with the employee, in accordance with certain embodiments of the present disclosure. The graphical interface 700 may include a welcome screen associated with a particular employee, which may be displayed on the touchscreen display 310 after successful authentication. In this instance, the welcome screen identified an employee named, Andrew.

The welcome screen 700 may further include social comments or messages, generally indicated at 702. The welcome screen 700 may also present a brief list of missions, generally indicated at 704. The welcome screen 700 can also include a user-selectable link (labeled "Main Menu") 706 and a user-selectable link (labeled "Messages") 708, as well as a number of unread messages (in this example, "2"). In some embodiments, the messages 702 may be accessed directly or through the main menu 706. Further, in some embodiments, the missions 704 may be accessed directly or through the main menu 706.

In some embodiments, options provided through the touchscreen display 310 may be limited so that employees can be logged into the system efficiently and without causing the employees to linger around the touchscreen interface 310 of the base unit 108. Further, in some embodiments, the user may select the main menu 706 by interacting with the selectable option via the touchscreen interface 310.

Figure 8:
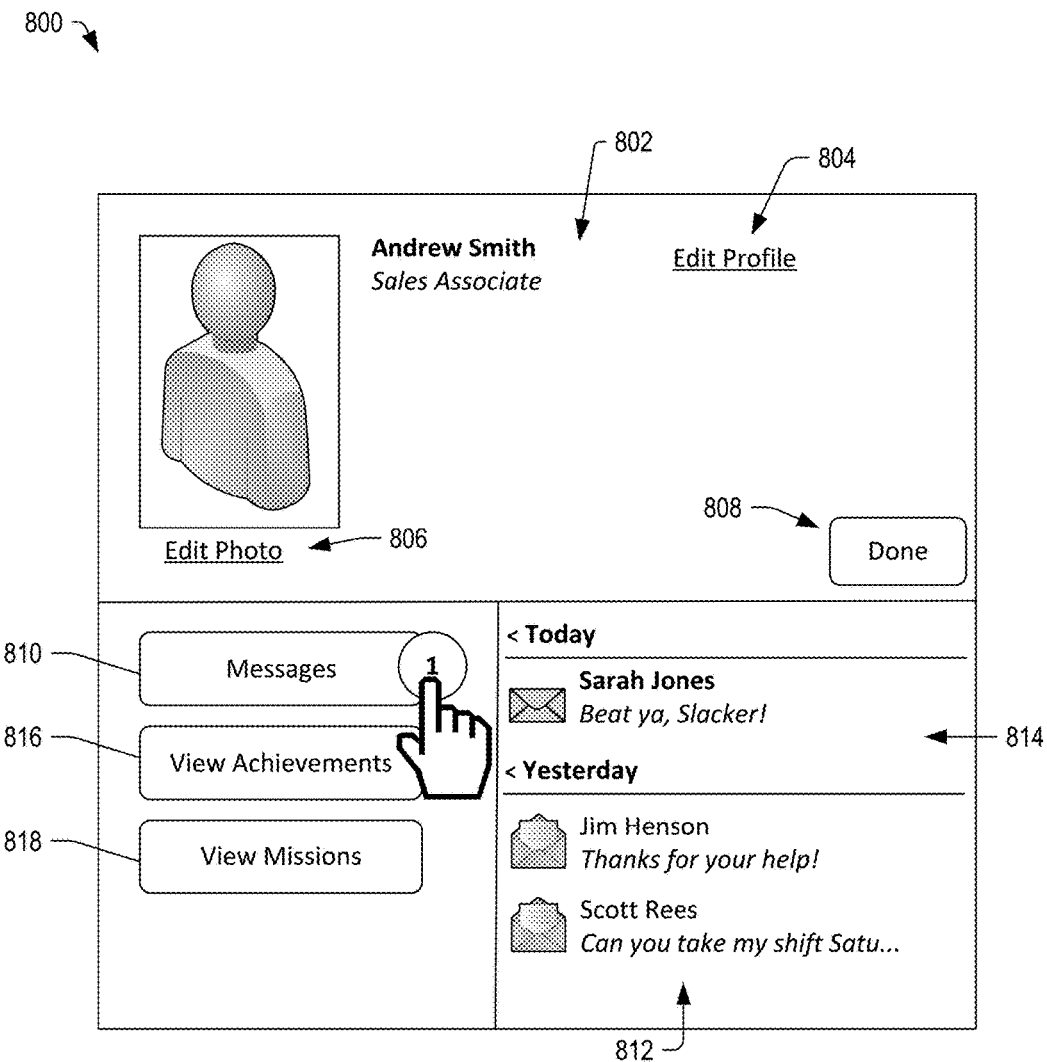
FIG. 8 depicts a home page of the graphical interface of FIG. 7, which may be presented on the touchscreen of the base unit or on the computing device, in accordance with certain embodiments of the present disclosure.

FIG. 8 depicts a home page 800 of the graphical interface 700 of FIG. 7, which may be presented on the touchscreen 310 or on the computing device 114, in accordance with certain embodiments of the present disclosure. The home page 800 may include an employee panel 802 including information about the employee and optionally a digital picture of the employee. The employee panel 802 may include a first selectable option 804 (labeled "Edit Profile") accessible by a user to edit a profile associated with the employee. The employee panel 802 may further include a second selectable option 806 (labeled "Edit Photo") accessible by a user to edit the photo. In some embodiments, selection of the second selected option 806 may cause the display interface 310 to provide options to activate the camera 308 to capture a new image or provide a browse feature configured to retrieve an image. The employee panel 802 may also include a selectable button 808 (labeled "Done"), which may be accessed by a user to exit the main menu.

The home page 800 can also include user-selectable options including a messages option 810, a view achievements option 816, and a view missions option 818. Selection of the view achievements option 816 may cause the home page 800 to display a list of the user's completed missions, achievements, and other indicators. Selection of the view missions button 818 may cause the home page 800 to display completed missions as well as progress on current and optionally future missions. Other embodiments are also possible.

In the illustrated example, the user has selected the messages option 810, which shows one unread message. In response to the selection, the home page 800 can display read messages 812 and the unread message 814. In some embodiments, selection of a message may display the text and provide options for the user to respond. Further, in some embodiments, the home page 800 may include an option (not shown) for generating a new message, which may be sent to co-workers, managers, or others. In this example, another co-worker left a message for the employee.

Figure 9:
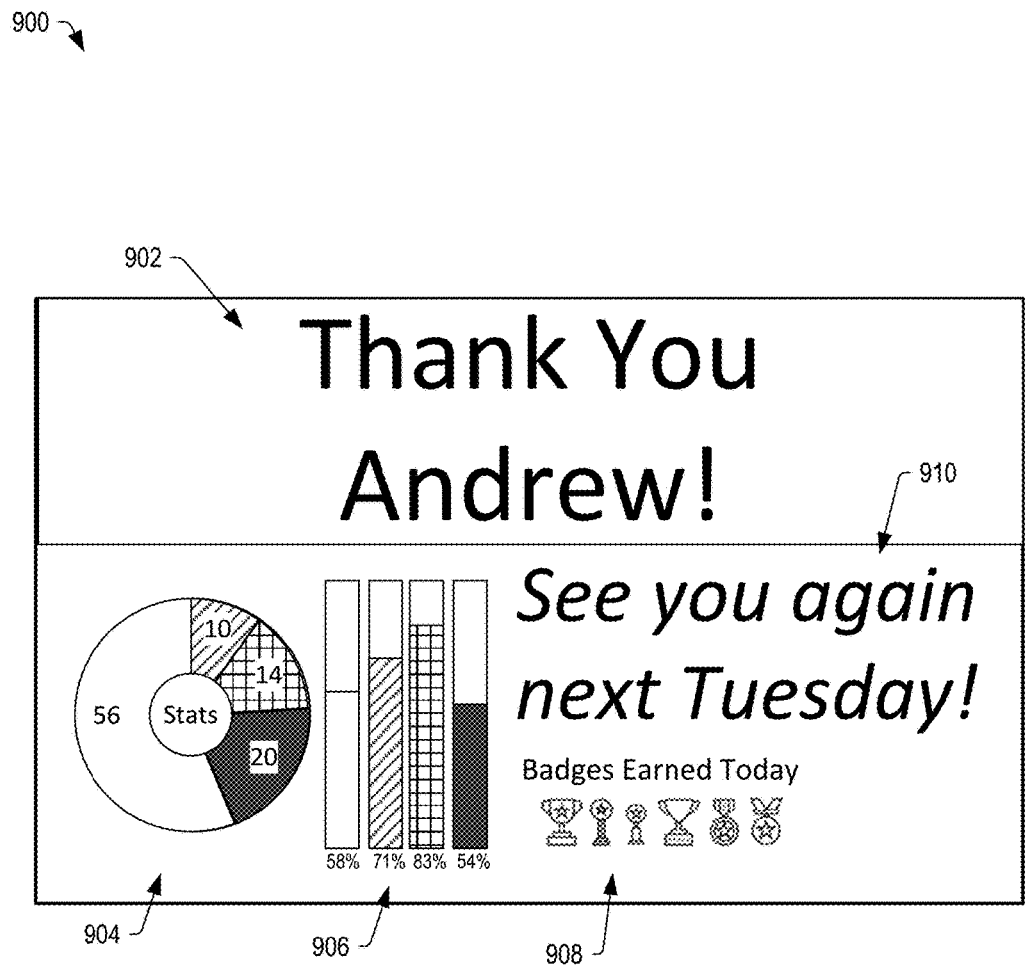
FIG. 9 depicts a log out page of the graphical interface of FIG. 7, which may be presented on the touchscreen or on the computing device, in accordance with certain embodiments of the present disclosure.

FIG. 9 depicts a log out page 900 of the graphical interface of FIG. 7, which may be presented on the touchscreen 310 or on a display of the computing device 114, in accordance with certain embodiments of the present disclosure. The page 900 may include an employee panel 902. The page 900 can also include a statistical chart 904 indicating a percentage of the employee's time that is being spent on a given activity. Further, the page 900 can show bar charts 906 including information regarding how the user's performance compares to an average. The page 900 may also depict achievements earned by the employee, generally indicated at 908, and an indication of the employee's schedule, generally indicated at 910. Other embodiments are also possible.

In some examples, the log out page 900 may be displayed for a period of time, such as a few seconds. Once the period of time expires, the log out page 900 may be closed and the display interface 310 may present a login page for a next employee.

Figure 10A:
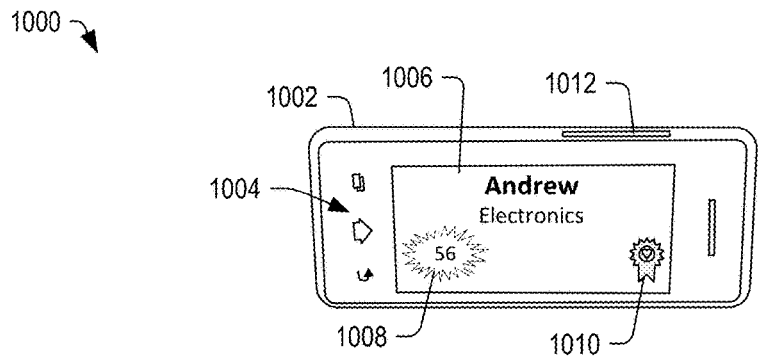
FIG. 10A depicts a front perspective view of a communication device that can be used in conjunction with a clip device to form a communication badge device, in accordance with certain embodiments of the present disclosure.

FIG. 10A depicts a front perspective view of a communication device 1000 that can be used in conjunction with a clip device to form a communication badge device 102, in accordance with certain embodiments of the present disclosure. The communication device 1000 may include a housing 1002 configured to secure circuitry and components depicted in FIG. 2 as part of the communication badge device 102. The communication device 1000 further includes a touch-sensitive interface 1004 and a touchscreen display 1006, which may depict a first indicator 108 corresponding to a number of points earned toward a current mission or task and a second indicator 110 representing an earned achievement. The touchscreen display 1006 may also depict the employee's name (e.g., "Andrew") and his or her assigned department (e.g., "Electronics"). The communications device 1000 may also include a user-selectable button or switch 1012, which may be accessed by a user.

In one possible embodiment, the communication device 1000 may be implemented as a small-profile smartphone, which may include a speaker, a microphone, a touchscreen display, one or more wireless transceivers, a processor, a memory, and other components of a smartphone device. The communication device 1000 may be attached to a wearable badge to form a communications badge device 102, an example of which is depicted in FIG. 10B.

Figure 10B:
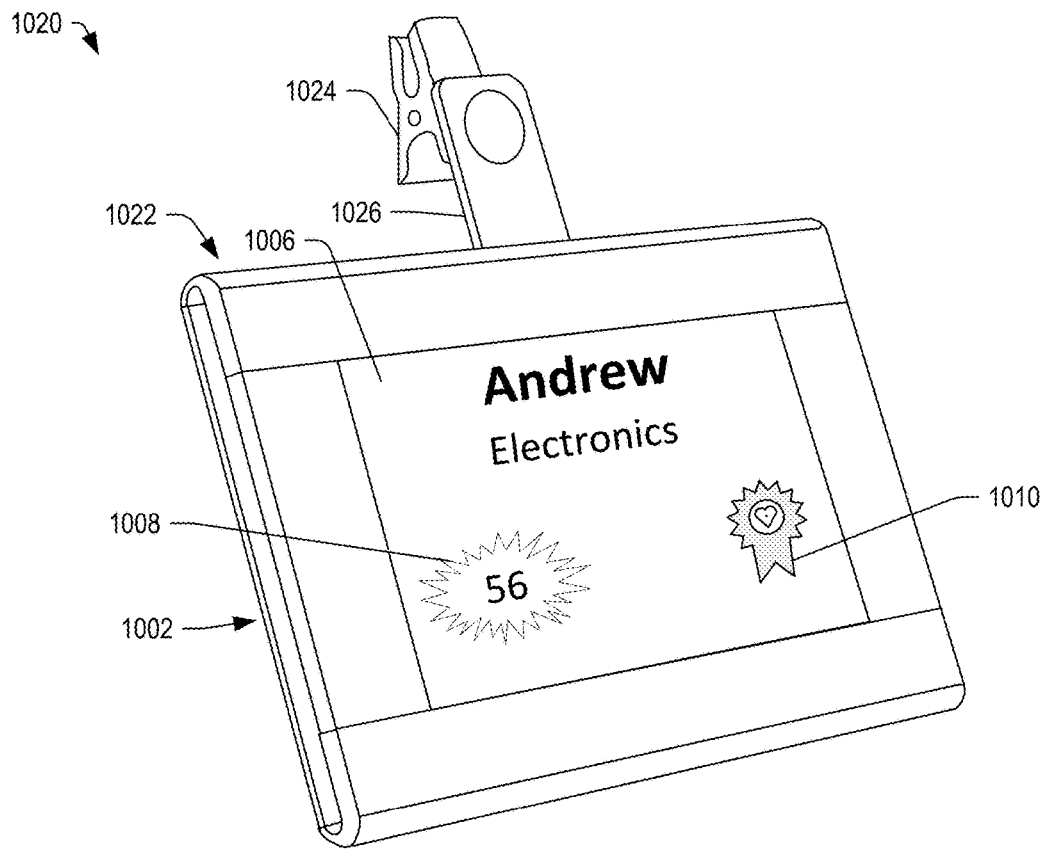
FIG. 10B depicts a front perspective view of a communication badge device including the communication device coupled to a clip device, in accordance with certain embodiments of the present disclosure.

FIG. 10B depicts a front perspective view 1020 of a communication badge device 102 including the communication device 1000 coupled a clip device 1022, in accordance with certain embodiments of the present disclosure. The clip device 1022 may include an opening through which the touchscreen display 1006 may be viewed. The clip device 1022 may further include a clip or clasp 1024 pivotally attached to a body of the clip device 1022 by an extension or arm 1026. In some embodiments, the clip or clasp 1024 may be configured to releasably couple the clip device 1022 to a garment of an employee.

Figure 11A:
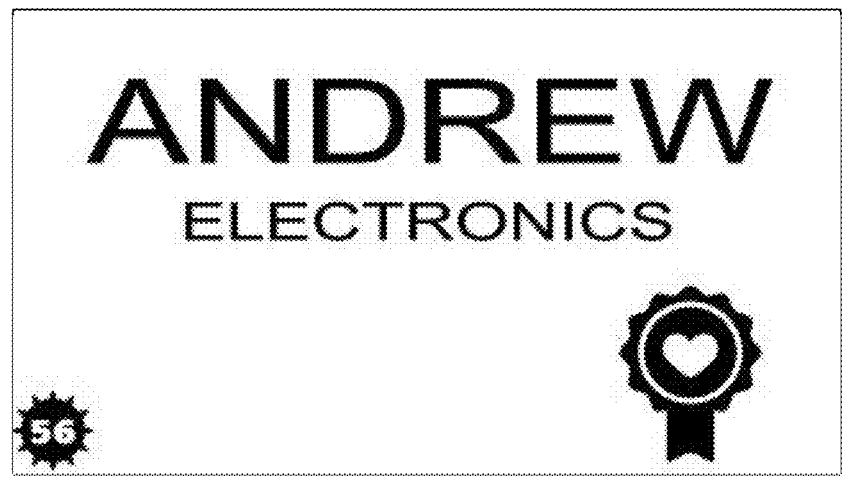
FIG. 11A depicts a view of a display of the communication badge device when in a first orientation, in accordance with certain embodiments of the present disclosure.

FIG. 11A depicts a view 1100 of a display of the communication badge device when in a first orientation, in accordance with certain embodiments of the present disclosure. In the first orientation, the view 1100 includes the employee's name, the employee's assigned department, an indicator corresponding to the employee's progress toward a task, a mission, a training assignment, or another goal. Further, the view 1100 depicts an indicator corresponding to an achievement earned by the employee.

If the user adjusts an orientation of the communication badge device 102 by tilting the touchscreen display toward the employee's face, the communication badge device 102 may present data and a plurality of user-selectable options to the employee. One possible example of the user-selectable options is described below with respect to FIG. 11B.

Figure 11B:
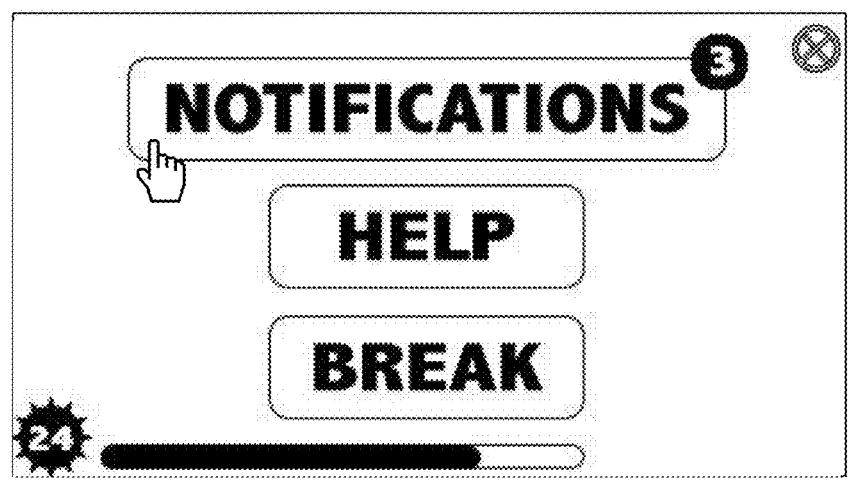
FIG. 11B depicts a view of a display of the communication badge device when in a second orientation, in accordance with certain embodiments of the present disclosure.

FIG. 11B depicts a view 1120 of a display of the communication badge device when in a second orientation, in accordance with certain embodiments of the present disclosure. The view 1120 may include a "Notifications" option, a "Help" option, and a "Break" option. If the user selects the "Help" option by touching the option on the touchscreen display, the communication badge device 102 may present a help request interface. If the user selects the "Break" option, the communication badge device 102 may temporarily discontinue processing of activity data, audio data, and the like.

When the user selects the "Notifications" option (which indicates three unread messages), the display of the communication badge device 102 may display further options that include various alerts that may have been sent to the employee. One possible example of the resulting display (upon selection of the "Notifications" option) is described below with respect to FIG. 12A.

Figure 12A:
FIG. 12A depicts a view of a display of the communication badge device after selection of a "Notifications" option, in accordance with certain embodiments of the present disclosure.

FIG. 12A depicts a view 1200 of a display of the communication badge device after selection of a "Notifications" option, in accordance with certain embodiments of the present disclosure. The display presents a plurality of user-selectable options. The options presented on the display include a "Missions" option including two unread missions; a "Messages" option including one unread message; and an "Achievements" option. The display also includes a progress meter indicating the employee's progress toward a next achievement.

When the user selects the "Missions" option, the communications badge device may retrieve missions associated with the employee. One possible example of the resulting display (upon selection of the "Missions" option) is described below with respect to FIG. 12B.

Figure 12B:
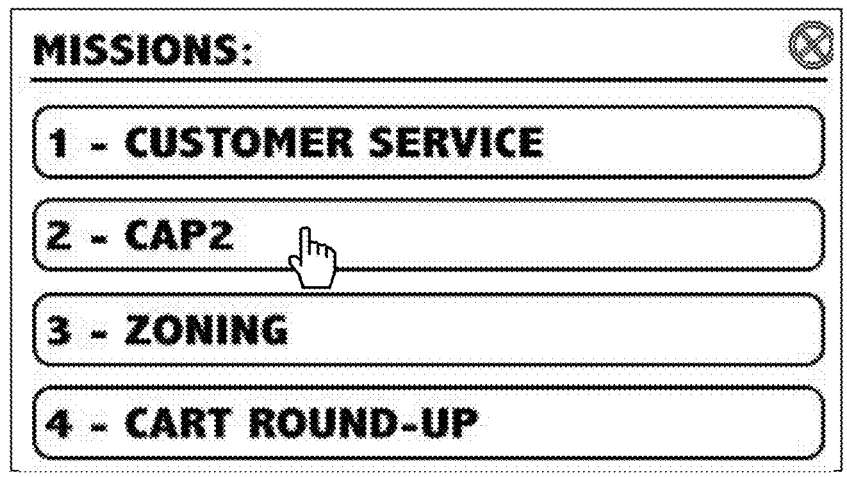
FIG. 12B depicts a view of a display of the communication badge device after selection of a "Missions" option, in accordance with certain embodiments of the present disclosure.

FIG. 12B depicts a view 1220 of a display of the communication badge device after selection of a "Missions" option, in accordance with certain embodiments of the present disclosure. The view 1220 includes a plurality of user-selectable options. The user-selectable options may include a "Customer Service" Mission, a "CAP2" Mission, a "Zoning" Mission, and a "Cart Round-Up" Mission. For example, with respect to the "Customer Service" Mission option, one or more missions may be displayed for review by the user.

In the illustrated example, the user may select the "CAP2" Mission, which may cause the communication badge device to display instructions related to the mission. One possible example of the display after selection of the "CAP2" Mission option is described below with respect to FIG. 13A.

Figure 13A:
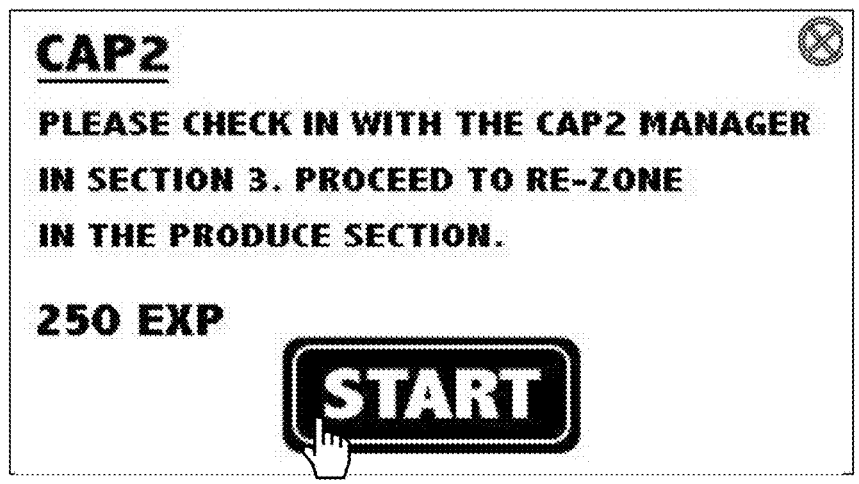
FIG. 13A illustrates a view of a display of the communication badge device after selection of the "CAP2" Mission option, in accordance with certain embodiments of the present disclosure.

FIG. 13A illustrates a view 1300 of a display of the communication badge device after selection of the "CAP2" Mission option, in accordance with certain embodiments of the present disclosure. The view 1300 depicts instructions corresponding to the "CAP2" Mission and a selectable "START" option configured to initiate a timer corresponding to performance of the mission. In response to selection of the "START" option, the communication badge device may present a timer and user-selectable options that may be selected by the user to update the mission progress.

Figure 13B:
FIG. 13B depicts a view of the display of the communication badge device after selection of a "Start" option, in accordance with certain embodiments of the present disclosure.

FIG. 13B depicts a view 1320 of the display of the communication badge device after selection of a "Start" option, in accordance with certain embodiments of the present disclosure. Upon selection of the "START" option in FIG. 13A, the communications badge device 102 may present the view 1320, which includes an identifier associated with the selected mission ("CAP 2") and a running clock or timer. Further, the view 1320 may include a first user-selectable option (labeled "Complete Mission"), which may be selected by the employee to indicate that the mission has been completed. Selection of this first option may cause the communication badge device 102 to stop and record the timer and to send data related to the completion of the mission to at least one of the HR system 106, the base unit 108, the computing device 114, or another communication badge device 102. Further, the communication badge device 102 may return to one of the view 1220 in FIG. 12B or the view 1200 in FIG. 12A.

In some instances, an employee may be interrupted while working to complete a mission, such as by a manager instructing the employee to work on a higher priority task or by a customer asking for assistance. The employee may select a second option (labeled "Pause Mission"), which pauses the running clock. Further, the employee may select a third option (labeled "Main Menu"), which selection may cause the communication badge device to present the view 1120 in FIG. 11B. Other embodiments are also possible.

It should be appreciated that the timer feature may serve a dual purpose. First, the timer helps to gamify the tasks by putting the tasks on the clock to see how efficiently the employee can complete a particular mission. Second, the timer provides a means by which movement data can be correlated to a particular mission or combination of tasks. Additionally, the timer provides management with data that can be used for employee resource allocation and to evaluate how long it takes for a particular mission or task to be completed. At times, efficient employees may be rewarded for completing such tasks more quickly than others.

Figure 14A:
FIG. 14A depicts a view of a display of the communication badge device when in a second orientation and after selection of the "Main Menu" option in FIG. 13B, in accordance with certain embodiments of the present disclosure.

In the illustrated example, the user may have selected the "Pause Mission" option and may have also selected the "Main Menu" option, which caused the communication badge device 102 to display a main menu view as depicted in FIG. 14A.

FIG. 14A depicts a view 1400 of a display of the communication badge device when in a second orientation and after selection of the "Main Menu" option in FIG. 13B, in accordance with certain embodiments of the present disclosure. The view 1400 depicts a "Notifications" option indicating three unread notifications, a "Help" option, and a "Break" option. Further, the view 1400 may include a current status in terms of earning points toward a next achievement (in this example, a start with a number "24" in the center). The view 1400 may further include a progress bar indicating progress toward completion of the next achievement threshold. Further, the view 1400 can include an indicator of the paused mission.

The employee may select the "Help" option, which may cause the communication badge device 102 to display a view that allows the employee to request assistance. One possible example is described below with respect to FIG. 14B.

Figure 14B:
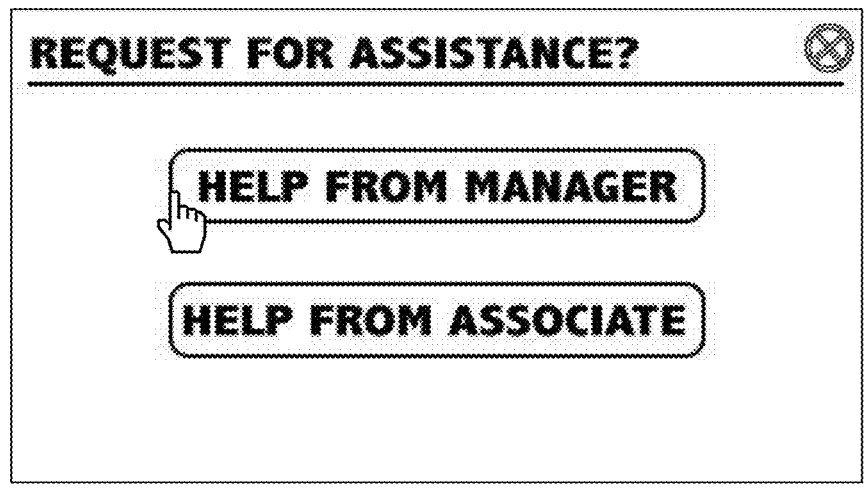
FIG. 14B depicts a view of the display of the communication badge device after selection of a "Help" option, in accordance with certain embodiments of the present disclosure.

FIG. 14B depicts a view 1420 of the display of the communication badge device after selection of a "Help" option, in accordance with certain embodiments of the present disclosure. The view 1420 includes options from which the employee may select. In the illustrated example, the view 1420 may include a "Help from Manager" option and a "Help from Associate" option. When the employee selects the "Help from Manager" option, the communication badge device 102 may further include an interface that can include options to provide information to the manager about the request for help, using a pulldown menu, a text input, an audio input, an image, or any combination thereof.

Figure 15A:
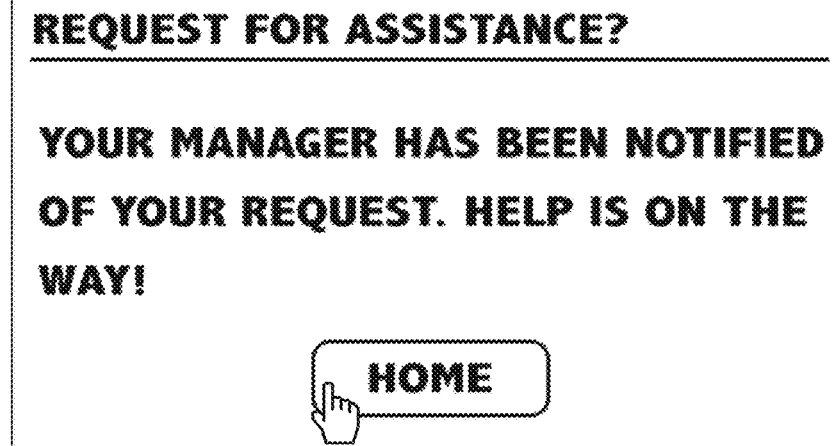
FIG. 15A depicts a view of a display of the communication badge device when in a second orientation and after requesting help via the interface of FIG. 14B, in accordance with certain embodiments of the present disclosure.

FIG. 15A depicts a view 1500 of a display of the communication badge device when in a second orientation and after requesting help via the interface of FIG. 14B, in accordance with certain embodiments of the present disclosure. In the illustrated example, the view 1500 depicts a confirmation message: "Your manager has been notified of your request. Help is on the way!" Further, the view 1500 includes a "Home" button, which may be accessed by the employee to return to the main menu, an example of which is described below with respect to FIG. 15B.

Figure 15B:
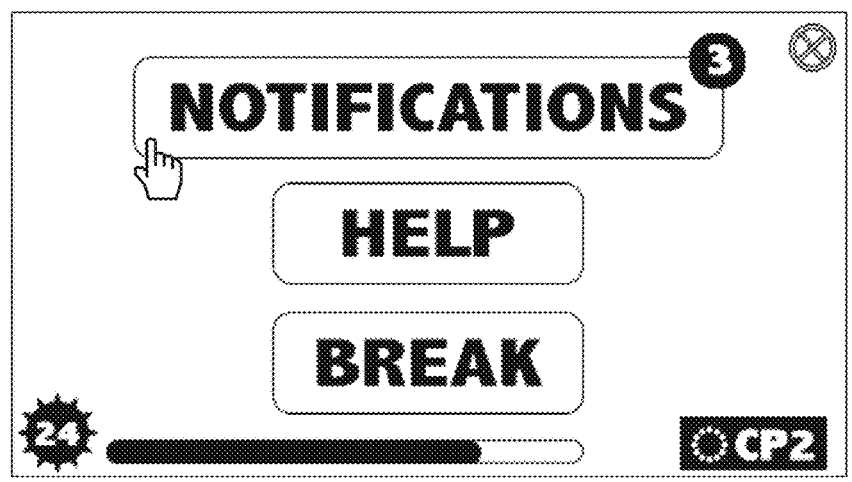
FIG. 15B depicts a view of the display of the communication badge device after selection of a "Home" option in the view of FIG. 15A, in accordance with certain embodiments of the present disclosure.

FIG. 15B depicts a view 1520 of the display of the communication badge device after selection of a "Home" option in the view of FIG. 15A, in accordance with certain embodiments of the present disclosure. The view 1520 includes a "Notifications" option indicating three unread notifications, a "Help" option, and a "Break" option. The employee may select the "Break" option to go on a scheduled break time. In this instance, the employee may select the "Notifications" option, which may cause the communication badge device 102 to present the interface depicted in FIG. 16A.

Figure 16A:
FIG. 16A depicts a view of a display of the communication badge device when in a second orientation and after selecting the "Notifications" option via the interface of FIG. 15B, in accordance with certain embodiments of the present disclosure.

FIG. 16A depicts a view 1600 of the display of the communication badge device when in a second orientation and after selecting the "Notifications" option via the interface of FIG. 15B, in accordance with certain embodiments of the present disclosure. In the illustrated example, the view 1600 depicts the "Missions" option indicating two unread missions, a "Messages" option indicating one unread message, and an "Achievements" option. Once again, the view 1600 may include a current status in terms of earning points toward a next achievement (in this example, a star with a number "24" in the center) and a progress bar. Further, the view 1600 may include an indicator of a mission in progress. In some embodiments, the indicator of the mission in progress may be user-selectable to return to the mission.

Figure 16B:
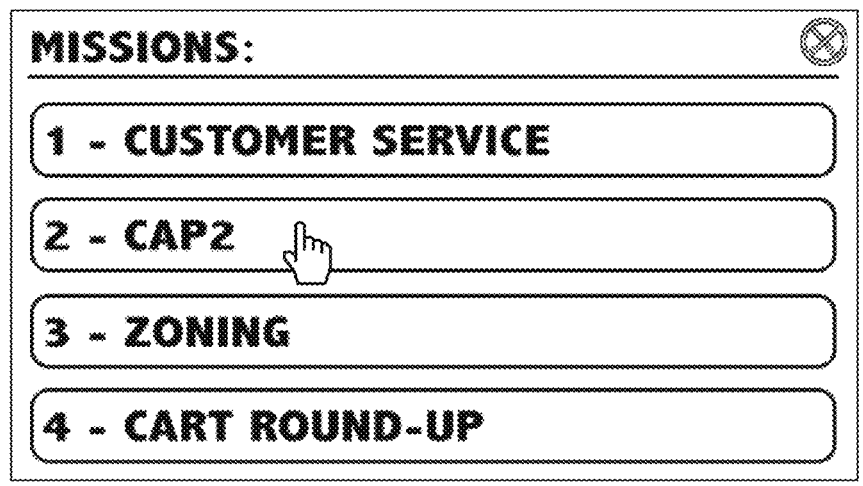
FIG. 16B depicts a view of the display of the communication badge device after selection of a "Missions" option in the view of FIG. 16A, in accordance with certain embodiments of the present disclosure.

FIG. 16B depicts a view 1620 of the display of the communication badge device after selection of a "Missions" option in the view of FIG. 16A, in accordance with certain embodiments of the present disclosure. The view 1620 may present a "Customer Service" option, a "CAP2" option, a "Zoning" option, and a "Cart Round-Up" option. The user may return to the mission in progress by selecting the "CAP2" option. Other embodiments are also possible.

Figure 17A:
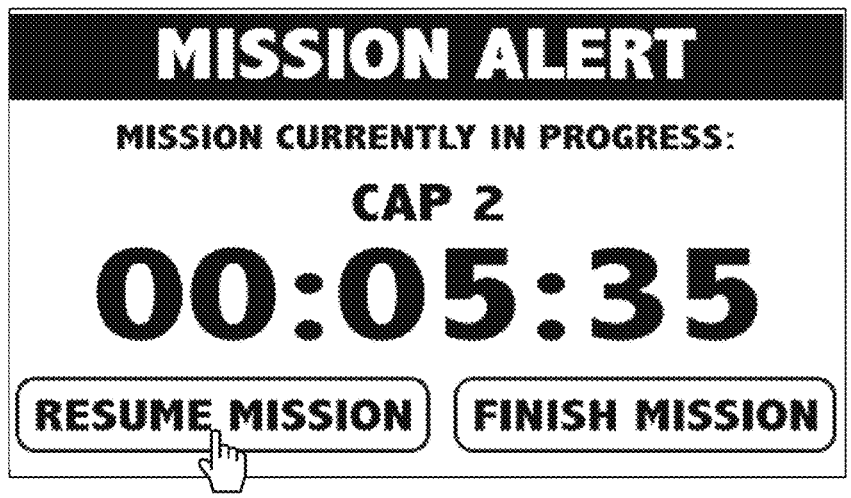
FIG. 17A depicts a view of the display of the communication badge device after selection of the "CAP2" option in the view of FIG. 16B, in accordance with certain embodiments of the present disclosure.

FIG. 17A depicts a view 1700 of the display of the communication badge device after selection of the "CAP2" option in the view of FIG. 16B, in accordance with certain embodiments of the present disclosure. The view 1700 includes an indicator of the mission currently in progress as well as the current time. The view 1700 also includes a "Resume Mission" option and a "Finish Mission" option. If the employee selects the "Resume Mission" option, the timer may resume.

Figure 17B:
FIG. 17B depicts a view of the display of the communication badge device after selection of the "Customer Service" option of the interface depicted in FIG. 16B.

FIG. 17B depicts a view 1720 of the display of the communication badge device after selection of the "Customer Service" option of the interface depicted in FIG. 16B. Alternatively, the view 1720 may interrupt the current mission. In the view 1720, a customer service request is displayed. In this example, the user may earn 100 experience points toward completion of the next achievement level. The view 1720 further explains that "A customer needs assistance in the electronics department. The customer is located near the video game section." The employee may close the view 1720 and return to the view 1620 in FIG. 16B. Alternatively, the employee may select a "START" option within the view 1720 to assume responsibility for assisting the customer.

Figure 18A:
FIG. 18A depicts a view of a display of the communication badge device after selection of the "START" option in the view of FIG. 17B, in accordance with certain embodiments of the present disclosure.

FIG. 18A depicts a view 1800 of a display of the communication badge device after selection of the "START" option in the view of FIG. 17B, in accordance with certain embodiments of the present disclosure. As shown in the view 1800, selection of the "START" option may initiate a new timer corresponding to the accepted customer service task. Further, the view 1800 may include a "Complete Mission" option that may be selected by an employee indicate that the mission has been completed. Additionally, the view 1800 may include a "Pause Mission" option that may be selected by an employee to pause the timer on the mission that is in progress. The view 1800 may also include a "Main Menu" option.

Figure 18B:
FIG. 18B depicts a view of a display of the communication badge device after selection of the "Pause Mission" option in the view of FIG. 18A, in accordance with certain embodiments of the present disclosure.

FIG. 18B depicts a view 1820 of a display of the communication badge device after selection of the "Pause Mission" option in the view of FIG. 18A, in accordance with certain embodiments of the present disclosure. The view 1820 includes a "Mission Paused" indicator and a "Customer Service" indicator. The timer for the customer service option may continue running, but the timer for the mission may be paused. The view 1820 may further include a "Resume Mission" option and an "End Mission" option.

Once the employee has helped the customer, the employee may select the "Resume Mission" option, which terminates the customer service timer and which resumes the mission timer. Further, the system may credit the employee with the experience points and may update the employee's account.

Figure 19A:
FIG. 19A depicts a view of the display of the communication badge device in the second orientation and after selection of the "Resume Mission" option, in accordance with certain embodiments of the present disclosure.

FIG. 19A depicts a view 1900 of the display of the communication badge device in the second orientation and after selection of the "Resume Mission" option, in accordance with certain embodiments of the present disclosure. The view 1900 may include a "Resume Mission" indicator and a plurality of user-selectable reasons for the employee's pause in addressing the mission. The reasons may include a "Re-Tasked" option that may be selected when the employee was re-tasked by a manager or supervisor. The reasons may also include a "Customer" option, a "Break" option, a "Bathroom" option, and a "Resume Mission" option. In this example, the employee may select the "Customer" option to provide an explanation for the pause in the mission. In the illustrated example, the communication badge device 102 may record the pause and the explanation for the pause and optionally may communicate data related to the mission, the pause, the customer service event, and so on, to at least one of the HR system 106, the base unit 108, and the computing device 114.

Figure 19B:
FIG. 19B depicts a view of the display of the communication badge device after selection of the "Customer" option of FIG. 19A, in accordance with certain embodiments of the present disclosure.

FIG. 19B depicts a view 1920 of the display of the communication badge device, in accordance with certain embodiments of the present disclosure. In this example, the view 1920 includes a "Customer Service" indicator and a timer associated with the customer service event. The view 1920 may also include a "Complete Mission" option, a "Pause Mission" option, and a "Main Menu" option. In this example, the employee may select the "Main Menu" option.

Figure 20A:
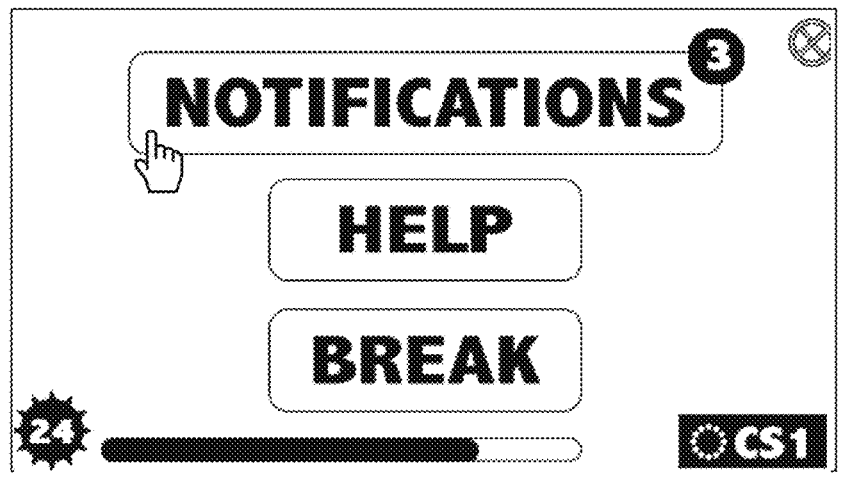
FIG. 20A depicts a view of the display of the communication badge device illustrating the main menu, in accordance with certain embodiments of the present disclosure.

FIG. 20A depicts a view 2000 of the display of the communication badge device illustrating the main menu, in accordance with certain embodiments of the present disclosure. The view 2000 may include the "Notifications" option with an indicator showing three unread notifications, a "Help" option, and a "Break" option. In this view, the current status of the user's accumulated points toward the next achievement and a progress bar showing the employee's progress. Further, the view 2000 can include an indicator that the "Customer Service" event is in progress. The user may select the "Notifications" option.

Figure 20B:
FIG. 20B depicts a view of the display of the communication badge device illustrating the notifications menu, in accordance with certain embodiments of the present disclosure.

FIG. 20B depicts a view 2020 of the display of the communication badge device illustrating the notifications menu, in accordance with certain embodiments of the present disclosure. The view 2020 may include a "Missions" option including an indicator of two unread missions, a "Messages" option including an indicator of one unread message, and an "Achievements" option. In this instance, the employee may select the "Messages" option.

Figure 21A:
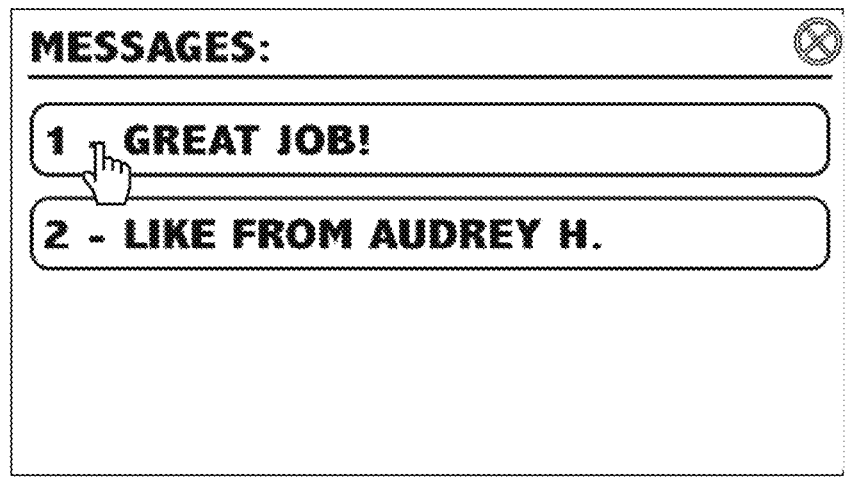
FIG. 21A depicts a view of the display of the communication badge device illustrating a message view, in accordance with certain embodiments of the present disclosure.

FIG. 21A depicts a view 2100 of the display of the communication badge device illustrating a message view, in accordance with certain embodiments of the present disclosure. The view 2100 may include a "Messages" indicator as well as a plurality of messages, each of which may be selected to view the message. In this example, a first message is shown that is accessible by selecting a "1—Great Job!" message option, and a second message is shown that is accessible by selecting a "2—Like from Audrey H." message option. The employee may select the first message to view the text.

Figure 21B:
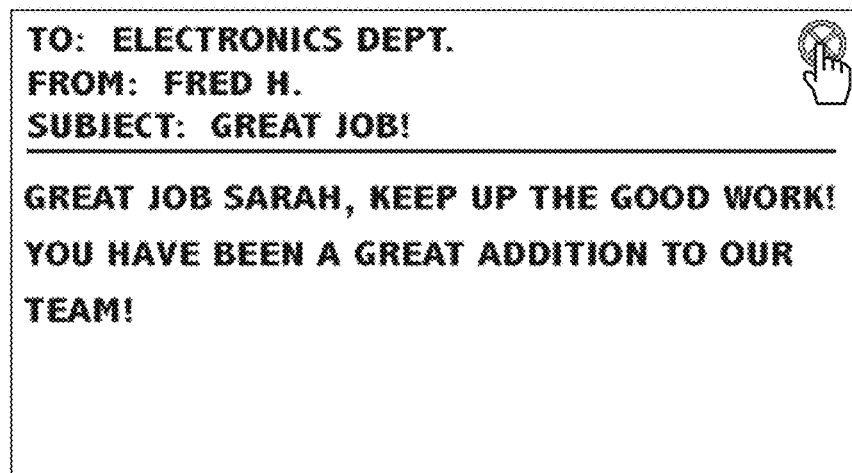
FIG. 21B depicts a view of the display of the communication badge device illustrating a selected message, in accordance with certain embodiments of the present disclosure.

FIG. 21B depicts a view 2120 of the display of the communication badge device illustrating text of a selected message, in accordance with certain embodiments of the present disclosure. The view 2120 may include a message from "Fred H." having a subject heading "Great Job!" and including the following text: "Great Job Sarah, Keep up the good work! You have been a great addition to our team!" Other messages and subject headings are also possible.

In some embodiments, after selection of the first message and after closing of the first message, the view 2100 may be updated. One possible example of an updated messages view is depicted in FIG. 22A.

Figure 22A:
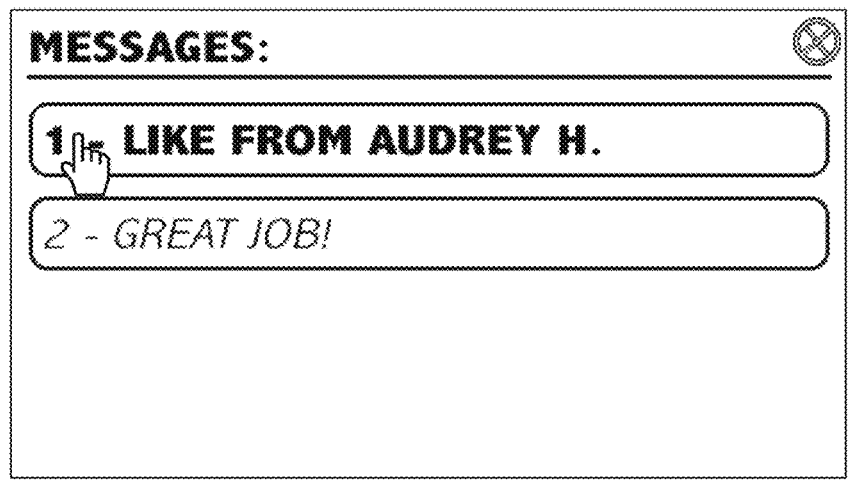
FIG. 22A depicts a view of the display of the communication badge device illustrating an updated message view after a message has been read, in accordance with certain embodiments of the present disclosure.

FIG. 22A depicts a view 2200 of the display of the communication badge device 102 illustrating an updated message view after a message has been read, in accordance with certain embodiments of the present disclosure. The view 2200 shows that the first message from FIG. 21A has been moved to the second message and is shown as "read", while the unread message is moved to the top. The employee may select the unread message "1—Like from Audrey H." In response to the selection, the display of the communication badge device 102 may be updated to depict the selected message.

Figure 22B:
FIG. 22B depicts a view 2120 of the display of the communication badge device illustrating text of a selected message, in accordance with certain embodiments of the present disclosure.

FIG. 22B depicts a view 2220 of the display of the communication badge device illustrating text of a selected message, in accordance with certain embodiments of the present disclosure. In this example, another co-worker named Audrey voted to "like" the employee's achievement. The employee may then select a "close" option to return to the view 2200 in FIG. 22A.

Figure 23A:
FIG. 23A depicts a view of the display of the communication badge device illustrating a notifications view, in accordance with certain embodiments of the present disclosure.

FIG. 23A depicts a view 2300 of the display of the communication badge device illustrating a notifications view, in accordance with certain embodiments of the present disclosure. The view 2300 may include the "Missions" option with an indicator related to a number of unread missions, a "Messages" option with an indicator related to a number of unread messages, and an "Achievements" option. The employee may select the "Achievements" option.

Figure 23B:
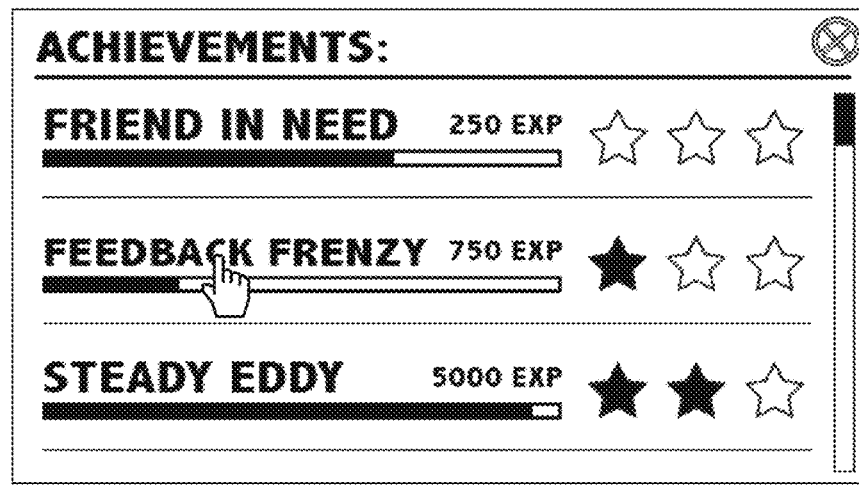
FIG. 23B shows a view of the display of the communication badge device illustrating an achievements view, in accordance with certain embodiments of the present disclosure.

FIG. 23B shows a view 2320 of the display of the communication badge device illustrating an achievements view, in accordance with certain embodiments of the present disclosure. The view 2320 may include an "Achievements" indicator and a list of incomplete achievements and a progress bar indicating the employee's progress toward the achievement. In this example, the incomplete achievements include a "Friend in Need" achievement, completion of which may award 250 experience points and a progress indicator showing three stars; a "Feedback Frenzy" achievement, completion of which may award 750 experience points (and progress indicators (stars) includes three stars (one of which has been earned)); and a "Steady Eddy" achievement, completion of which may award 5000 experience points (and the progress indicator includes three stars (two of which have been earned)).

Figure 24:
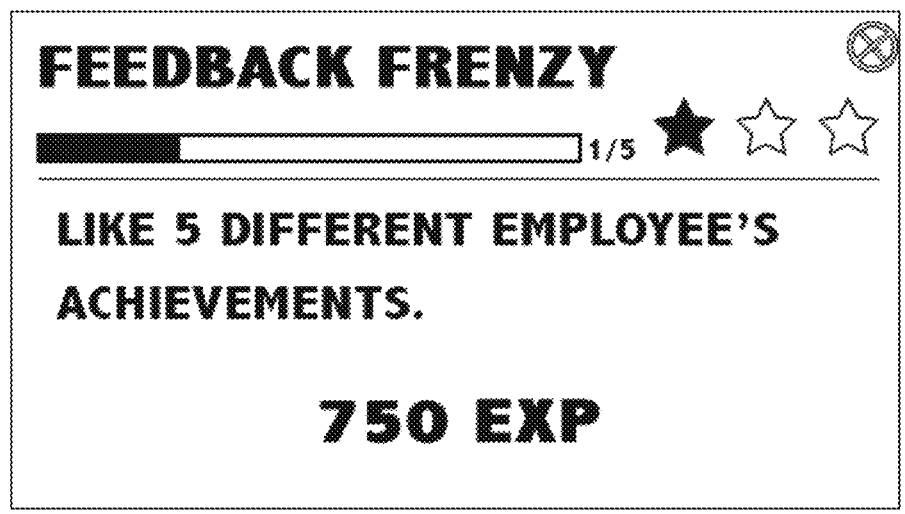
FIG. 24 depicts a view of the display of the communication badge device illustrating requirements of the "Feedback Frenzy" achievement, in accordance with certain embodiments of the present disclosure.

FIG. 24 depicts a view 2400 of the display of the communication badge device illustrating requirements of the "Feedback Frenzy" achievement, in accordance with certain embodiments of the present disclosure. The view 2400 may include an incentive of 750 experience points in exchange for the employee responding to other employees by providing feedback to their achievements. Such feedback can include "kudos" or other feedback.

In the illustrated example, the employee can earn experience points by providing feedback to encourage other employees. In this instance, the employee has provided one feedback response, and four more are needed to complete the "Feedback Frenzy" achievement. Other embodiments are also possible.

It should be appreciated that the views discussed above with respect to FIGS. 11A through 24 represent data and user-selectable options that are exposed to the employee. In addition to such views, the communication badge device 102 may include sensors configured to generate signals proportional to movement of the communications badge device 102, which signals can be analyzed to correlate measurement data to actions. Such signal data may be presented to operators of the HR system 106, the computing device 114, or any combination thereof.

In certain embodiments, multiple sensors including magnetometers, accelerometers, radio frequency transceivers, and so on, some or all of which may be used to determine the orientation and movement of the communication badge device 102. Such sensors may be positioned within the wearable element and may generate electrical signals representing movement. In certain embodiments, such movements may produce electrical signals from multiple sensors that can vary along three axes over time, which electrical signals can be analyzed to determine tasks (or the intensity of activity) performed by an employee wearing the communication badge device 102. One example of electrical signals that may be produced by multiple accelerometers or by a tri-axial accelerometer is described with respect to FIGS. 25A and 25B below.

Figure 25A:
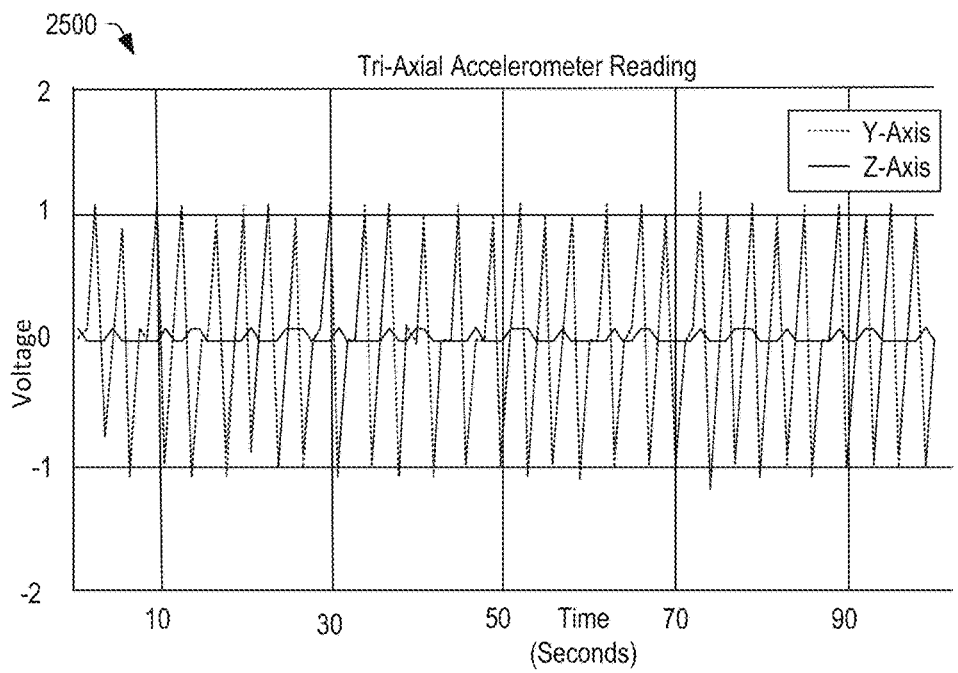
FIGS. 25A and 25B depict graphs of voltage versus time for an accelerometer signal indicating slight turning of the body left or right and returning to forward facing every second, in accordance with certain embodiments of the present disclosure.
Figure 25B:
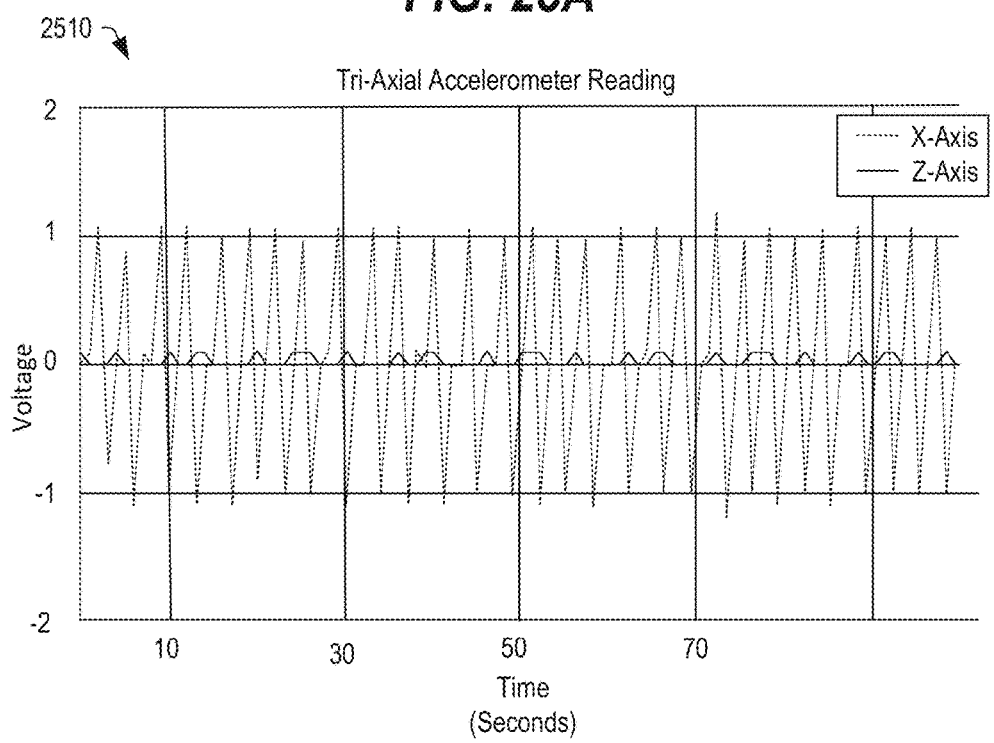

FIGS. 25A and 25B represent graphs of voltage versus time for a accelerometer signal indicating slight turning of the body left or right and returning to forward facing every second according to certain embodiments. Since the movements overlap on two axes, for illustrative purposes, the Y-axis and Z-axis data are presented in FIG. 25A and the X-axis and Z-axis data are presented in FIG. 25B.

Referring to FIG. 25A, the graph 2500 represents movement in a y-direction and a z-direction (concurrently), as measured by a tri-axial accelerometer (or three fixed accelerometers). The graph 2500 can include a first signal representing movement in the y-direction and a second signal representing movement in the z-direction. In the illustrated example, the signal corresponding to movement in the z-direction is close to zero, while the signal corresponding to movements in the y-direction varies between approximately one and minus one volt.

Referring to FIG. 25B, the graph 2510 represents movement in an x-direction and a z-direction (concurrently), as measured by a tri-axial accelerometer (or three fixed accelerometers). The graph 2510 can include a first signal representing movement in the x-direction and a second signal representing movement in the z-direction. In the illustrated example, the signal corresponding to movement in the z-direction is close to zero, while the signal corresponding to movements in the x-direction varies between approximately one and minus one volt. In certain instances, the signal representing movement in the x-direction may be slightly stronger (higher absolute value of the peak voltage) than the signal representing movement in the y-direction in FIG. 25A.

Figure 26A:
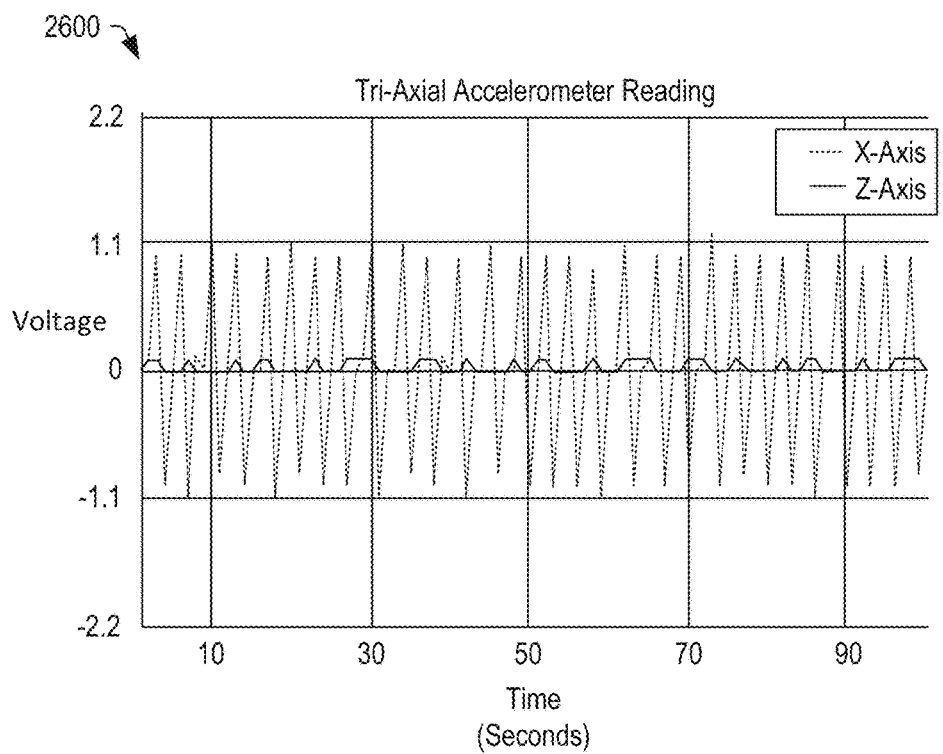
FIGS. 26A and 26B depict graphs of voltage versus time for an accelerometer reading indicating a back-and-forth movement in the "forward facing" axis occurring every second and a back-and-forth movement in the "up/down" axis occurring every few seconds, in accordance with certain embodiments of the present disclosure.
Figure 26B:
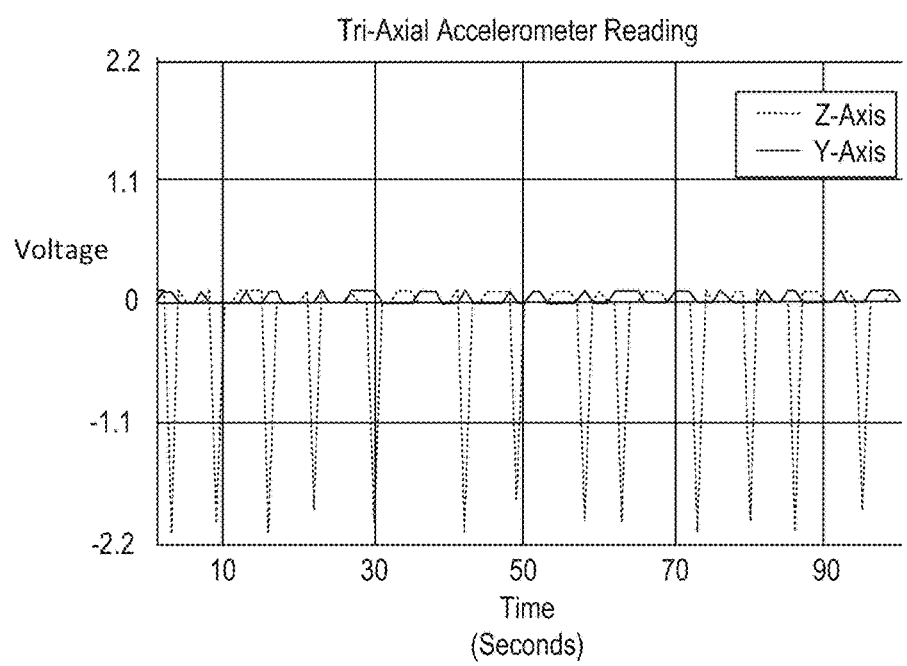

FIGS. 26A and 26B represent graphs of voltage versus time for an accelerometer reading indicating a back-and-forth movement in the "forward facing" axis occurring every second and a back-and-forth movement in the "up/down" (z-direction) axis occurring every few seconds according to certain embodiments. Since the movement data partially overlap on two axes, for illustrative purposes, the X-axis and Z-axis data are presented in FIG. 26A and the Y-axis and Z-axis data are presented in FIG. 26B.

Referring to FIG. 26A, the graph 2600 represents movement in an x-direction and a z-direction (concurrently), as measured by a tri-axial accelerometer (or three fixed accelerometers). The signal representing movement in the x-direction is similar to that of the signals representing movement in FIG. 25A. Movement in the z-direction occurs every few seconds (as determined by the signal), which is much less frequent than the signal corresponding to the back-and-forth movement in the x-direction.

Referring to FIG. 26B, the graph 2610 represents movement in a y-direction and a z-direction (concurrently), as measured by a tri-axial accelerometer (or three fixed accelerometers). The signal representing movement in the y-direction varies within a range of voltages from just above zero to approximately −2 volts. Movement in the z-direction occurs every few seconds (as determined by the signal), which is much less frequent than the signal corresponding to the back-and-forth movement in the y-direction.

Figure 27:
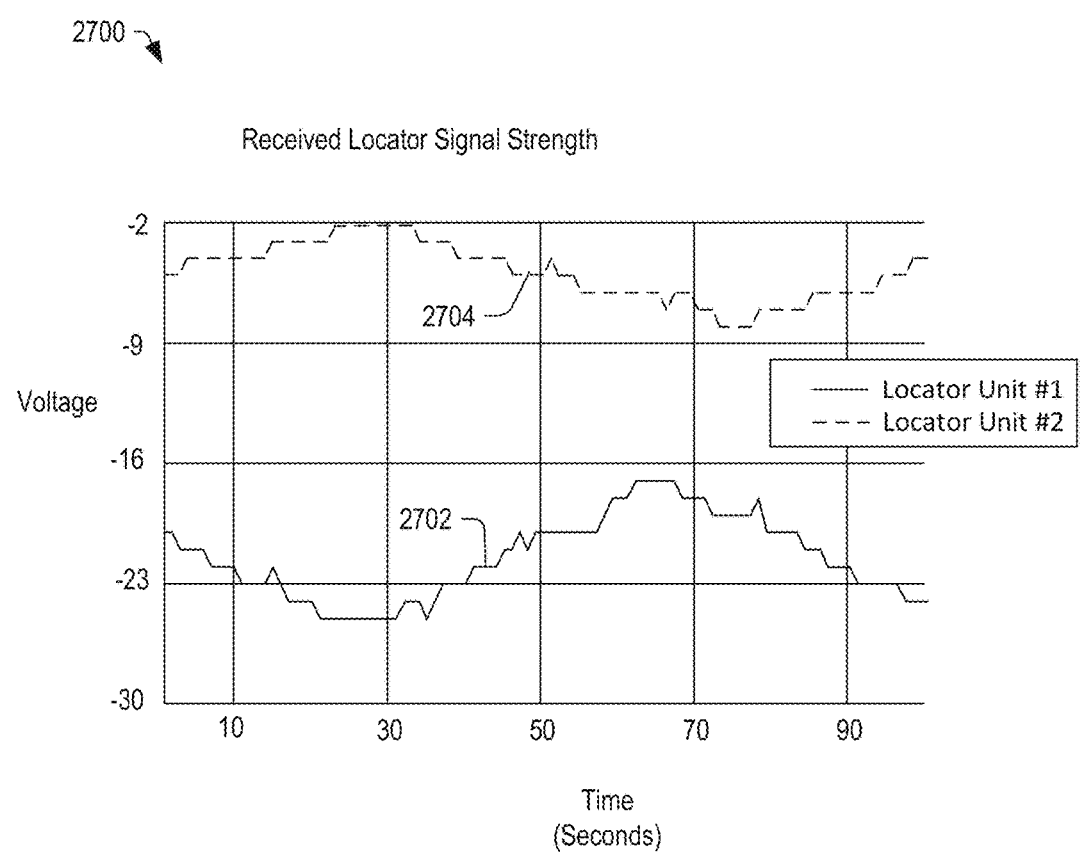
FIG. 27 depicts a graph of voltage versus time for two locator units, in accordance with certain embodiments of the present disclosure.

FIG. 27 depicts a graph 2700 of voltage versus time for two locator units according to certain embodiments. The graph 2700 can include a first signal 2702 corresponding to a first RF signal received from a RF signal source, such as one of the RF signal sources 112 in FIG. 1. The graph 2700 further can include a second signal 2704 corresponding to a second RF signal received from a second RF signal source, such as one of the RF signal sources 112 in FIG. 1. As the employee moves around during the shift, the communication badge device 102 moves closer to or further away from one or the other of the RF signal sources 112, causing the signal strengths to vary over time, which signal strengths may be determined from the received signal strengths.

It should be appreciated that the communication badge device 102 may be worn by an employee or may be attached to any moving object, person, or animal. In an example, the communication badge device 102 can be applied to any moving creature (e.g. pets, service animals, etc.) or moving entity (e.g. factory robot, amusement park ride, etc.). The communication badge device 102 could be attached to anything that has a motion signature that can be recorded, and the processor of at least one of the communication badge device 102, the HR system 106, and the computing device 114 may be trained to identify particular activities or performance of particular tasks based, at least in part, on the motion signature.

Figure 28:
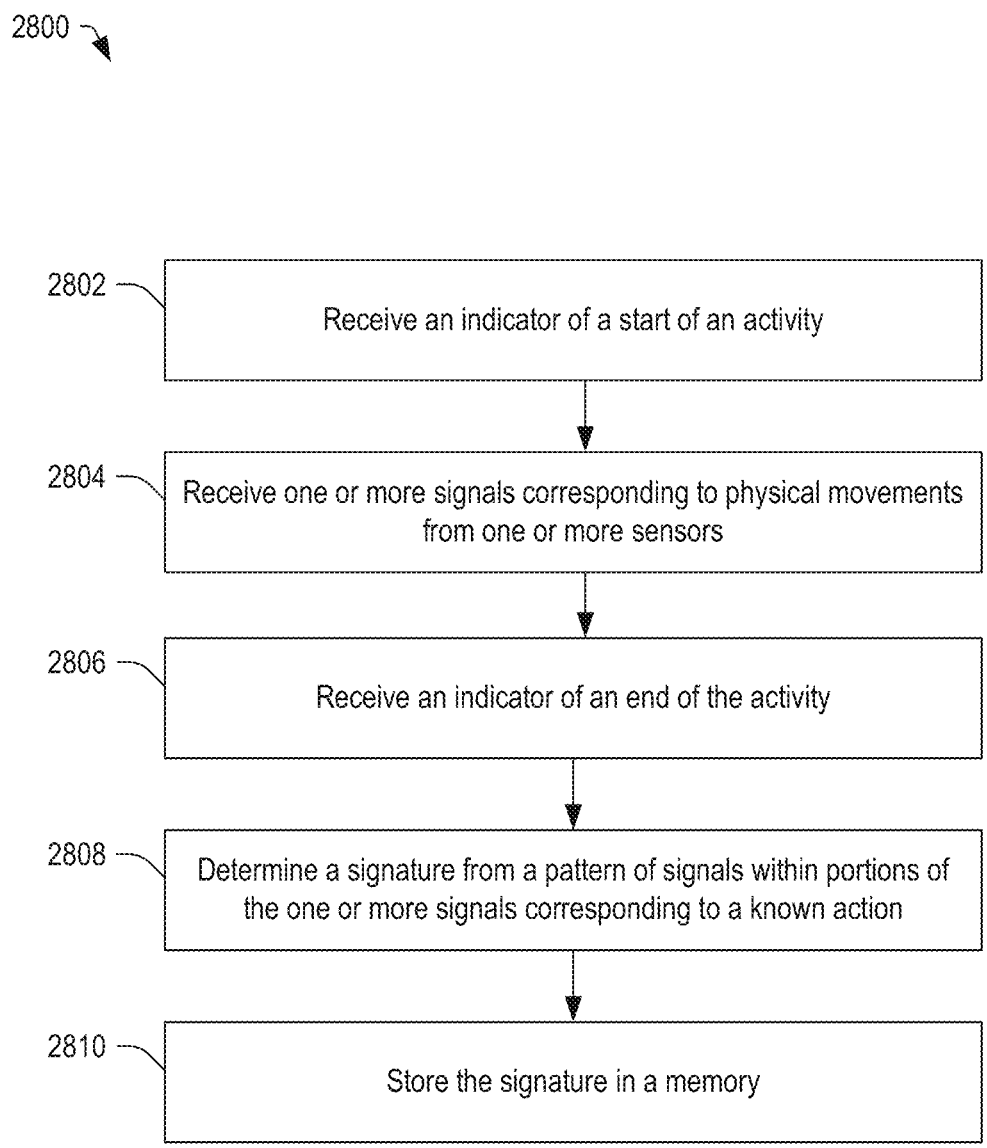
FIG. 28 depicts a flow diagram of a method of determining a motion signature corresponding to physical activity of an employee, in accordance with certain embodiments of the present disclosure.

FIG. 28 depicts a flow diagram of a method 2800 of determining a motion signature corresponding to a physical action (or set of actions), in accordance with certain embodiments of the present disclosure. At 2802, the method 2800 may include receiving an indicator of a start of an activity. The indicator may be related to the employee selecting a button indicating acceptance of a mission or task by interacting with the interface of communication badge device 102.

At 2804, the method 2800 may include receiving one or more signals corresponding to physical movements from one or more sensors. The one or more signals may be received at a processing circuit, such as a processor configured to analyze data to identify signal patterns indicative of actions taken by a user. In some embodiments, the one or more signals may be received at an inertial measurement unit (IMU). In certain embodiments, the one or more signals may include signals corresponding to motion in an x-direction, a y-direction, a z-direction, or any combination thereof, from a magnetometer circuit, an accelerometer circuit, another motion detection circuit, or any combination thereof.

Continuing to 2806, the method 2800 can include receiving an indicator corresponding to an end of the activity. The indicator may be an input signal received from a communication badge device 102 based on user selections of selectable elements of an interface. The indicator can relate to pausing of a mission or task, resuming or ending of a mission or task, or any combination thereof.

At 2808, the method 2800 may include determining a signature from a pattern of signals within portions of the one or more signals corresponding to a known action. The signature may include multiple data points over a period of time, such as a few seconds, which data points may be collected from multiple sensors of the same type or of different types. Further, the data may correspond to movements in various directions. The pattern of signals may correspond to a pattern that is repeated or substantially repeated each time a user performs a particular physical task, such as walking, mopping, etc. In certain embodiments, the patterns may be determined through a training process that may include providing pre-configured training sets to the system, calibrating the communication badge device 102 to a particular user's movements, or any combination thereof. Once the pattern is determined, the method 2800 may include storing the signature in a memory, at 2810.

In certain embodiments, each task or activity can have a unique signature comprised of a plurality of signal patterns corresponding to multiple movement axes. In certain embodiments, during a training process, a user may initiate a "task learning" operation using a smart phone, tablet, or other computing device or by pressing a button or interacting with an interface of the communication badge device 102 or the base unit 108. After initiating the task learning operation, the user may perform a selected task while wearing the communication badge device 102. The communication badge device 102 may capture movement data corresponding to the performance of the task, and may provide the data to a computing device, which may correlate the data to the task-related signals to produce a task signature. The system may store the task signature. Subsequently, the system may compare received data to a plurality of task signatures in memory to identify portions of the data corresponding to a task signature. This correspondence may be used to determine a user's actions during a period of time, such as a work shift.

Further, in some embodiments, rather than motion data, the system may be configured to analyze audio data to determine audio interactions between the employee and another person. Other embodiments are also possible.

Figure 29:
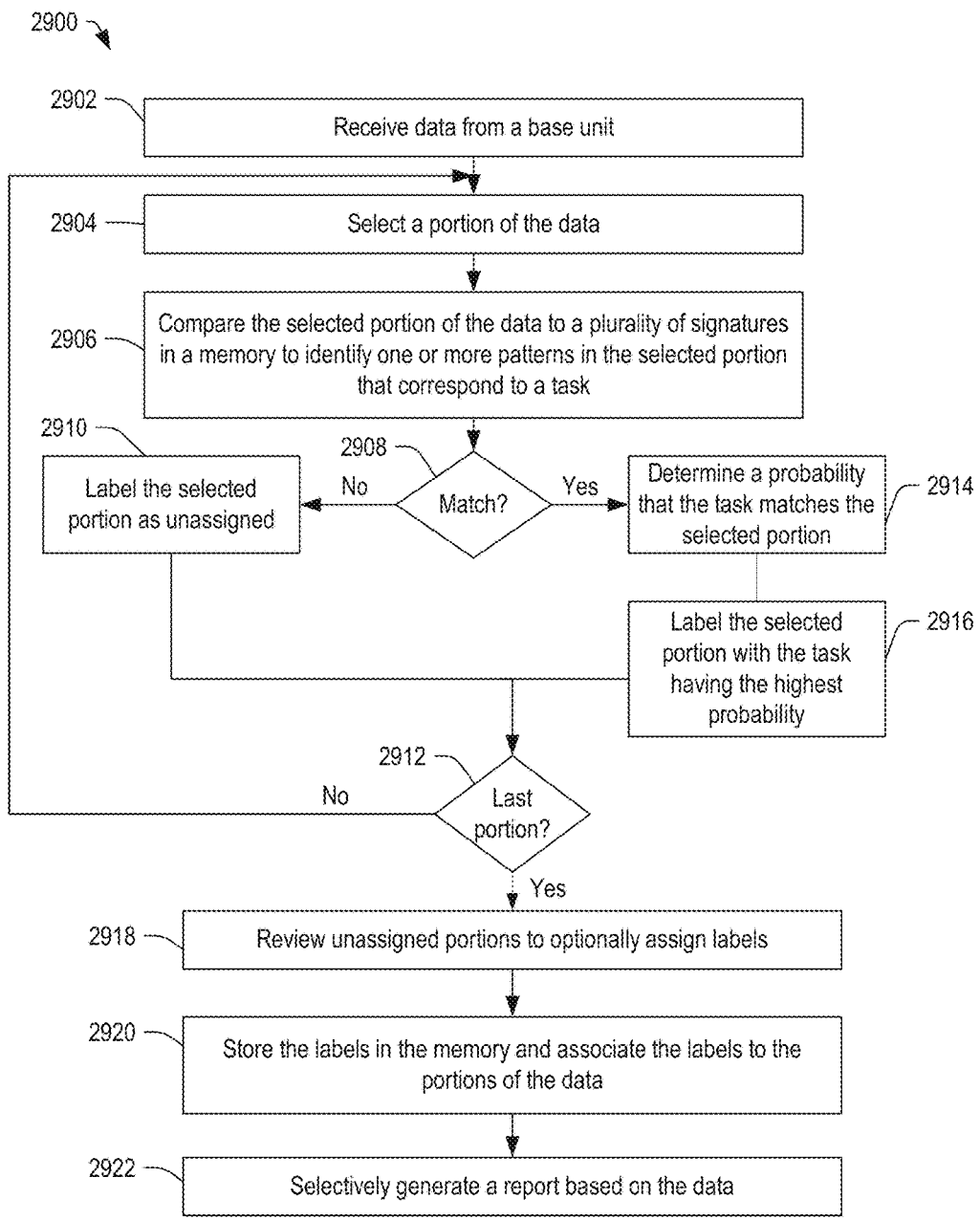
FIG. 29 depicts a flow diagram of a method of generating a report based on labels applied to portions of received data, in accordance with certain embodiments of the present disclosure.

FIG. 29 depicts a flow diagram of a method 2900 of determining actions based on movement data and stored signatures according to certain embodiments. At 2902, the method 2900 may include receiving data from a base unit, such as base unit 108 in FIGS. 1 and 2. In certain embodiments, the data may be received at the HR system 106, a management application, a smart phone, a tablet computer, another computing device, or any combination thereof. In certain embodiments, the data may be received at a circuit of the base unit 108 from a docking portion of the base unit 108, which docking portion may be coupled to one or more communication badge devices 102 in order to receive the information.

Advancing to 2904, the method 2900 may include selecting a portion of the data. The portion may be a number of bits, a number of data points, a pre-determined time window, or some other portion of the data. Continuing to 2906, the method 2900 may include comparing the selected portion to a plurality of signatures (action or motion signatures) in a memory to identify one or more patterns within the selected portion that corresponds to a task.

Moving to 2908, if there is no pattern match within the selected portion, the method 2900 may label the selected portion as "unassigned", at 2910. The method 2900 may determine if the portion is the last portion, at 2912. If not, the method 2900 returns to 2904 to select a next portion.

Returning to 2908, if the selected portion matches one or more of the signatures, the method 2900 may determine a probability that the task matches the selected portion, at 2914. Each user may move differently with respect to performance of a given task, and the motion signatures may have some commonalities and some differences, which may introduce errors in the match process.

Proceeding to 2916, the method 2900 may include labeling the selected portion with the task having the highest probability. In certain embodiments, a plurality of motion signals may correspond to multiple possible actions. However, by comparing the group of signals to the motion signatures, several possible candidates with differing degrees of probability may be determined, and the highest probability may be selected. In certain embodiments, the probabilities between two candidate tasks may be within a margin of error. In certain embodiments, the selected portion may be stored in a short term memory (such as within a cache memory device) and may be assigned the task based on the probabilities of actions immediately surrounding the task, making it possible to disambiguate similar actions based on surrounding motion activity. In an example, a task of emptying a trash can may be preceded and followed by walking activity, while vacuuming, mopping and other actions may have similar action-related signals that can differ slightly from the selected signals, but which may be similar and which can be used to disambiguate an unusual action sandwiched between actions that can be easily detected.

Moving to 2912, if the selected portion is not the last portion of the data, the method 2900 again returns to 2904 and a next portion of the data may be selected. Otherwise, the method 2900 may include reviewing unassigned portions of the data to optionally assign labels, at 2918. In certain embodiments, the unassigned portions of the data may be surrounded by labeled activities making it relatively easy to assign a label to such unassigned activities. For example, picking up a piece of trash within a sequence of actions that have been labeled mopping or vacuuming may present an unusual combination of signals, which the end user may assign to the category of mopping, in that particular instance, in order to classify the action in the larger context of the actions performed. Other labels are also possible.

Continuing to 2920, the method may include storing the labels in the memory and associating the labels with or to the portions of the data. The method 2900 may further include selectively generating a report based on the data, at 2922. For example, extended periods of inactivity may cause the system to generate an alert, which may be sent via electronic message, printed message, audio signals, or another format. Other reports are also possible, such as a report indicating a particularly productive worker, a report indicating a difficult work issue, a report indicating poor form or potentially dangerous actions, etc.

In some embodiments, in addition to or in lieu of motion, audio data may be analyzed to determine particular activities. The tonality of the audio data may have a sound signature that corresponds to a particular action, such as lawn mowing, vacuuming, blowing leaves, and so on. Such sounds may be used to determine particular activities. Further, in some embodiments, the audio data may be analyzed to detect two or more speakers and to determine interactions between an employee and a customer, between employees, and so on.

Figure 30:
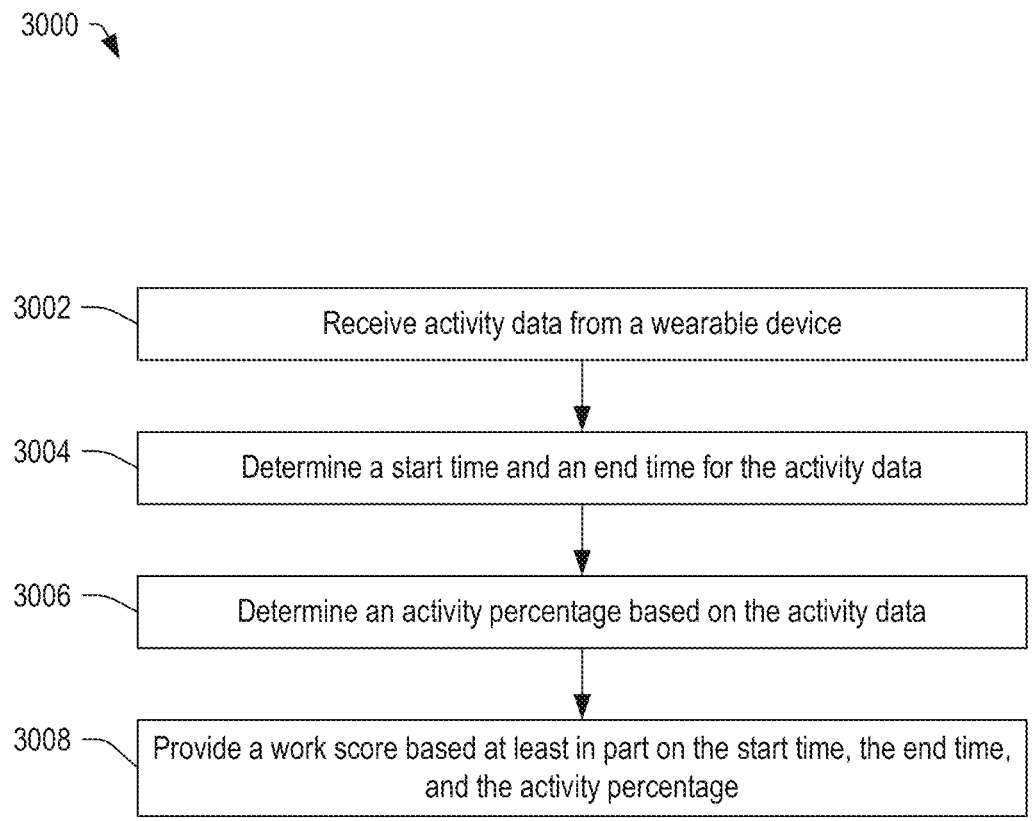
FIG. 30 depicts a flow diagram of a method of determining motion signature corresponding to a physical action (or set of actions), in accordance with certain embodiments of the present disclosure.

FIG. 30 depicts a flow diagram of a method 3000 of determining a work score of an employee, in accordance with certain embodiments of the present disclosure. At 3002, the method 3000 may include receiving activity data from a wearable device. The activity data may include movement data, location data, time information, and other information. Further, the activity data may relate to work activities, sports activities, inventory, exercise activities, and so on.

At 3004, the method 3000 can include determining a start time and an end time for the activity data. In some embodiments, the start time may be stored at check in and the end time may be determined at check out. By interacting with the base unit 108 to sign in to retrieve a communication badge device 102 and to sign out to return the communication badge device 102, the base unit 108 may automatically log the start and end times.

At 3006, the method 3000 may include determining an activity percentage based on the activity data. The activity percentage may include a percentage of time spent performing activities between the start and end times and may include activity intensity. At 3008, the method 3000 can include providing a work score based at least in part on the start time, the end time, and the activity percentage. Other embodiments are also possible.

Figure 31:
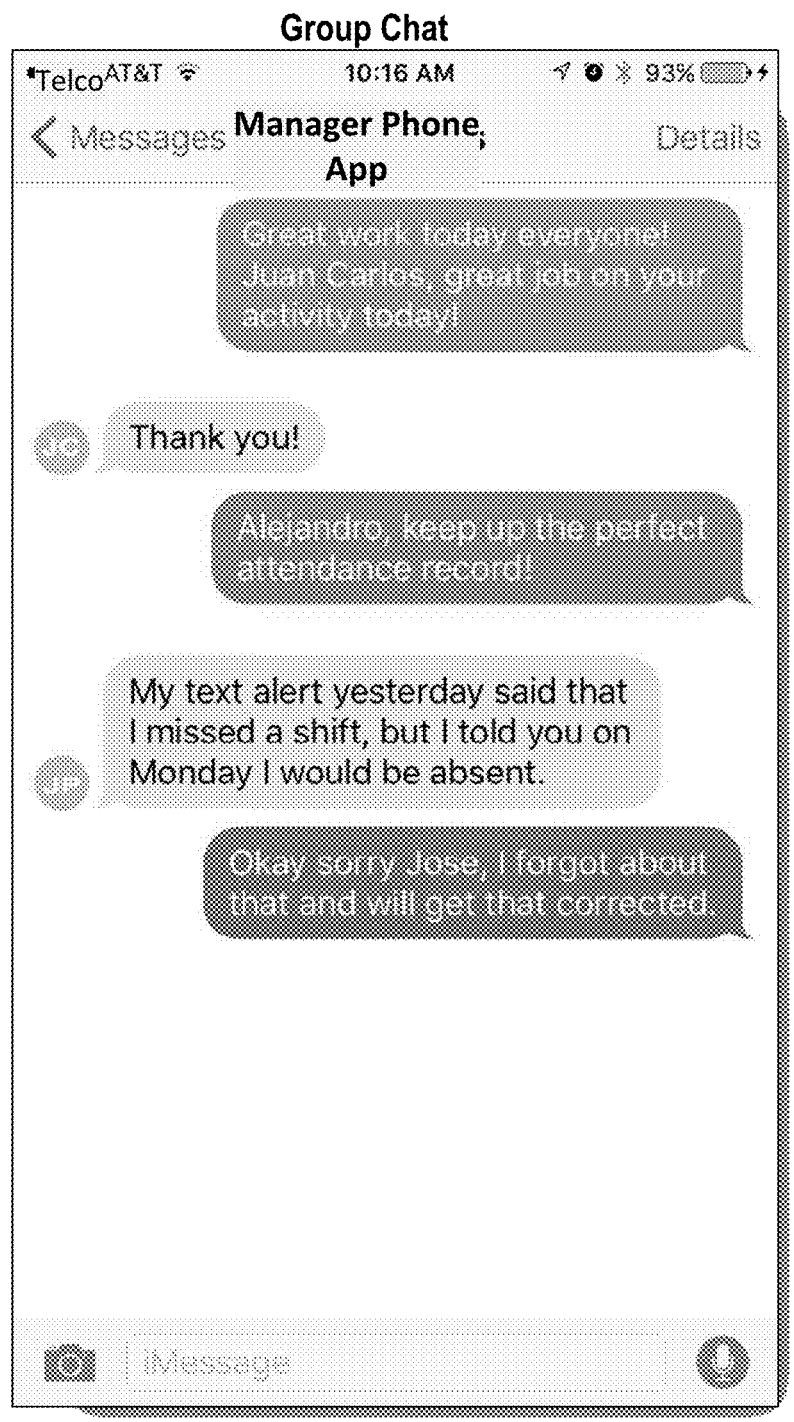
FIG. 31 depicts a message interface of a manager application executing on a computing device, in accordance with certain embodiments of the present disclosure.

FIG. 31 depicts a message interface 3100 of a manager application 116 executing on a computing device 114, in accordance with certain embodiments of the present disclosure. The message interface 3100 may resemble a text message functionality that is standard to a smart phone. In a particular example, a processor of the computing device 114 may execute the manager application 116 to enable messaging between the computing device 114 and a communication badge device 102 worn by and checked out to an employee.

In this example, a manager may interact with the manager application 116 to send a group message and to receive responses from one or more of the communication badge devices 102 or from another computing device associated with the employee. Other embodiments are also possible.

In this particular example, the message interface 3100 may include text messages from a manager to all of the employees and to Alejandro and Jose, specifically. The employees can also interact with the supervisor via the communication badge device 102 or by logging into a social media site using a computing device or his or her smart phone. Other embodiments are also possible.

In certain examples, the positive and encouraging interaction between the supervisor and his or her employees can include identify specific items that may encourage others to perform similarly. By providing a group interaction where all of the employees can see the encouragement, the interface (backed by the system) may encourage other employees to improve their work habits or to make a greater effort, since such efforts may be recognized.

FIG. 32 depicts a table of employee schedule information within an interface 3200 of a manager application executing on a computing device, in accordance with certain embodiments of the present disclosure. The interface 3200 may include a plurality of user-selectable options, such as tabs, buttons, and clickable links. In some embodiments, the tabs may include a "Home" tab, a "Schedule" tab, a "Missions Wizard" tab, an "Achievements Wizard" tab, a "Messages" tab, and an "Employees" tab. Further, the interface 3200 may include a selectable menu with a Table View currently selected. Further, the interface 3200 may include a "Schedule Wizard" button and an "Edit Schedule" button. In the illustrated example, the schedule is depicted in a table form.

Figure 33:
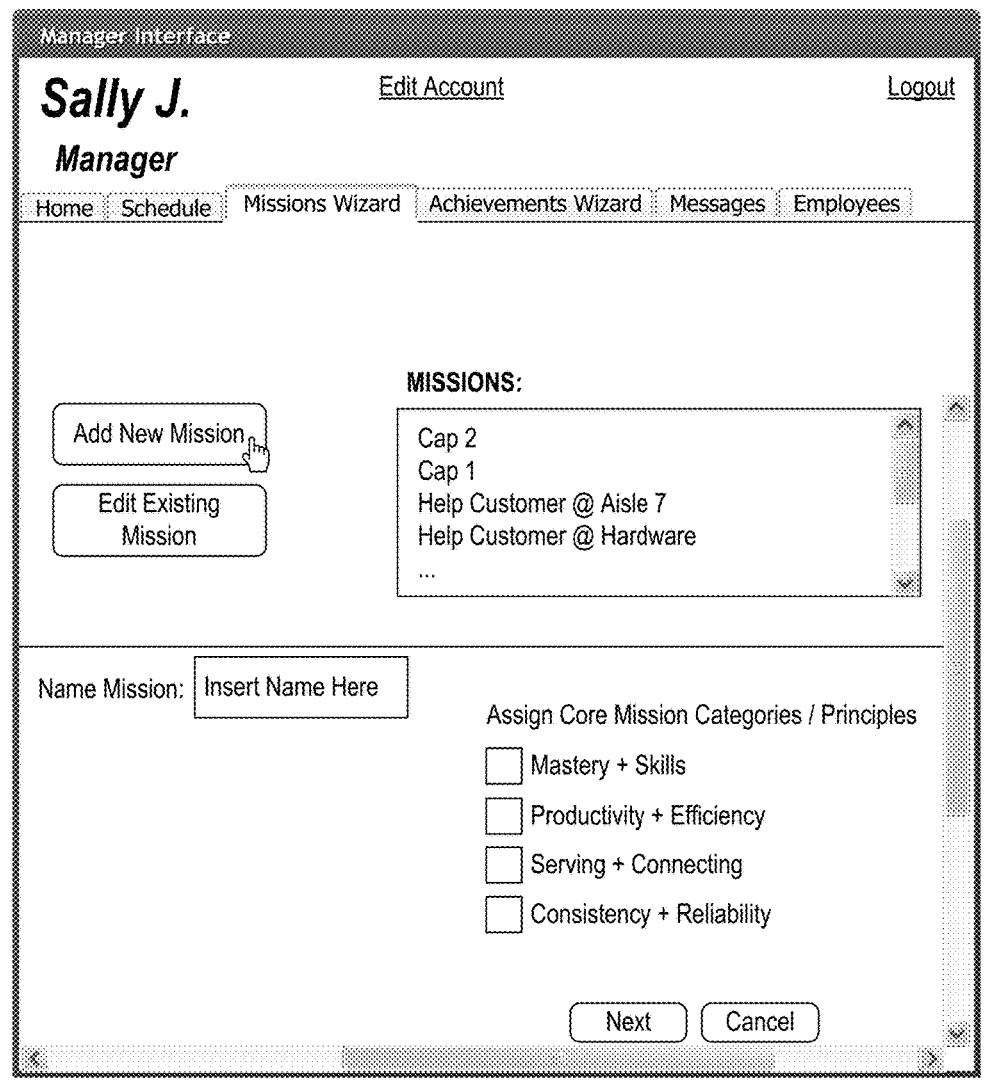
FIG. 33 depicts a selected missions wizard within an interface of a manager application executing on a computing device, in accordance with certain embodiments of the present disclosure.

FIG. 33 depicts a selected missions wizard 3300 within an interface of a manager application executing on a computing device, in accordance with certain embodiments of the present disclosure. The missions wizard 3300 may include a first selectable option (labeled "Add New Mission"), a second selectable option (labeled "Edit Existing Mission"), and a text box including a list of missions. The missions wizard 3300 may further include a text field configured to receive a name for a newly created mission. Further, in some embodiments, the missions wizard 3300 may include one or more check-boxes that may be accessed by the user to assign mission categories and principles for each mission.

In some embodiments, the missions wizard 3300 may be accessed by the manager to create a new mission, which may then be published to the various communication badge devices 102 so that one or more of the employees may assume responsibility for the mission. Other embodiments are also possible.

Figure 34:
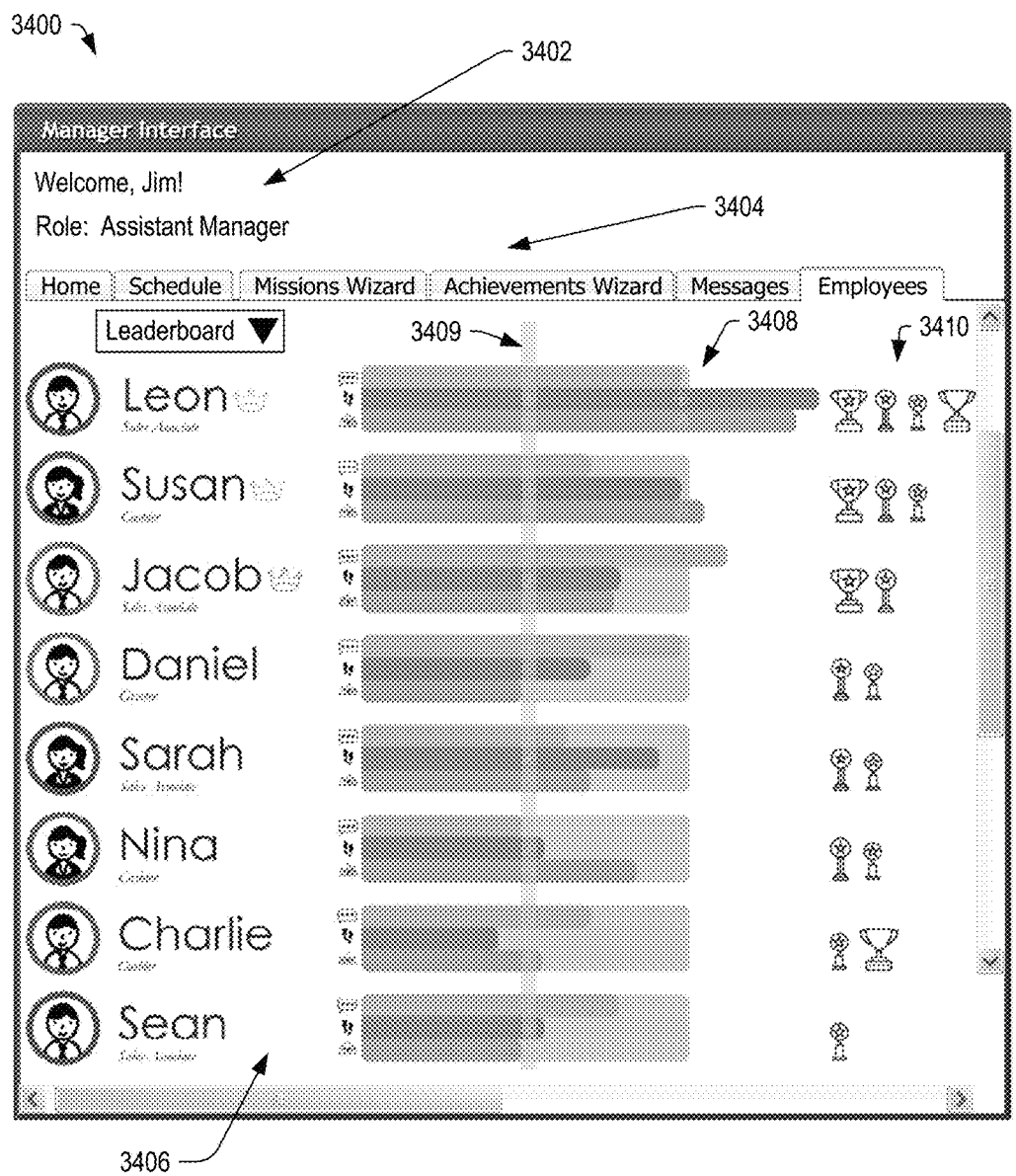
FIG. 34 depicts an employee leaderboard within an interface of a manager application executing on a computing device, in accordance with certain embodiments of the present disclosure.

FIG. 34 depicts an employee leaderboard 3408 within an interface 3400 of a manager application 116 executing on a computing device 114, in accordance with certain embodiments of the present disclosure. The interface 3400 may include a first panel 3402 that can display the identity of the authenticated user and can include a plurality of user-accessible options, such as tabs 3404. The interface 3400 can include an "Home" tab, a "Schedule" tab, a "Missions Wizard" tab, an "Achievements" tab, a "Messages" tab, and an "Employees" tab.

In some embodiments, by selecting one of the tabs 3404, information presented in the display panel 3406 may be changed. In the current example, the user has selected the "Employees" tab from the plurality of tabs 3404, and the interface has display a leaderboard 3408 of the employees. The leaderboard 3408 depicts three categories of activities deemed important by management: 1) employee/customer interactions; 2) employee activity percentage; and 3) time and attendance. An average line is depicted at 3409, making it easy for management to visualize how a particular employee is performing relative to the average.

Further, a plurality of awards or achievements 3410 are depicted next to those employees who have earned rewards based on their performance. Each symbol may reflect a different type of achievement, such as a bonus, a certificate, an award, and so on. In some embodiment, each symbol may reflect a bonus level achieved by an employee. Other embodiments are also possible.

In a particular example, a similar interface may be accessible to the employee, which may show information particular to the employee but leaving out information about other employees. In some examples, the employee interface may depict the leaderboard of employees without showing the awards (except for those awards provided to the particular employee). Further, the employee version of the interface may provide day-to-day and monthly reports that allow the user to see his or her performance in various visualizations, including pie charts, line graphs and other visualizations to facilitate analysis of performance. Other embodiments are also possible.

Figure 35:
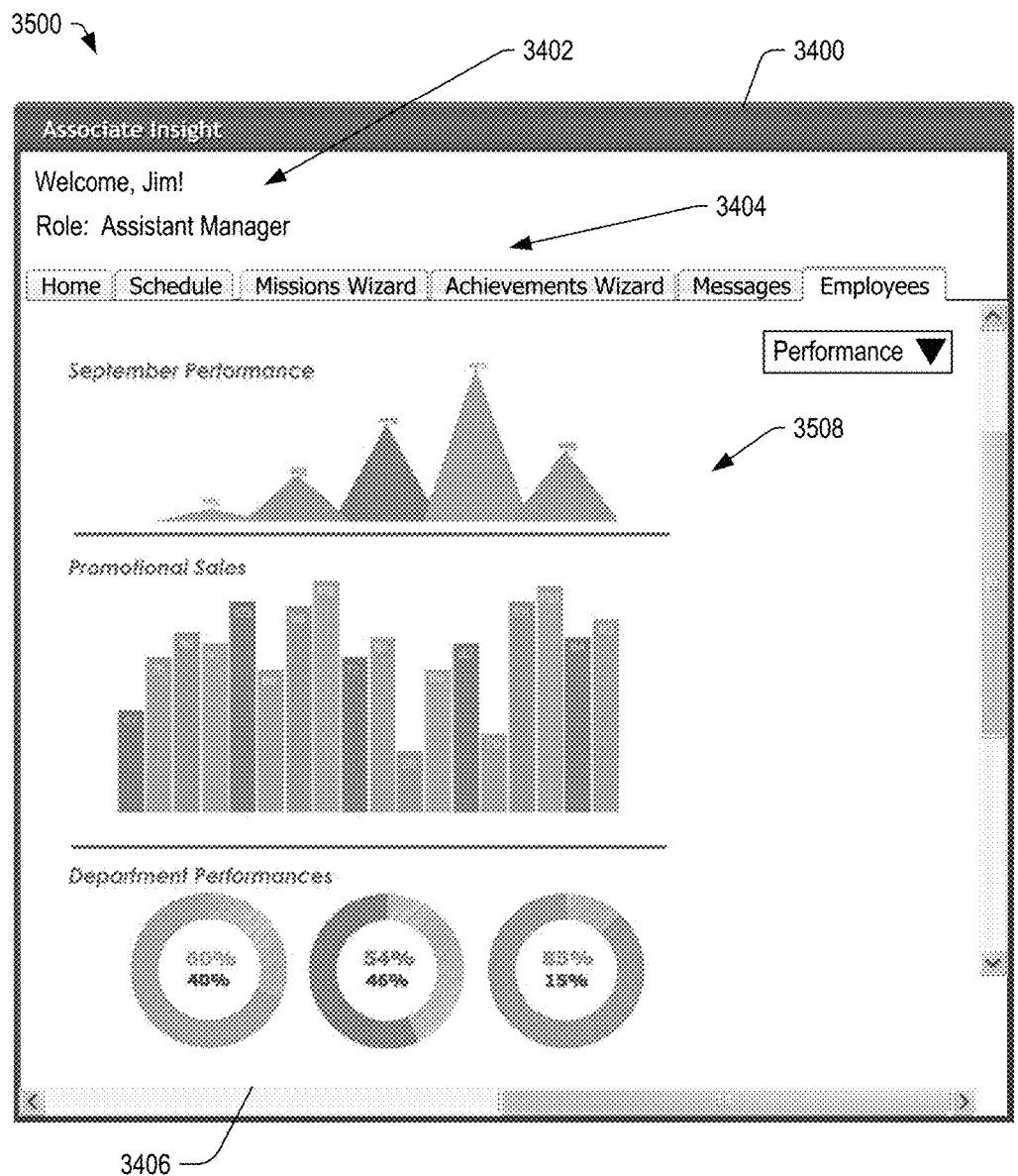
FIG. 35 depicts an employee interface of a manager application accessible by a supervisor to view monthly reporting information, in accordance with certain embodiments of the present disclosure.

FIG. 35 depicts an employee interface 3500 of a manager application accessible by a supervisor to view monthly reporting information 3508, in accordance with certain embodiments of the present disclosure. In some embodiments, the interface 3500 may include a pull-down menu, which may be selected by the manager to view employee data in a variety of different visualizations.

Figure 36:
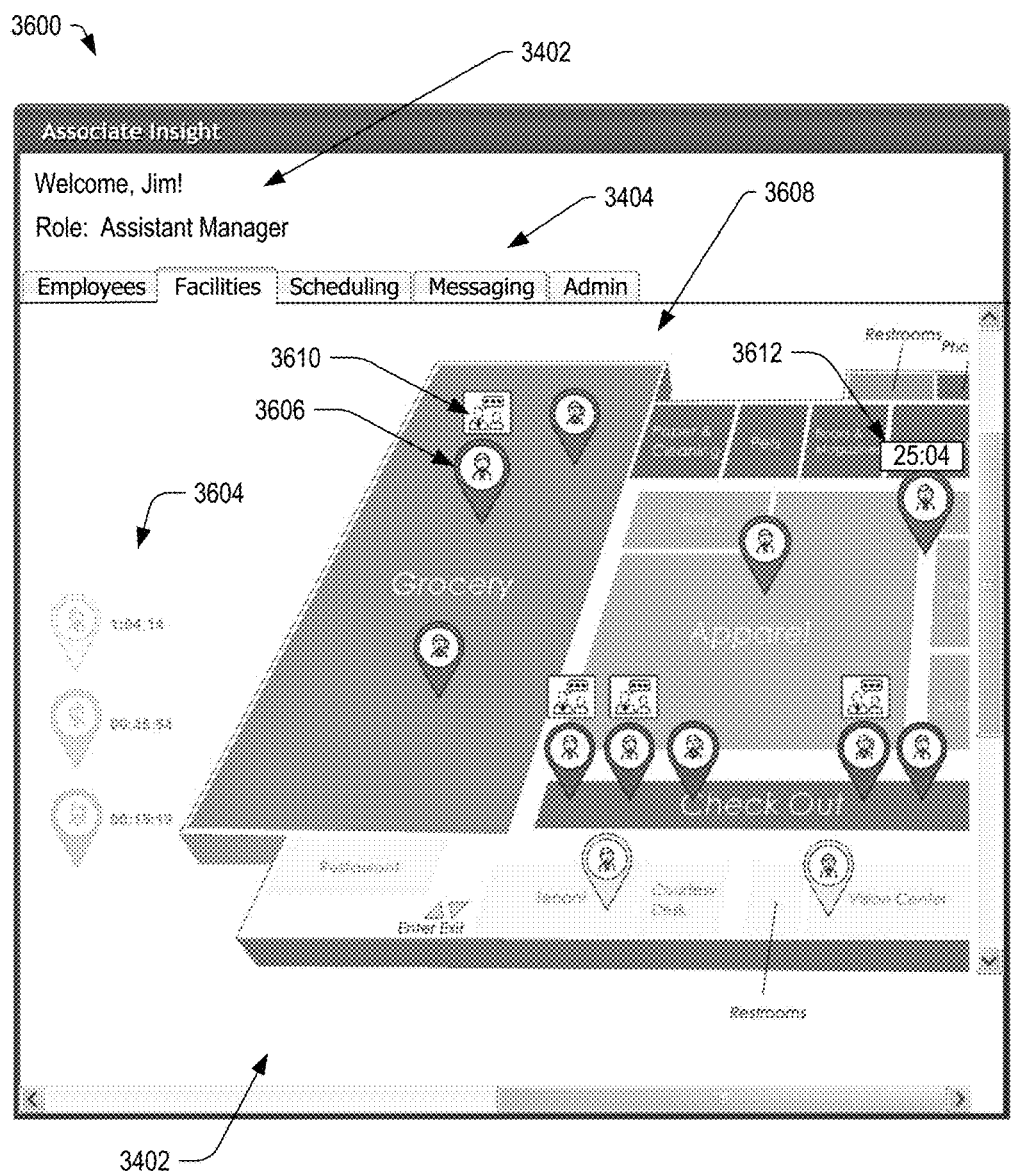
FIG. 36 depicts an interface of a manager application accessible by a supervisor to view a facility layout depicting positions of employees based on data from the communication badge device, in accordance with certain embodiments of the present disclosure.

FIG. 36 depicts a facilities view 3600 of the interface 3400 of FIG. 34 including a facility layout 3608 depicting positions of employees, such as an employee generally indicated at 3606 based on data from the motion tracking badge, in accordance with certain embodiments of the present disclosure. In some embodiments, the status of the location and activity associated with each user wearing a communication badge device 102 is overlaid on the facility layout 3608. Users that are engaged in conversation, such as user 3606, are also shown with a conversation bubble 3610 adjacent to the marker on the facility layout 3608. Users that have stepped outside for a break are depicted at 3604 with corresponding times, which may indicate how long the particular wearable element has been at that location. An extended break may indicate that the employee has dropped his or her employee badge. Further, in the illustrated example, a user that is supposed to be in the grocery section of the facility layout 3608 has been away from the assigned area for 25 minutes, as indicated at 3612.

In some embodiments, the facility layout 3608 and the associated location information for each employee (communication badge device 102) may be leveraged to implement a "Find a store associate" feature, which may be included in a brand's mobile application that can be downloaded and executed on a customer's mobile device. Other embodiments are also possible.

Figure 37:
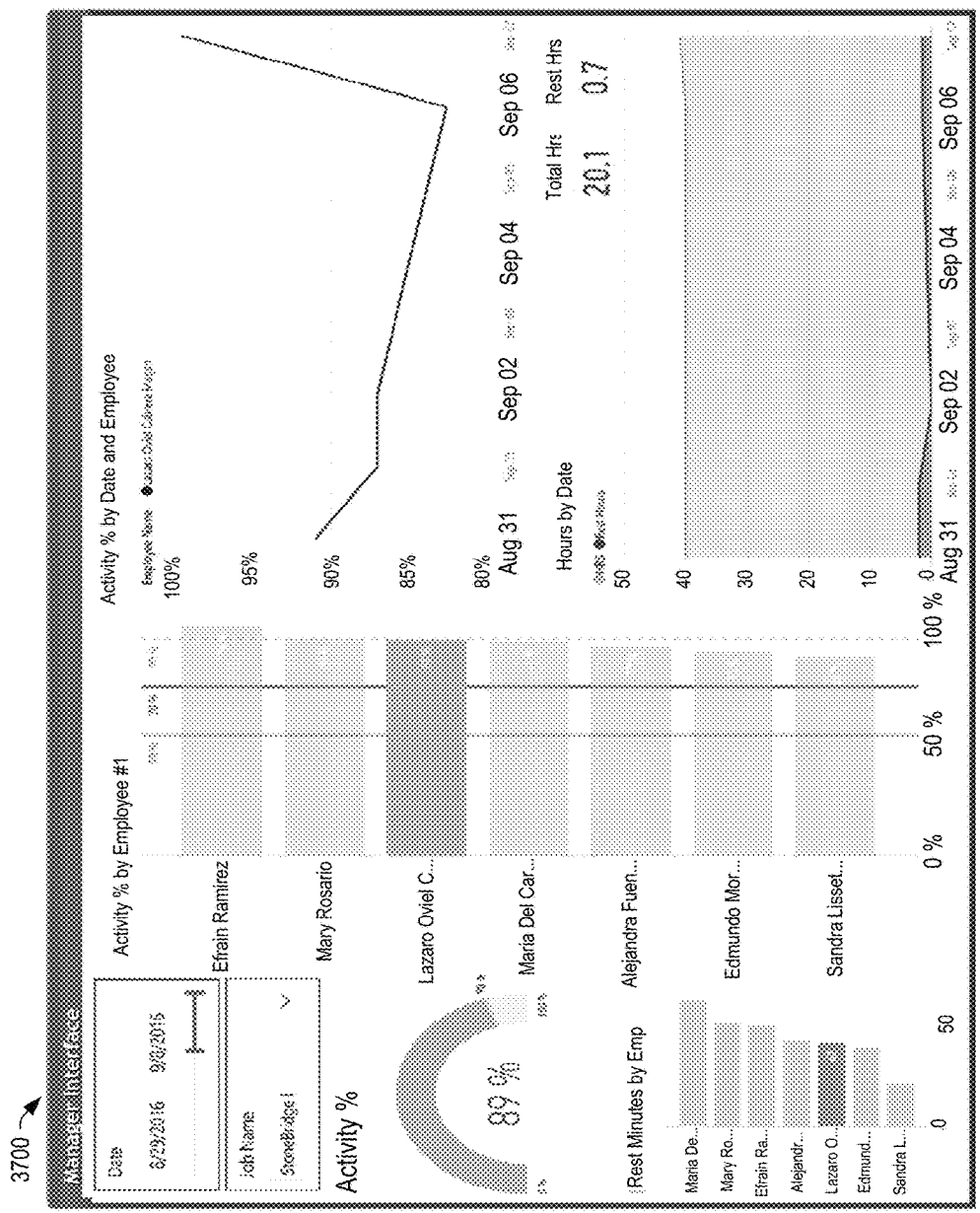
FIG. 37 depicts an interface of a manager application depicting employee information based on data collected from multiple communication badge devices, in accordance with certain embodiments of the present disclosure.

FIG. 37 depicts an interface 3700 of a manager application showing employee information based on data collected from multiple communication badge devices, in accordance with certain embodiments of the present disclosure. In the illustrated example, the manager interface 3700 depicts data related to employee #1, showing the employee's percentage of activity by date, as well as comparative activity data that depicts the relative activity of the selected employee (employee #1) as compared to other employees. The interface 3700 further depicts the number of hours worked by the employee over a window of time as well as the number of rest minutes (during work shifts). Other embodiments are also possible.

Figure 38:
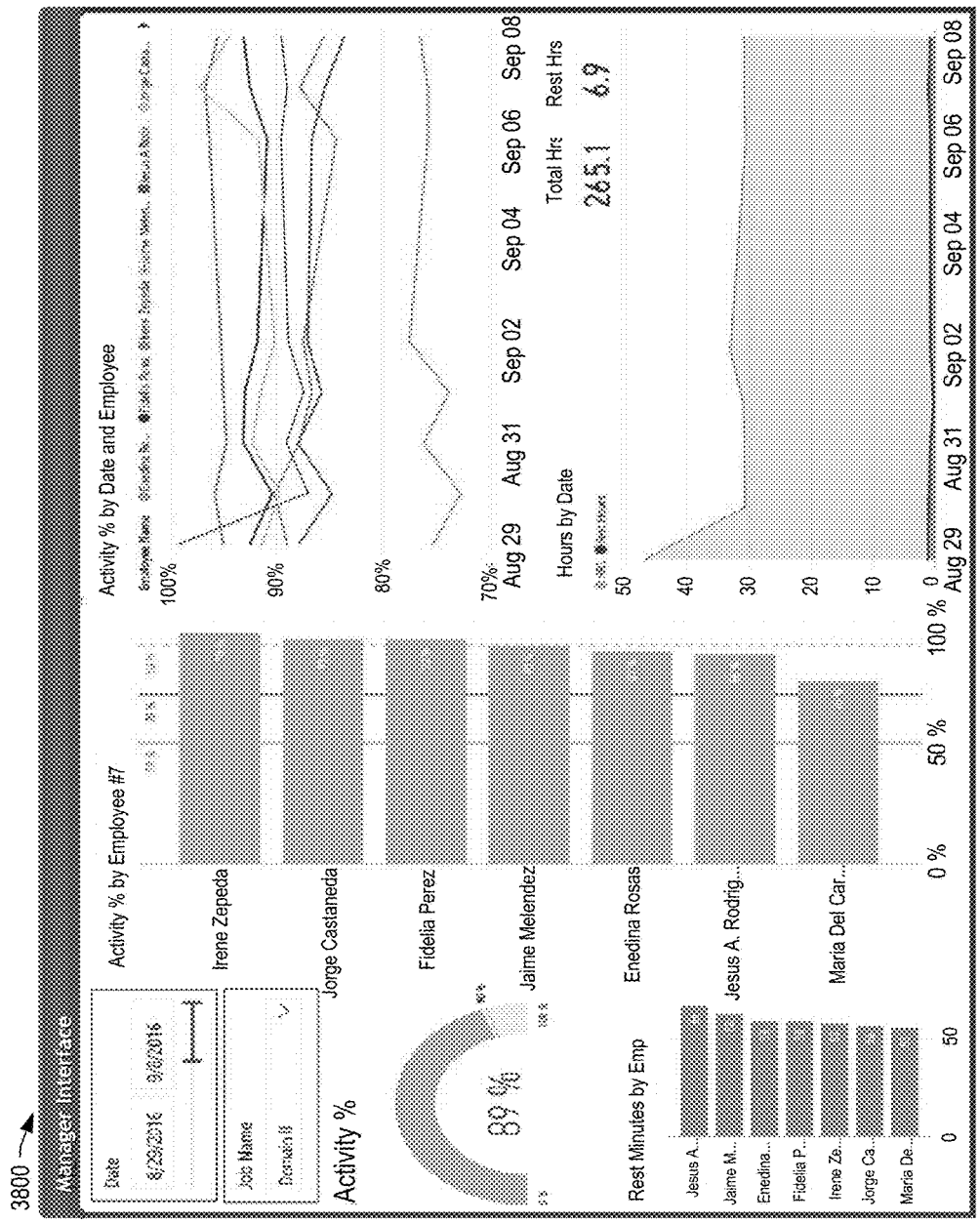
FIG. 38 depicts an interface of a manager application depicting employee information based on data collected from multiple communication badge devices, in accordance with certain embodiments of the present disclosure.

FIG. 38 depicts an interface 3800 of a manager application showing employee information based on data collected from multiple communication badge devices, in accordance with certain embodiments of the present disclosure. In the illustrated example, the manager interface 3800 depicts data related to employee #7, showing the employee's percentage of activity by date, as well as comparative activity data that depicts the relative activity of the selected employee (employee #7) as compared to other employees. The interface 3800 further depicts the number of hours worked by the employee over a window of time as well as the number of rest minutes (during work shifts). Other embodiments are also possible.

It should be understood that the interface 3700 of FIG. 37 and the interface 3800 of FIG. 38 may represent examples of the the manager interface through which a manager may review employee performance. In some embodiments, the selection of the employee may determine the "peers" against which the employee's performance is compared. For example, in a large enterprise, employees that work within a certain department and at a certain level within that department may be compared with employees within the same department and at the same level within other stores. Other embodiments are also possible.

In the illustrated examples of FIGS. 37 and 38, the manager interface may be accessed by a manager to review employee performance. If an enterprise includes multiple stores, the manager interface may include a pulldown or drop down menu from which the manager may select a store, and the interface may display data corresponding to the employees at the particular location. Other embodiments are also possible.

Figure 39:
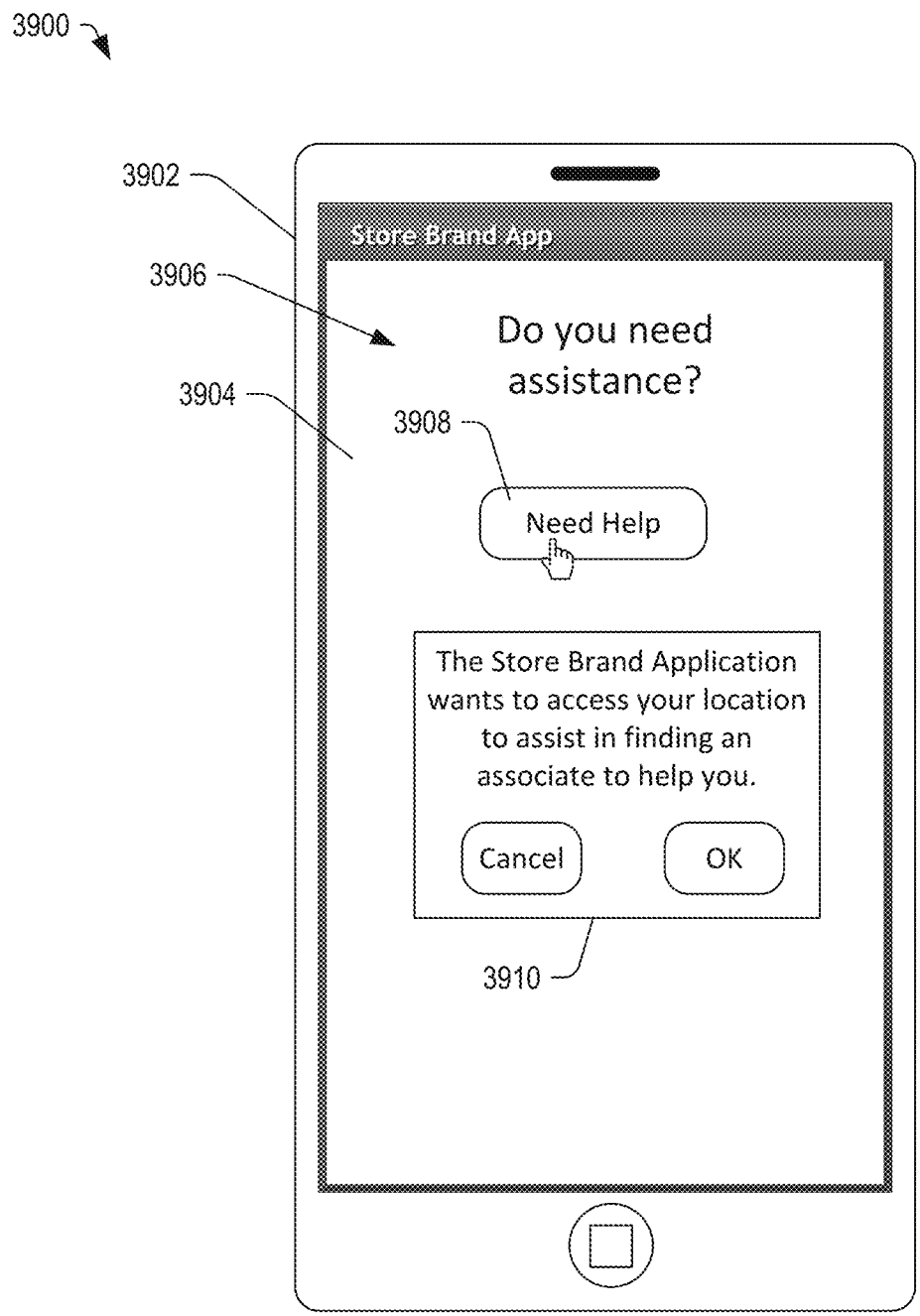
FIG. 39 depicts a system including a computing device executing a store brand application including an interface accessible by a consumer to request help from a store associate, in accordance with certain embodiments of the present disclosure.

FIG. 39 depicts a system 3900 including a computing device 3902 and an interface accessible by a user to request help from a store associate, in accordance with certain embodiments of the present disclosure. In the illustrated example, the computing device 3902 may be a smartphone onto which the user has downloaded an application corresponding to the store brand. The computing device 3902 includes a touchscreen 3904 that provides both display and input features. The computing device 3902 is executing the store brand application, which causes a processor of the computing device 3902 to present an interface 3906 including user-selectable elements, such as a button 3908. The button 3908 is labeled "Need Help" and, when selected, may cause the store brand application to access the location data associated with the computing device 3902. In the illustrated example, the request for access causes the operating system of the computing device 3902 to present a popup window 3910 indicating that the application has requested access to the location data. If the user selects the "OK" button, the store brand application may determine the user's location to identify which store the user is in.

In an example, the user may utilize the store brand application to send an in-store "Need Help" alert, which may cause the HR system 106 to send an alert, such as a "paging" query, to available associates. In some embodiments, depending on the granularity of the location data determined from the user's computing device 3902, the HR system 106 may direct the alert (page) to employees assigned to the particular department where the user is located.

An associate may claim the contact, such as by pressing a button on his or her communication badge device 102 (such as button 1012 on the communication badge device 1000 in FIG. 10A), which would then cause the employee management system to respond to the customer by sending a name and photo of the associate who is on the way to help to the store brand application on the computing device 3902. In some instances, this name/picture response may provide the customer with the feeling of a more immediate response. Moreover, by allowing the employee to claim the contact, the request/page/response interaction supports metrics around associate engagement, including velocity, activity intensity, audio interactions, resolution of the query, and so on.

In some embodiments, the store brand application may include a brief survey requesting that the customer rate the experience, and the survey response data may be used to inform the activity data associated with the employee, thereby providing both quantitative and qualitative interaction metrics for the particular employee. In some embodiments, survey responses can be curated and queued for view on an associate sign in display 310 in FIG. 3. In some embodiments, communication badge device 102 can include a display that can provide a response dashboard for such feedback. Other embodiments are also possible.

It should be appreciated that, in some embodiments, the user location and activity may be collected and monitored in real time. In other embodiments, the user location and activity data may be processed at the end of a shift.

In the context of gamification of the employee's activities (i.e., incentivizing users to perform at a high level), real-time monitoring may be unsuccessful. In contrast, post shift analysis of employee activity may be used to encourage greater activity and enhanced activity intensity, which can then be commented upon in order to encourage the employee to keep up the good work. Real-time monitoring versus post shift processing may be determined based on the implementation. Other embodiments are also possible.

Figure 40:
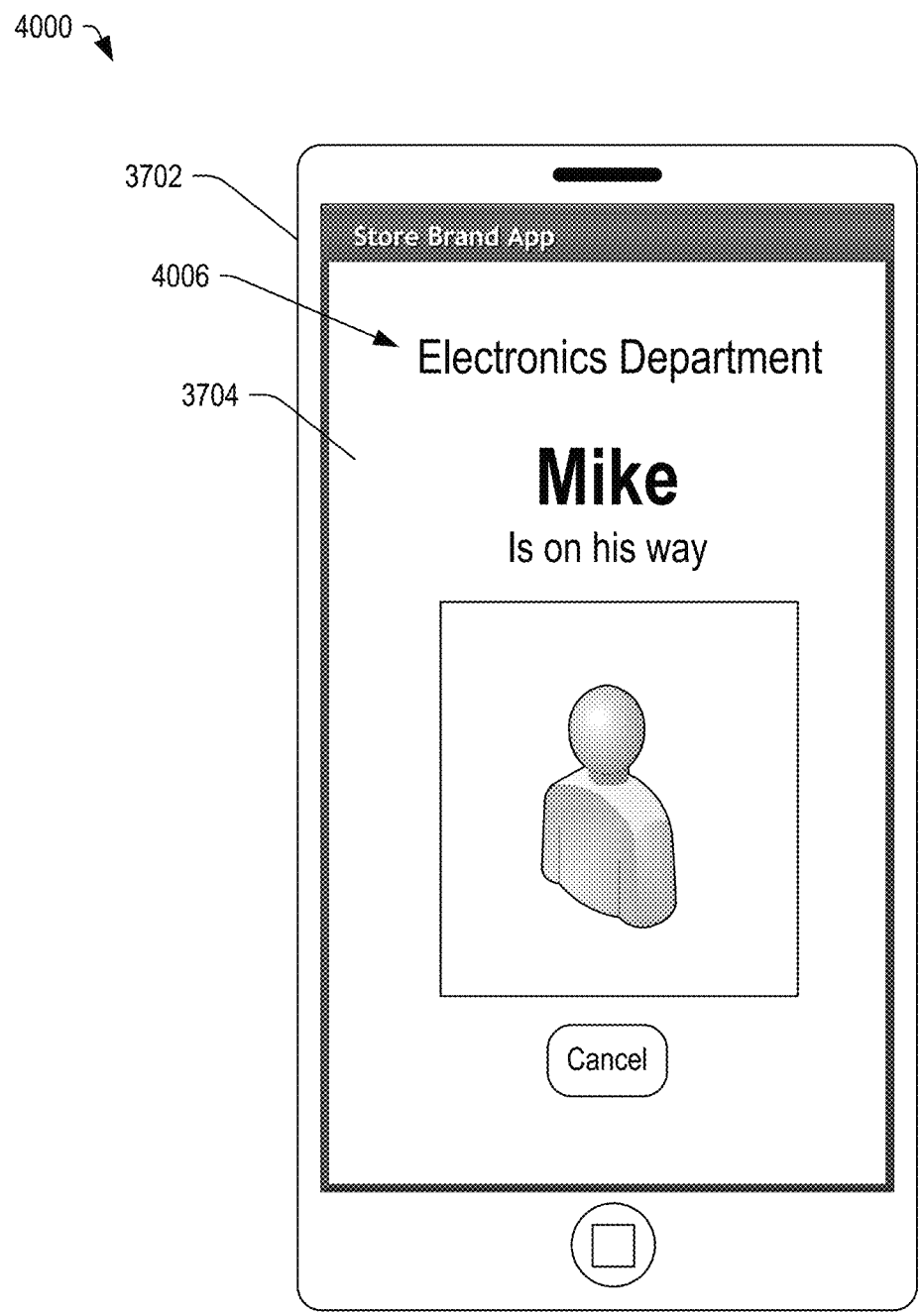
FIG. 40 depicts the system and the computing device of FIG. 39 executing the store brand application including an interface showing a name and picture of a store associate who is on his way to help, in accordance with certain embodiments of the present disclosure.

FIG. 40 depicts a view 4000 of the system and the computing device of FIG. 39 executing the store brand application including a name and picture of a store associate who is on his way to help (as generally indicated at 4006), in accordance with certain embodiments of the present disclosure. The user interface provided by the store brand application may allow the user to cancel the request via a user-selectable "Cancel" button or via a selectable link or tab. After the employee assists the customer or after a period of time has elapsed, the store brand application may present a survey to the customer as shown in FIG. 41.

Figure 41:
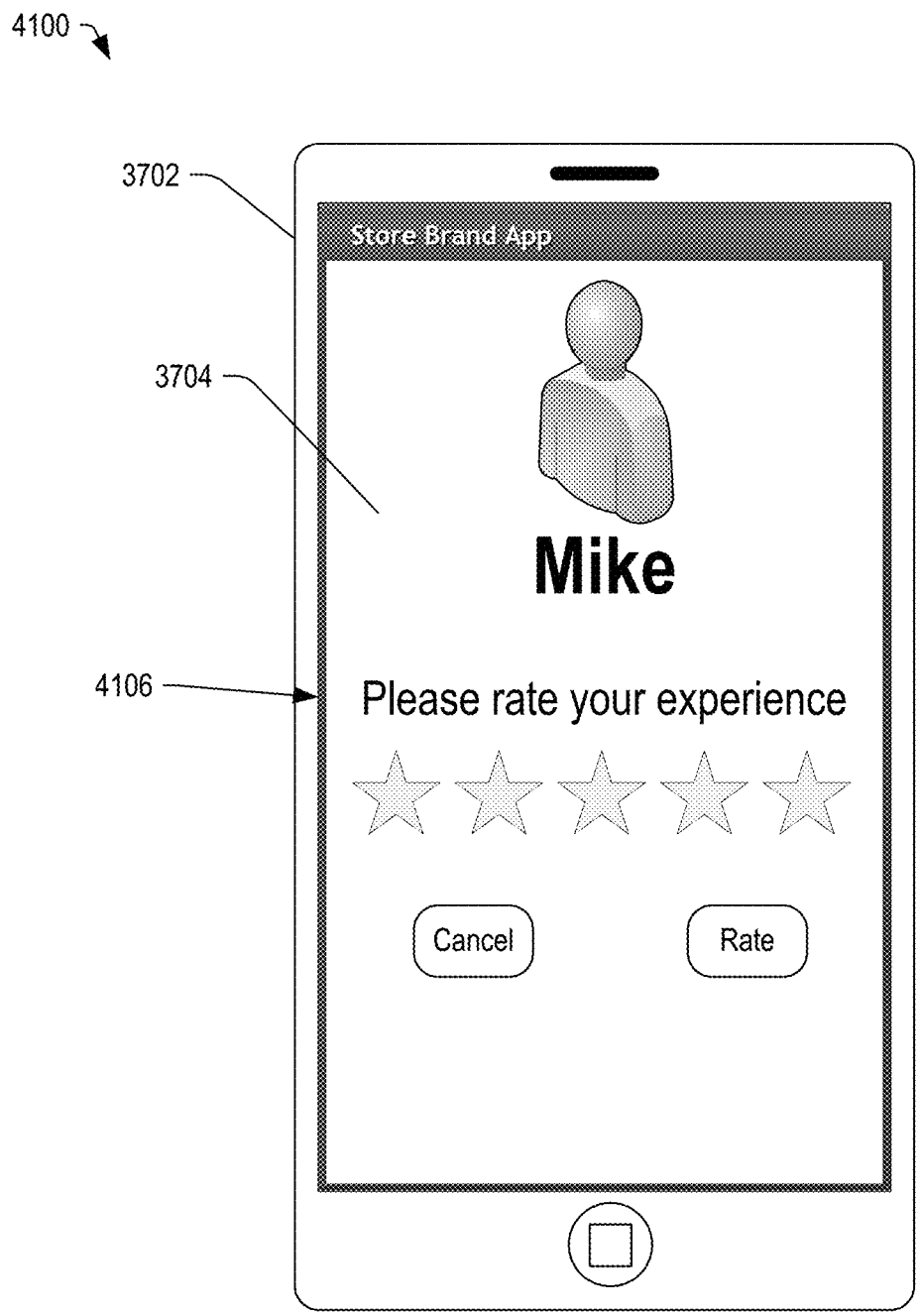
FIG. 41 depicts the system and the computing device of FIG. 39 executing the store brand application including an interface providing an opportunity to provide feedback relating to the assistance provided by the associate, in accordance with certain embodiments of the present disclosure.

FIG. 41 depicts a view 4100 of the system and the computing device of FIG. 39 executing the store brand application including an opportunity to provide feedback relating to the assistance provided by the associate (as generally indicated at 4106), in accordance with certain embodiments of the present disclosure. The store brand application may show a picture of the employee, provide the employee's name, and ask one or more survey questions about the user's interaction with the employee. In the illustrated example, the interface requests that the user rate his or her experience on a scale of one to five stars. Other embodiments are also possible.

In some examples, the customer survey feedback may be used to inform the objective measurements captured by the communication badge device 102. Further, some data related to such survey information may be communicated to the employee (via the interface 310 on the base unit 108 or via another interface accessible via a computing device, such as a smartphone, a tablet computer, a laptop computer, or another computing device. Such data may be configured to encourage the employee to improve his or her performance, and may contribute to improving the employee's overall morale.

Figure 42:
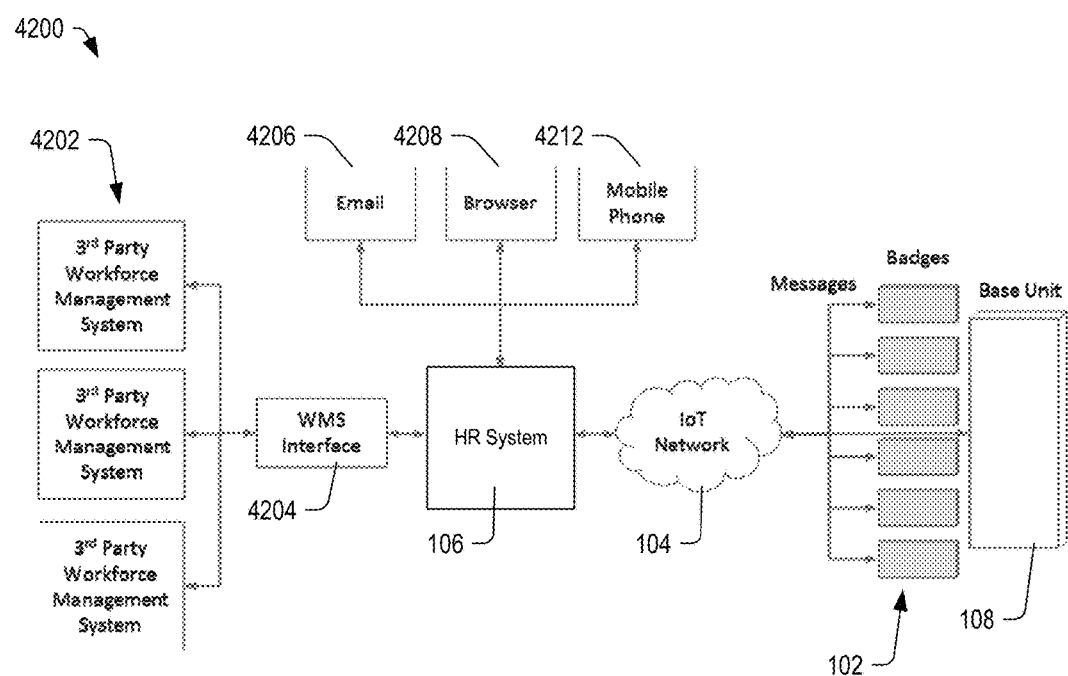
FIG. 42 depicts a system including an employee management system, a base unit, wearable elements, and third party systems, in accordance with certain embodiments of the present disclosure.

FIG. 42 depicts a system 4200 including a communication badge device 102, an HR system 106, a base unit 108, and third party systems 4202, in accordance with certain embodiments of the present disclosure. In some embodiments, the third party systems 4202 may include enterprise systems such as scheduling systems, human resources management systems, and the like. The third party system 4202 may communicate with the HR system 106 through a workforce management system interface 4204, which may be part of the HR system 106, a plugin or add-on to the third party systems 4202, an intermediary system, or any combination thereof.

The workforce management system interface 4204 may communicate data between the third party systems 4202 and the HR system 106. The HR system 106 may communicate with a plurality of communication badge devices 102 and with the base unit 108 through the network 104. Further, the HR system 106 may communicate with email systems 4206, Internet browser applications 4208, and mobile phone devices 4212 (such as smartphones).

In some embodiments, the base unit 108 may store and charge the communication badge devices 102 (when not in use). The base unit 108 may perform employee authentication when the communication badge device 102 is assigned to an employee. The base unit 108 may also send and receive messages associated with a communication badge device 102 and download messages that were created and queued while the communication badge device 102 was checked out. The base unit 108 may replace existing employee timer clocks. Further, the base unit 108 may communicate with other devices through the network 104. In some embodiments, the messages may include firmware or software upgrades for the base unit 108, for the communication badge devices 102, or any combination thereof. In some embodiments, the messages may be sent in response to pre-defined events triggered by sensors within the communication badge devices 102, and may be sent to the communication badge devices 102 by the HR system 106.

In some embodiments, the communication badge devices 102 create a message when the communication badge devices 102 is removed from or returned to the base unit 108. The communication badge device 102 may send and receive messages through the network 104 or via the base unit 108. Further, the communication badge device 102 may queue messages when the communication badge device 102 is out of range of a RF signal source 112 of the network 104. Further, the communication badge devices 102 may communicate with the base unit 108, with the HR system 106, or any combination thereof through the network 104.

The system 4200 allows for different protocols and different data formats to be handled in one interface, ensuring accurate data streaming and interaction with all devices. Further, the base unit 108, the HR system 106, or both may provide device management to ensure that the devices (e.g., computing devices, base unit 108, the communication badge devices 102, or any combination thereof) are working properly, seamlessly running patches and updates for software and applications running on the devices or on edge gateways. Further, the HR system 106 may include a database of data received from the communication badge devices 102. Further, the HR system 106 can perform a range of complex analysis from basic data clustering and deep machine learning to predictive analytics based on data from the sensors on the wearable elements. Additionally, the HR system 106 may utilize external interfaces to integrate with third-party systems and the rest of the wider information technology ecosystem via built-in application programming interfaces (APIs), software development kits (SDKs), gateways, or any combination thereof.

In some embodiments, the HR system 106 provides integration with third party management systems 4202. Further, the HR system 106 can enable a multi-tenant architecture that allows multiple management systems 4202 to communicate with different employees at the same location (or different locations). The HR system 106 enables sending messages to and receiving messages from the communication badge devices 102, which messages may include email messages, text messages, audio messages, or any combination thereof.

In some embodiments, the HR system 106 may be configured to generate a dashboard from notifications, to provide scheduled reports via email or text or both, and to maintain an audit trail of any changes made by employees. Further, the HR system 106 may authenticate users and may control user changes based on permission settings for creating, updating, or deleting information. Further, the HR system 106 may provide a web-based interface that can be accessed by an Internet browser application 4008 to view data and analytics. Further, the HR system 106 may restrict data access such that the user only has access to data for the employees in their organization. To the extent that the employee is accessing the data for his or herself, the HR system 106 may restrict data access to the data collected for that employee and optionally a leaderboard or other feature to allow the user to compare his or her performance to others or to a group.

In some embodiments, the HR system 106 may provide time-based filtering, analysis and set association among differing waveform data from the communication badge devices 102 to derive discrete and amalgamated scoring by employee, job type, activity type, time period and location, or any combination thereof. Further, the HR system 106 may allow an operator to define policies and may enforce such policies. For example, an operator may create a policy defining a condition using message processing. When that condition is met, the HR system 106 may generate a notification. For example, a policy could define a "late" threshold indicating that employees should not be more than ten minutes late to clock in for their shift. If the employee is more than ten minutes late, the HR system 106 may generate a notification, which may be sent to the employee, to a manager, or both. In some embodiments, such policies can include multiple parameters as input to determine if the policy's condition has been met. In some embodiments, each policy may have a value that can be used to calculate an employee's work score in the reward hierarchy. The notifications can be associated with a policy, an employee, a shift, or any combination thereof. The reward hierarchy corresponds to a pre-defined set of levels used to determine an employee's reward level. For example, an aggregate notification policy value may have a range of 1-100, which corresponds to a Bronze Reward Level; a range of 101-200, which corresponds to a Silver Reward Level; a range of 201-300, which corresponds to a Gold Reward Level; and a range of 301-400, which corresponds to a Platinum Reward Level.

In some embodiments, the HR system 106 may allow the permissions to be configured. Further, the HR system 106 may provide a plurality of pre-defined reports, and may also allow for new reports to be added to the system. Additionally, third party reporting or charting tools may be used or can be added for use.

In some embodiments, the workforce management system interface 4204 may push and pull data from multiple third party system 4202. In some embodiments, each third-party system 4202 may provide an eXtensible-Markup Language (XML) or other structured interface to pull employee and shift data and to push clock in and clock out data.

In general, the system 4200 makes it possible for managers, employees, and HR professionals to communicate seamlessly to provide superior customer service, using electronic communication badge devices and computing devices. Interactions can include messages, alerts, social media interactions, and the like. Further, the interfaces allow a manager to generate and provide incentives that might be pushed to communication badge devices 102 to incentivize a desired behavior.

Figure 43:
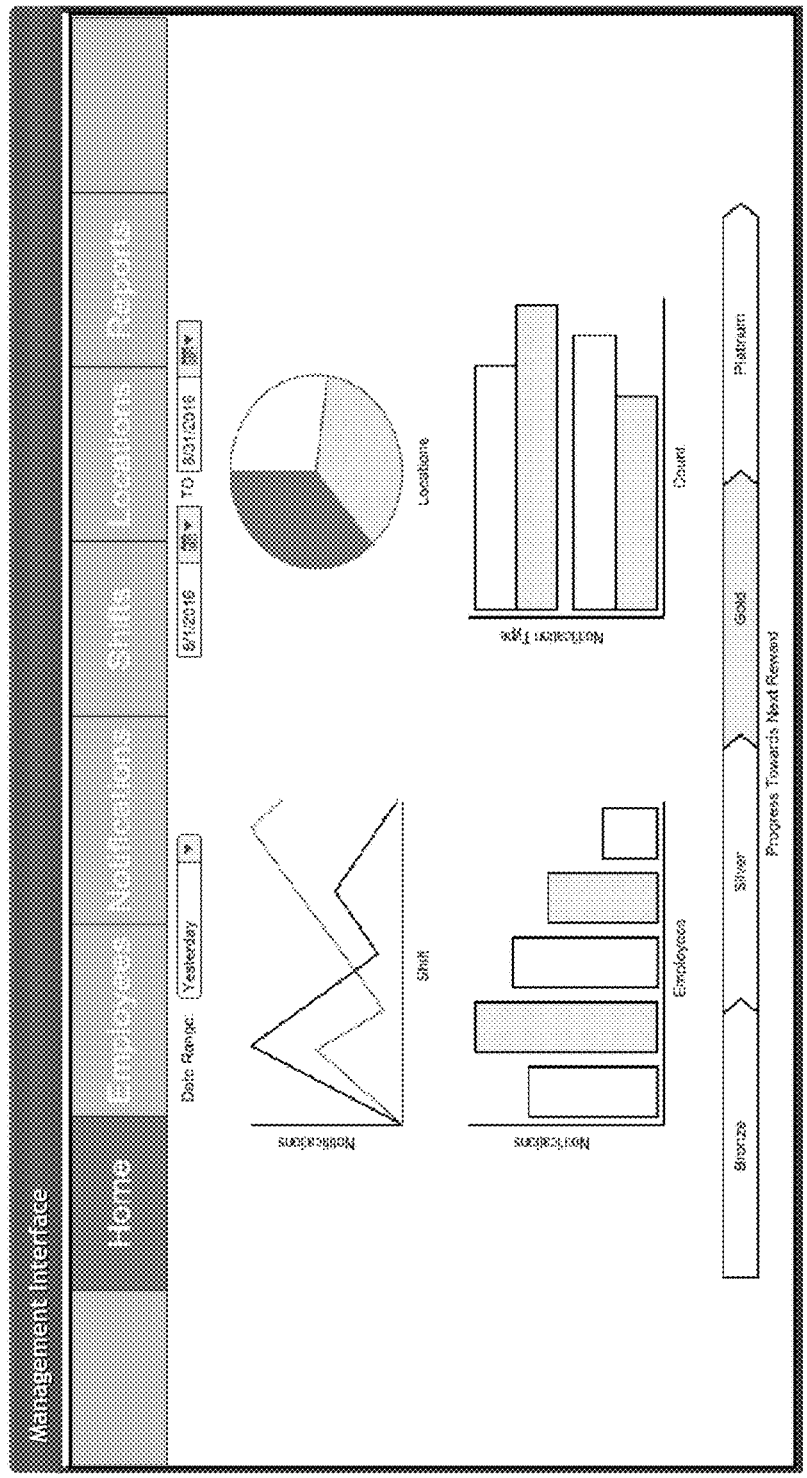
FIG. 43 depicts a home page of a management interface including data determined from a plurality of wearable elements, in accordance with certain embodiments of the present disclosure.

FIG. 43 depicts a home page 4300 of a management interface including data determined from a plurality of wearable elements, in accordance with certain embodiments of the present disclosure. The home page 4300 may be accessed by a manager or supervisor to review an overview for how the employees of the person logged in are performing as well as showing the user's progress toward the next level of reward. The user may utilize a data range control (user selectable elements, such as pull-down menus, text fields, and the like) to review data over a selected range, causing the dashboard to update.

Figure 44:
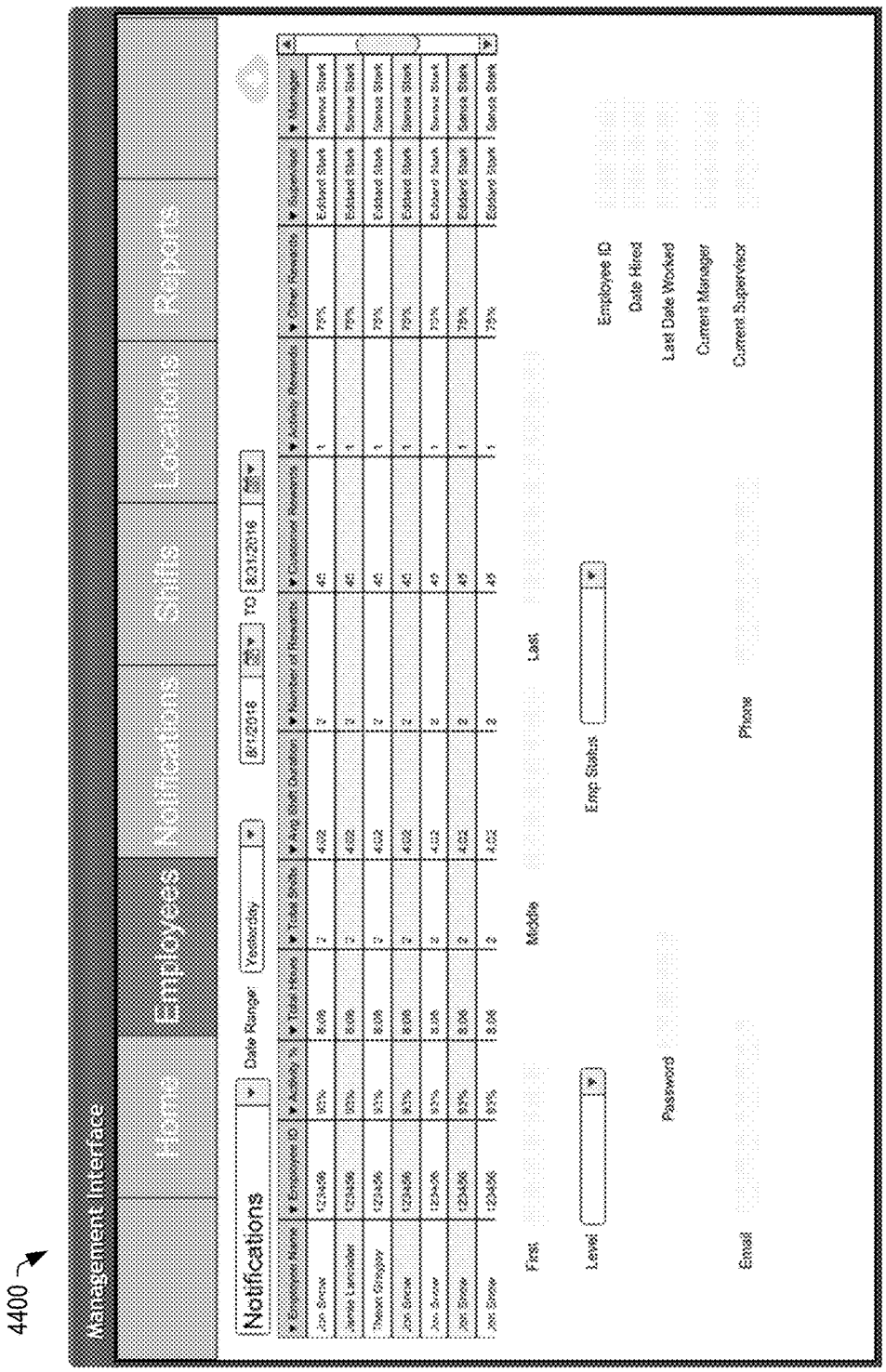
FIG. 44 depicts an employee page of the management interface of FIG. 43, in accordance with certain embodiments of the present disclosure.

FIG. 44 depicts an employee page 4400 of the management interface of FIG. 43, in accordance with certain embodiments of the present disclosure. The employee page provides a summary of all of the user's employees and how the employees are performing for a given data range. A user may navigate through employee data to review. While the data is presented as a table, it could alternatively be presented in an interactive chart.

The employee page 4400 includes data controls, which can be used to adjust the date range, causing the data to be updated to reflect the selected range. In an example, the employee page 4400 may include user-selectable elements, including a clickable link or pulldown that allows the user to sort the data according to one or more selected parameters.

In some embodiments, the user may select an employee from the table or chart to review data specific to the selected employee. In response to the selection, data and controls within the detail pane are updated to reflect the selection. In some embodiments, the "cloud" shaped icon may be accessed to download the current grid in a spreadsheet format. Further, the "Notifications" dropdown menu may be accessed to perform an "Employee Search" and to access other options. Further, when an employee is selected from the table, the interface advances to the "Employees" tab.

Figure 45:
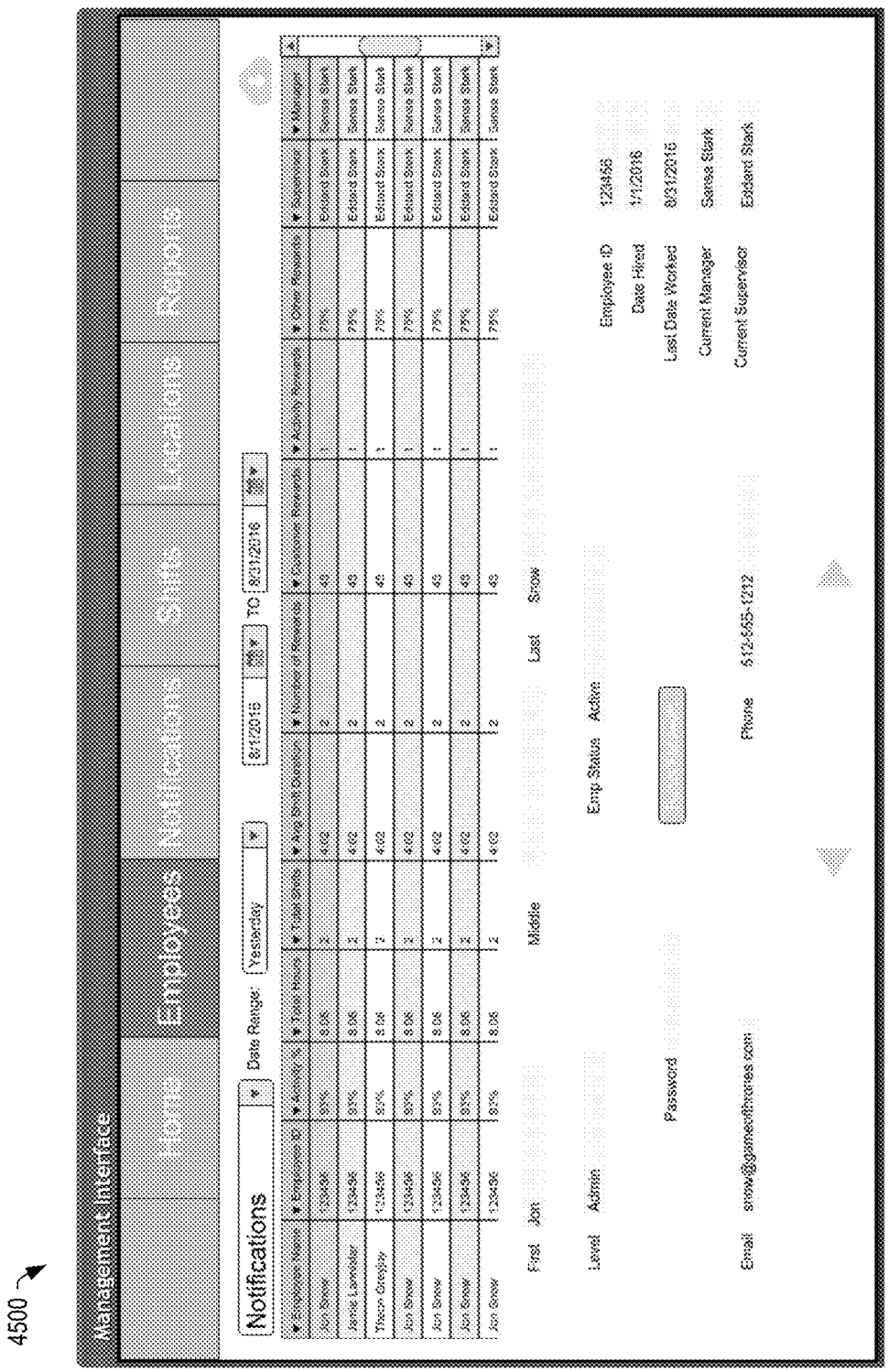
FIG. 45 depicts an employee page of the management interface of FIG. 43 with an employee selected, in accordance with certain embodiments of the present disclosure.

FIG. 45 depicts an employee page 4500 of the management interface of FIG. 41 with an employee selected, in accordance with certain embodiments of the present disclosure. The employee page 4500 allows the user to navigate through a grid or chart of employee data and select a row. The employee page 4500 may then present data corresponding to the selected row. Further, the employee page 4500 can be used to reset a password, to adjust date controls, to sort columns in the grid, and so on. Once selected, the employee's data is displayed in the detail pane. In some examples, a password reset option is only visible when a row of the grid is selected.

Figure 46:
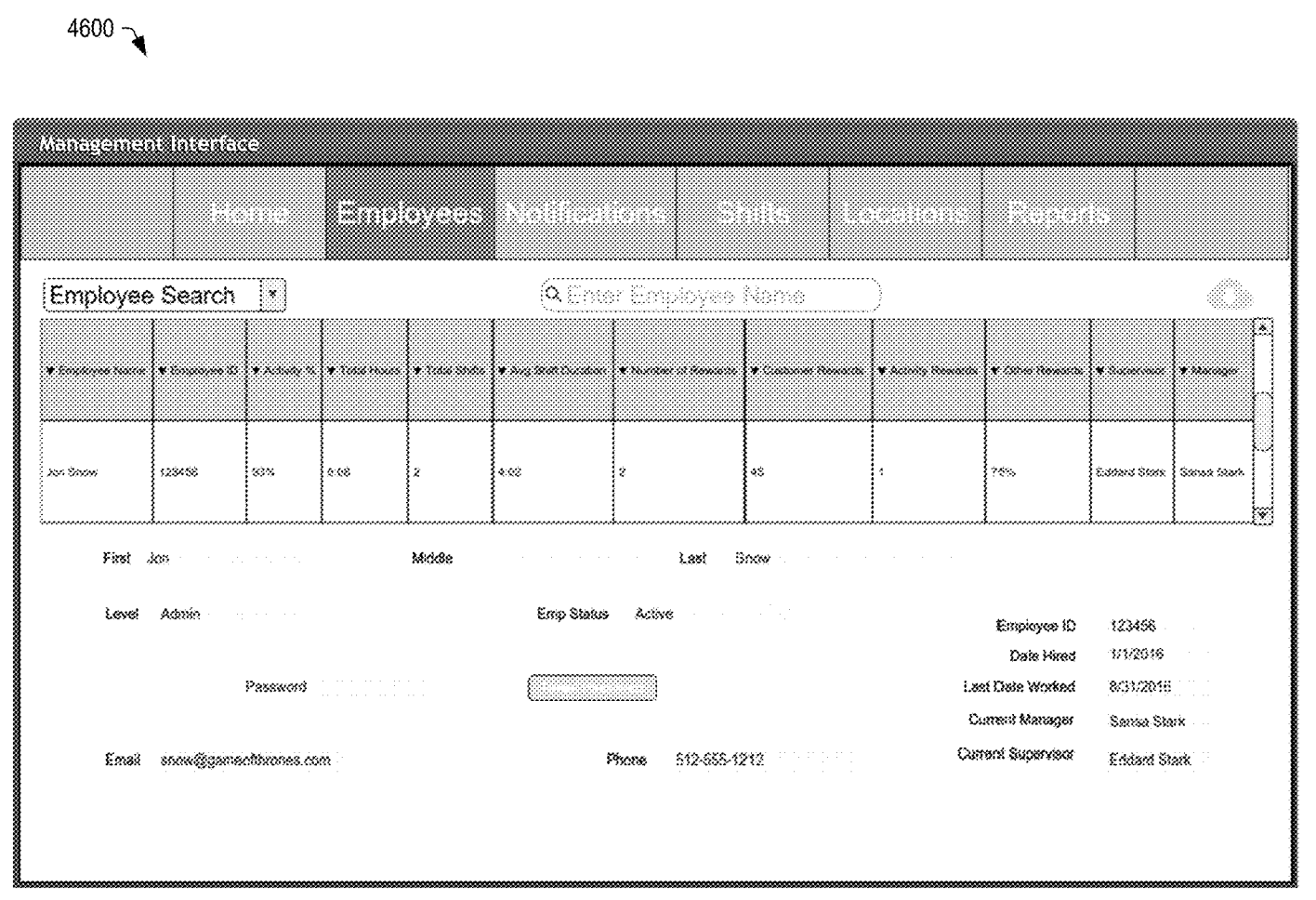

FIG. 46 depicts the employee page 4600 of the management interface of FIG. 43 including a search feature accessible through a pull-down menu, in accordance with certain embodiments of the present disclosure. The search feature allows a user to search for a specific employee and to review the details. When a name is provided, the results of the search are displayed. As previously discussed, data within the table format may be sorted and, when selected, the details may be provided within the interface.

Figure 47:
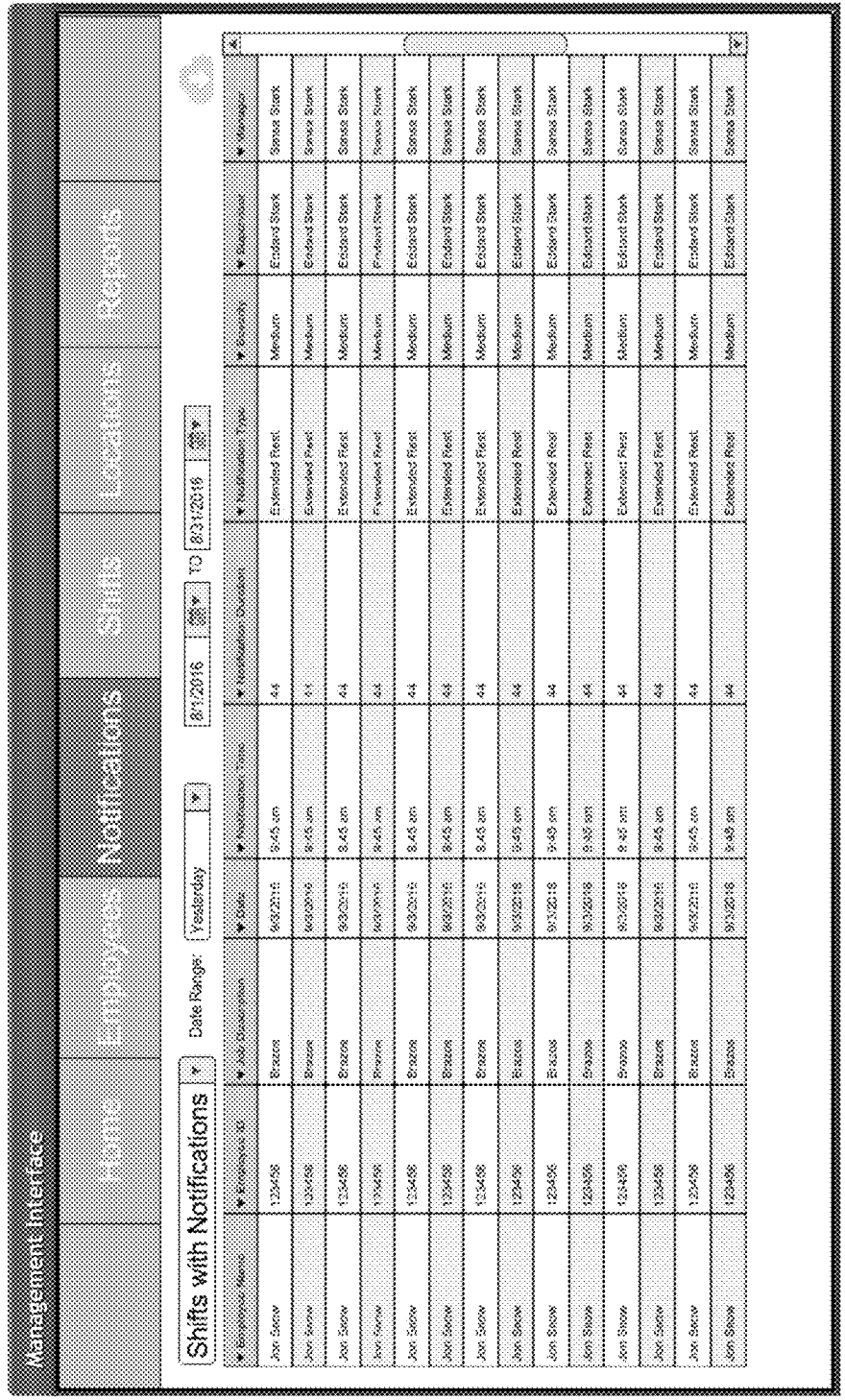
FIG. 47 depicts a notification page of the management interface of FIGS. 43-46, in accordance with certain embodiments of the present disclosure.

FIG. 47 depicts a notification page 4700 of the management interface of FIGS. 43-46, in accordance with certain embodiments of the present disclosure. The notification page 4700 allows the user to see all notifications created for a given data range for all employees. Further, the user may sort the results and may select a row to review the notification. Other embodiments are also possible.

The "Shifts with Notifications" dropdown also contains "List Policies", "Create Policy" as well as other options. When selected, the GUI navigates the user to the appropriate page under the "Notifications" tab.

Figure 48A:
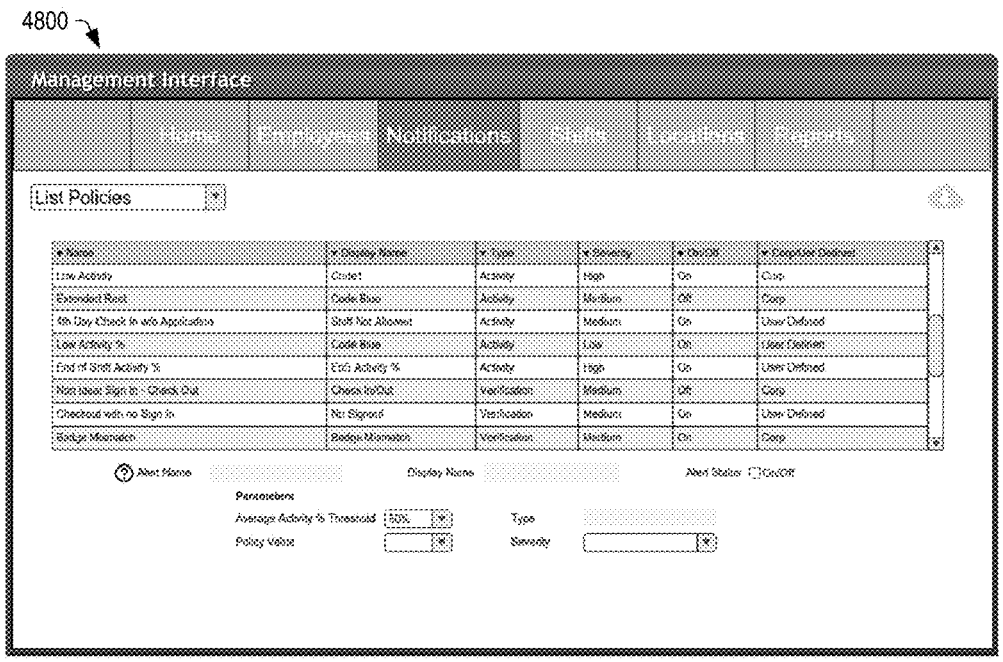
FIGS. 48A and 48B depict a policy edit page of the management interface of FIGS. 43-47 accessible via a pulldown menu in FIG. 47, in accordance with certain embodiments of the present disclosure.
Figure 48B:
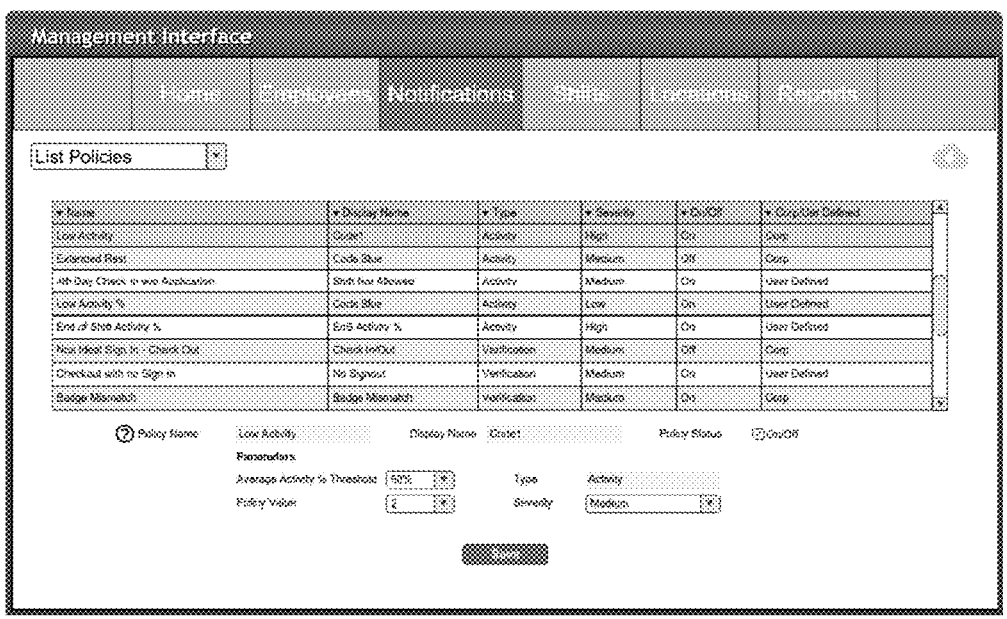

FIGS. 48A and 48B depict a policy edit page of the management interface of FIGS. 43-47 accessible via a pulldown menu in FIG. 47, in accordance with certain embodiments of the present disclosure. In FIG. 48A, a policy edit page is shown that allows the user to navigate through policy data, to select a row and to review detail for the selected row. Other embodiments are also possible.

In FIG. 48B, in response to selection of a policy, the policy data is shown. The user may edit the selected policy and then save changes. In some embodiments, when the save button is selected, a popup may request confirmation before implementing any changes.

Figure 49A:
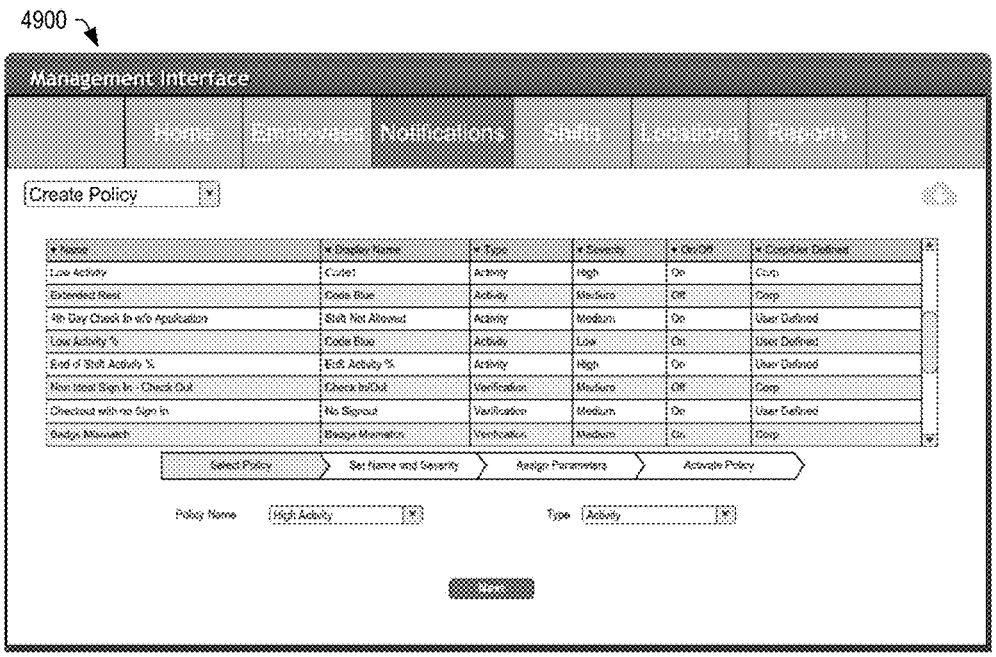
FIGS. 49A and 49B depict a create policy wizard of the management interface of FIGS. 43-48B, in accordance with certain embodiments of the present disclosure.
Figure 49B:
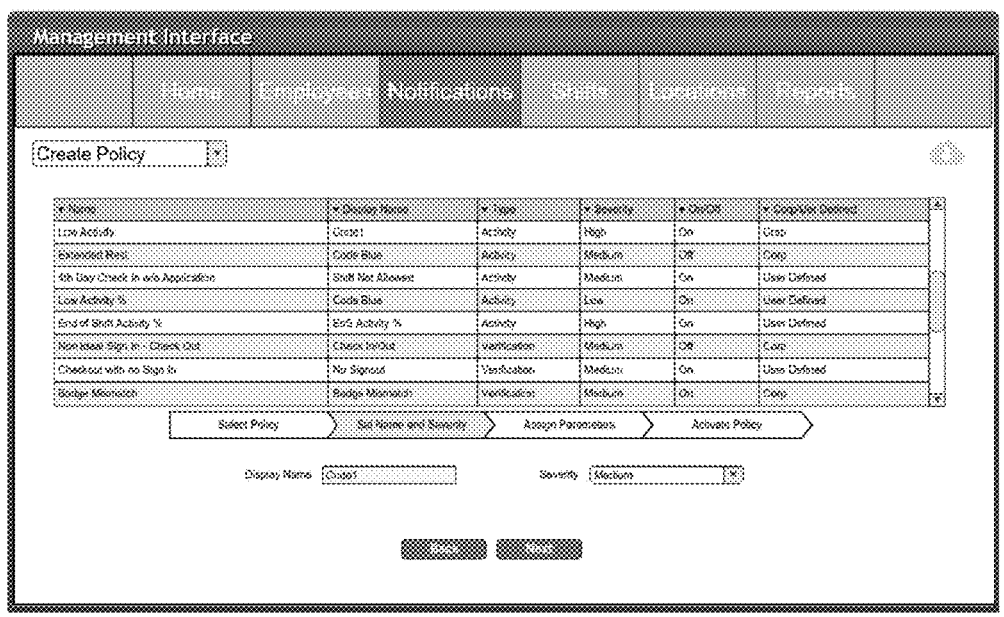

FIGS. 49A and 49B depict a create policy wizard of the management interface of FIGS. 43-48B, in accordance with certain embodiments of the present disclosure. In FIG. 49A, the user may use the wizard to direct the creation of a new policy. The policy name drop down menu may be populated with a list of policies of a type identified in the Type dropdown menu. The type dropdown menu may include a plurality of types of policies. The policy name dropdown menu may be repopulated with policy names of the type selected in the type dropdown menu when the type dropdown menu selection changes. Clicking the "Next" button takes the user to the next step in the Policy Creation wizard.

In FIG. 49B, the next page of the wizard is depicted, which allows the user to name the new policy and to assign a severity level.

Figure 50A:
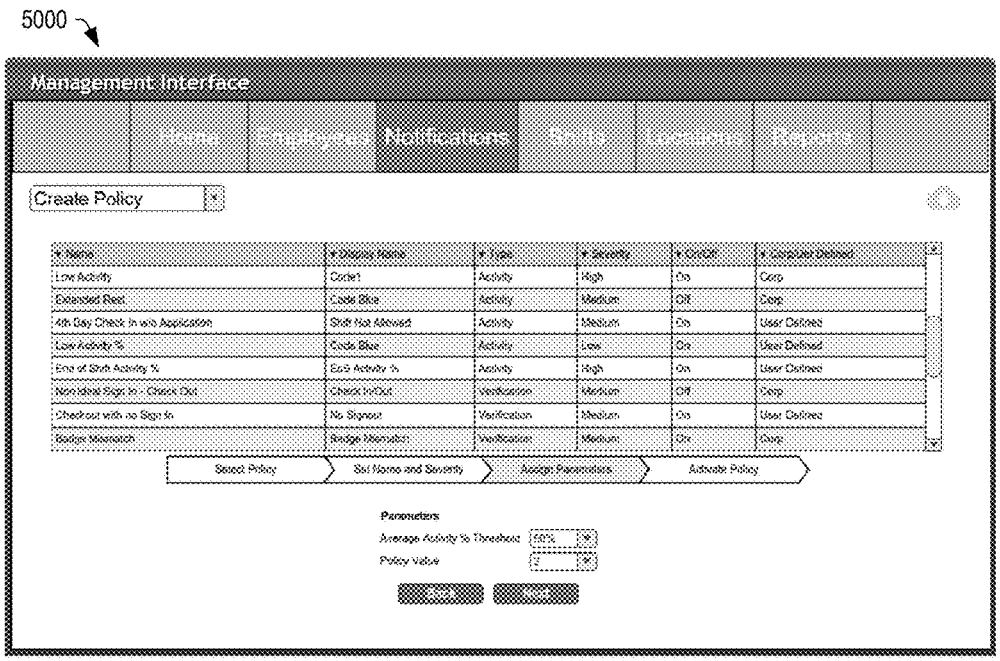
FIGS. 50A and 50B depict a create policy wizard of the management interface of FIGS. 43-49B, in accordance with certain embodiments of the present disclosure.
Figure 50B:
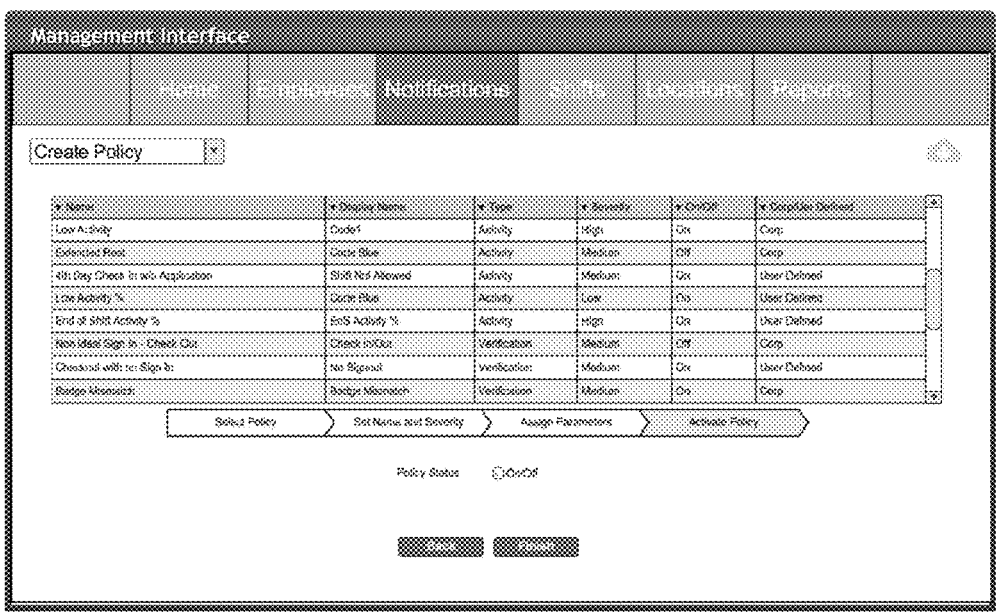

FIGS. 50A and 50B depict a create policy wizard of the management interface of FIGS. 43-49B, in accordance with certain embodiments of the present disclosure. In FIG. 50A, the user may interact with the policy wizard to assign parameters, such as an activity threshold percentage, a policy value, and so on.

In FIG. 50B, the user may interact with the policy wizard to activate or deactivate the policy. Other embodiments are also possible.

Figure 51A:
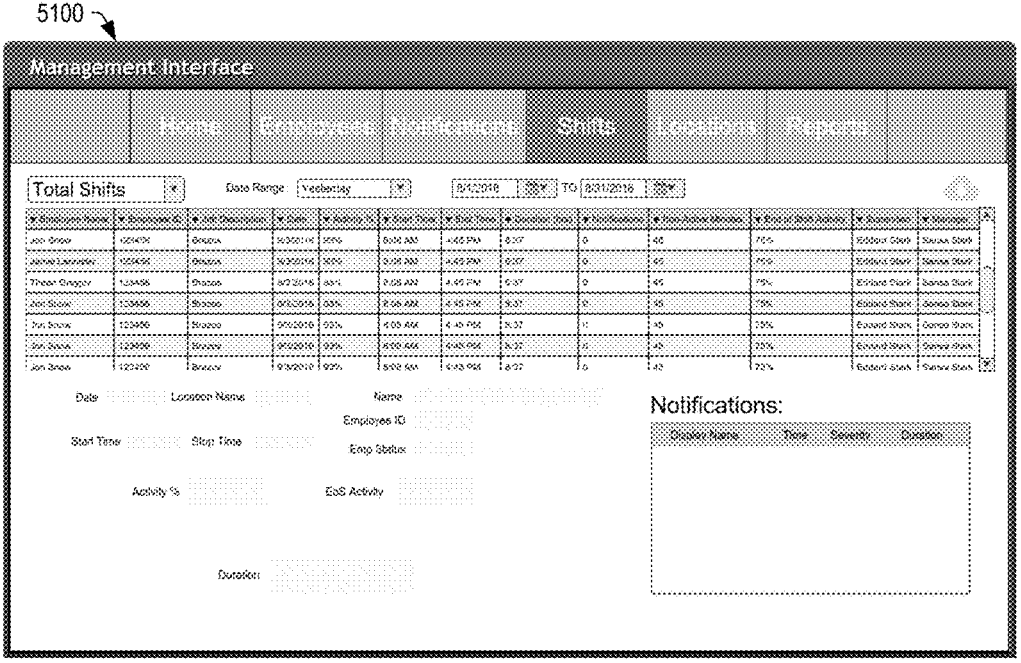
FIGS. 51A and 51B depict shifts pages of the management interface of FIGS. 43-50B, in accordance with certain embodiments of the present disclosure.
Figure 51B:
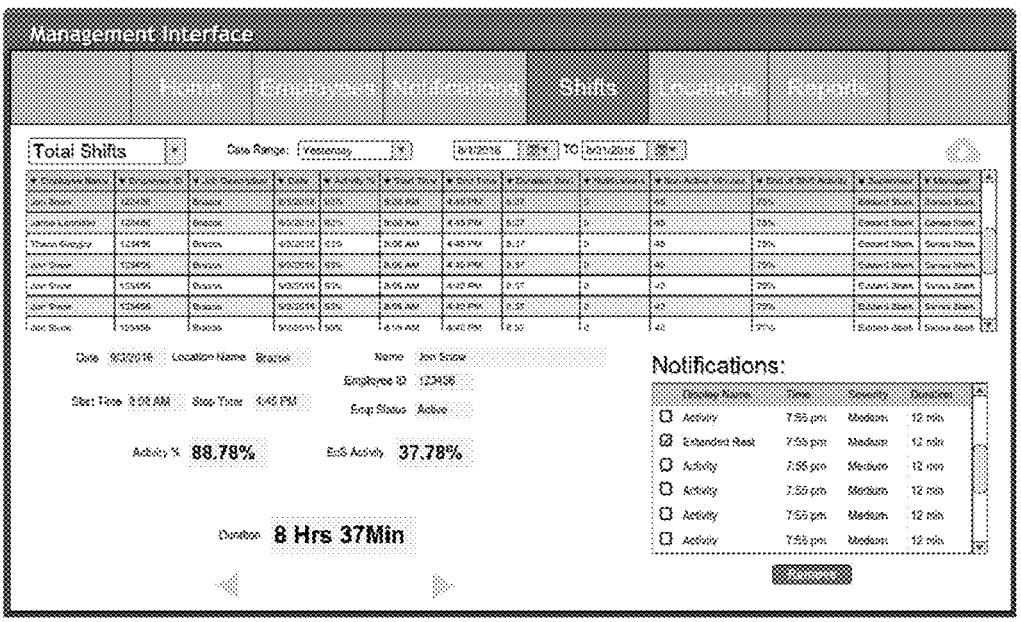

FIGS. 51A and 51B depict shifts pages of the management interface of FIGS. 43-50B, in accordance with certain embodiments of the present disclosure. In FIG. 51A, the user may review all shifts of his or her employees for a selected data range. The user may sort the grid and may select a row, causing the interface 4900 to show details for the selected user. The "Total Shifts" dropdown may include other shift-related options.

In FIG. 51B, the interface 5110 is shown, which includes information about the selected shift, including an activity percentage, a start time, and end time, and other information. Further, a list of notification is shown, which can be selected and optionally removed. If the "Remove" button is selected, a popup may be presented to confirm removal. In some instances, approval from human resources, from payroll, or from another supervisor may be required to confirm such a change. Other embodiments are also possible.

Figure 52:
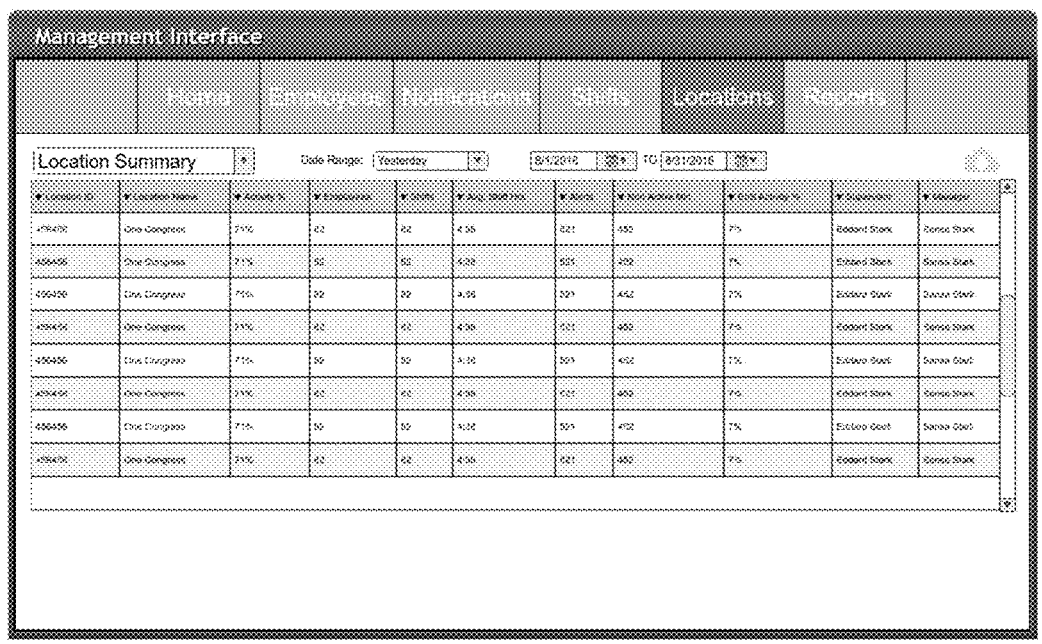
FIG. 52 depicts a location page of the management interface of FIGS. 41-49B, in accordance with certain embodiments of the present disclosure.

FIG. 52 depicts a location page 5200 of the management interface of FIGS. 43-51B, in accordance with certain embodiments of the present disclosure. The user may view all locations for a particular company and may update, sort, add, and delete locations. Further, through the location page, the user may access the "Location Summary" dropdown menu to access a "List of Base Units" and other options.

Figure 53A:
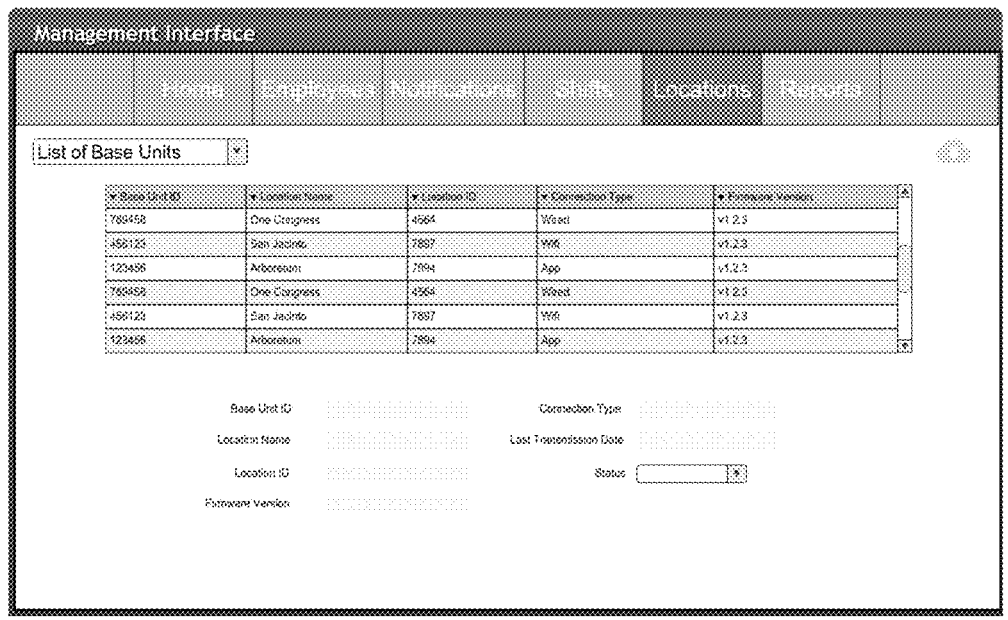
FIGS. 53A-53B depict base unit configuration pages of the management interface of FIGS. 43-52, in accordance with certain embodiments of the present disclosure.
Figure 53B:
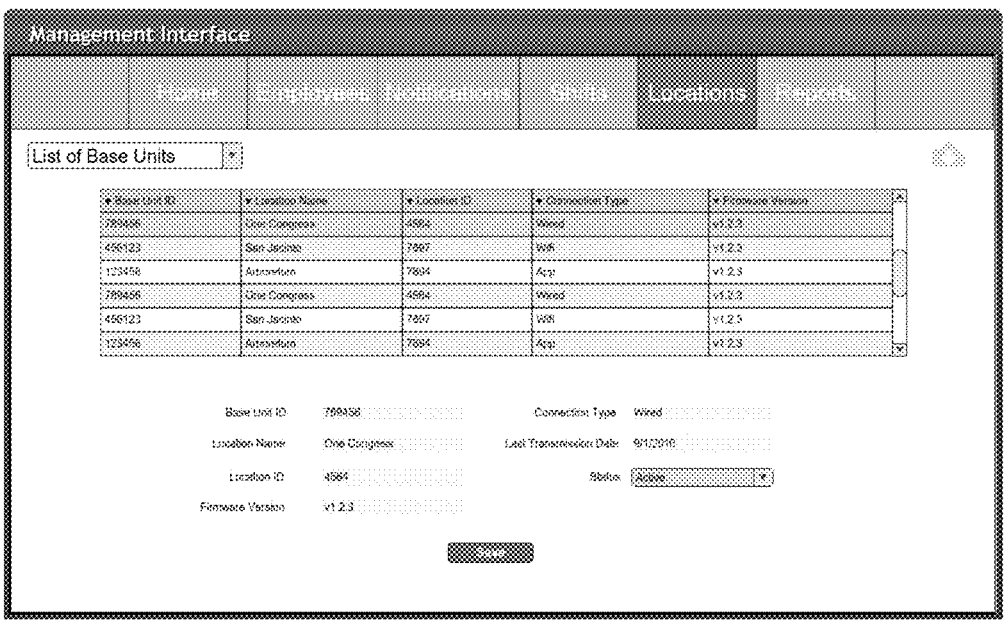

FIGS. 53A-53B depict base unit configuration pages of the management interface of FIGS. 43-52, in accordance with certain embodiments of the present disclosure. In FIG. 53A, the base unit page 5300 can be accessed by a user to view all active base units. When a particular row is selected, details for the selected base unit are shown. The "List of Base Units" dropdown menu also includes the "Location Summary" option, as well as other options. When selected, the user is navigated to the appropriate page under the "Locations" tab.

In FIG. 53B, the interface 5310 depicts details for a selected base unit. Only the location name and status may be edited. When a change is made, a "Save" button appears and, if selected, a confirmation popup window is presented.

Figure 54A:
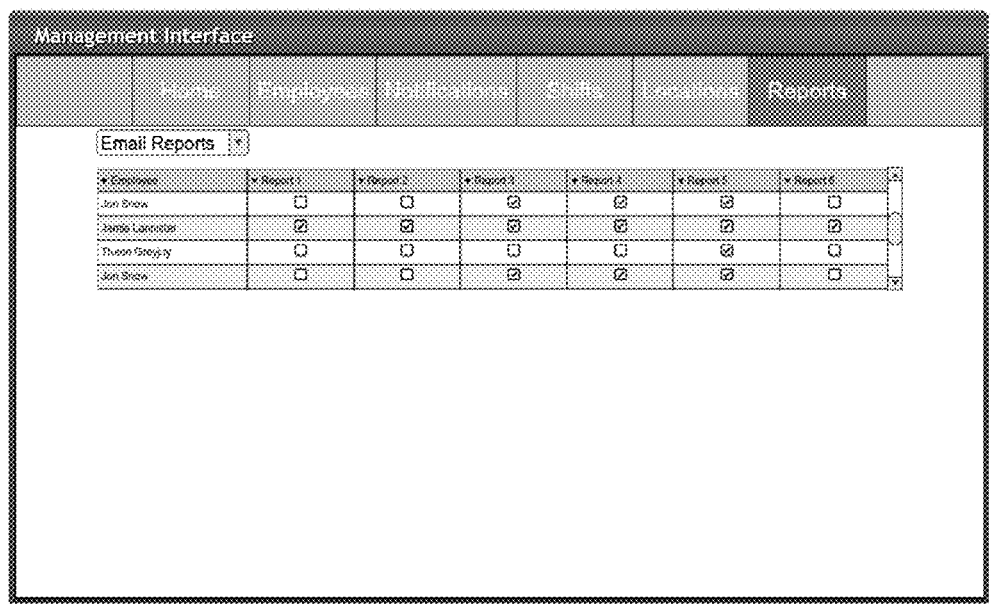
FIGS. 54A-54B depict email reports pages of the management interface of FIGS. 43-53B, in accordance with certain embodiments of the present disclosure.
Figure 54B:
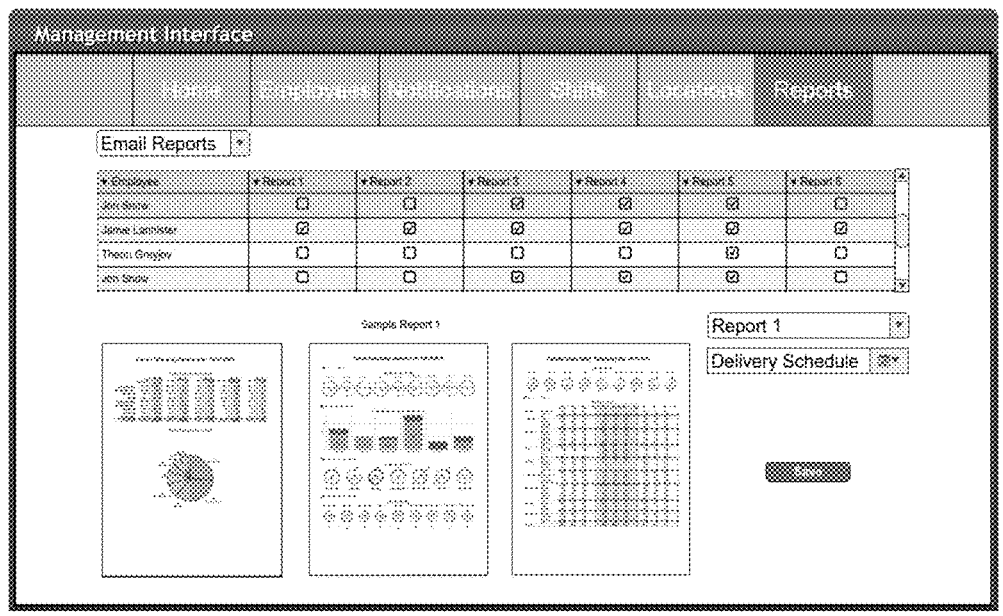

FIGS. 54A-54B depict email reports pages of the management interface of FIGS. 43-53B, in accordance with certain embodiments of the present disclosure. In FIG. 54A, the interface 5400 allows a user to view a list of employees and a list of reports to be emailed to the various employees. The user may select or deselect a checkbox to change the email reporting. Further, the "Email Reports" pulldown menu may be accessed to view "Text Reports" and other options. When selected, the user is navigated to the appropriate page under the "Reports" tab.

In FIG. 54B, the interface 5410 depicts a "Report 1" dropdown menu that, when selected, displays thumbnail images of sample reports corresponding to the selected report. Further, the interface 5410 includes a pulldown menu to schedule delivery for the emailed reports. The save button appears when a change is made and, if selected, causes a popup to appear to confirm the change.

Figure 55A:
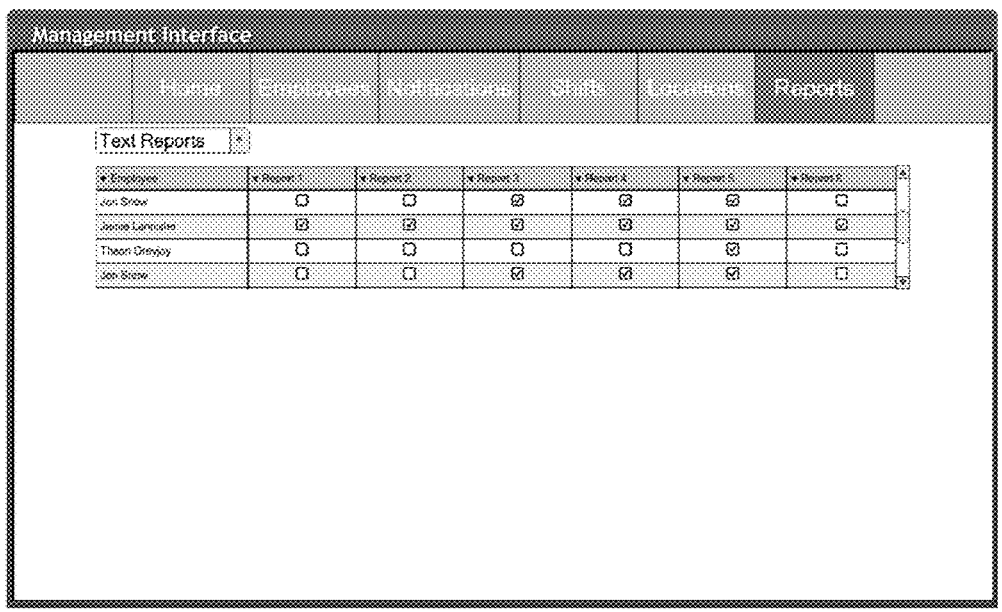
FIGS. 55A-55B depict text reports pages of the management interface of FIGS. 43-54B, in accordance with certain embodiments of the present disclosure.
Figure 55B:
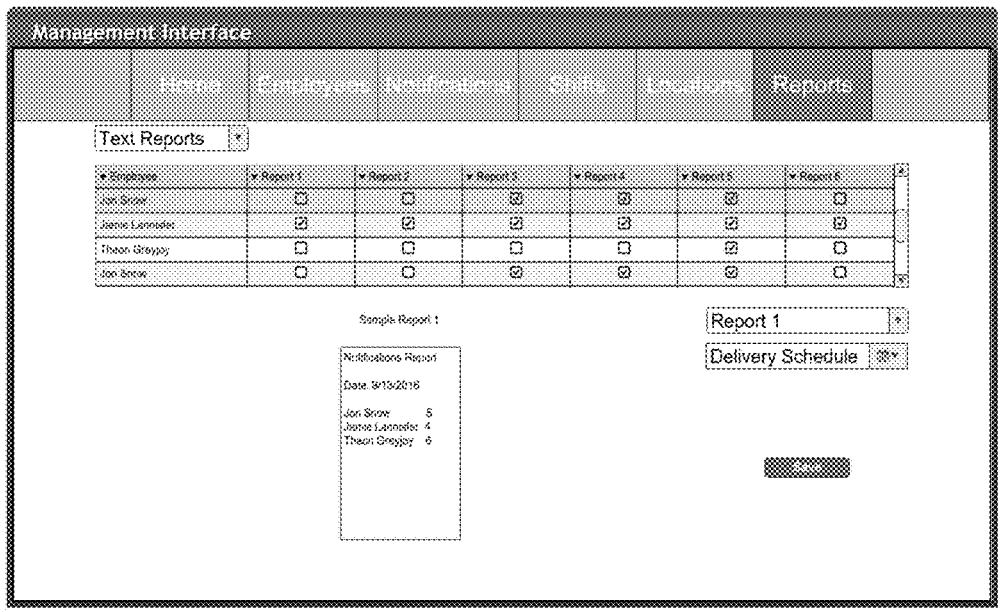

FIGS. 55A-55B depict text reports pages of the management interface of FIGS. 43-54B, in accordance with certain embodiments of the present disclosure. In FIG. 55A, the interface 5500 depicts the text reports to be sent to particular users and provides a table through which such reports may be changed by selecting or deselecting check boxes. Further, if a row is selected, the interface 5500 depicts the details (as shown in FIG. 55B).

In FIG. 55B, the interface 5510 depicts a "Report 1" dropdown menu and a thumbnail image of the selected report. Further, the interface 5510 provides a "Delivery Schedule" pulldown menu for adjusting the delivery schedule. If changes are made, a "Save" button appears and, in response to selection, a popup menu is provided to confirm the changes. Other embodiments are also possible.

The methods, circuits, circuits, elements, and devices described above with respect to FIGS. 1-55B are illustrative only and are not intended to be limiting. Further, the processes, machines, and manufactures (and improvements thereof) described herein are particularly useful improvements for activity sensing devices and computers configured to determine actions from patterns of movements, sounds, or both. Any device, such as a smartphone or smart badge, could collect data and then allow (such as via an application programming interface "API") the software and functions described herein to extract the data and perform calculations, comparisons, and analytics based on the collected data. In some embodiments, the systems, methods, circuits, and devices may include determine a start time and an end time and determine activity associated with the user. Such determination of activity can include determination of an intensity of activity during the period of time between the start and end times. Further, the systems, methods, circuits, and devices may determine location or position data, rest/inactivity times, other data, or any combination thereof. The system may process the activity data, the start time and end time, the intensity data, and other data to determine a work score for the employee, which can be used to compare the employee's performance to that of other employees and to compare the employee's performance to his or her past performance. Performance improvements may be rewarded by management. Further, when an employee outperforms other employees based on the work score, the employee may earn bonuses or other rewards. In some embodiments, the system may utilize data collected from the plurality of communication badge devices and associated with a plurality of employees to allow users to compare their performance against that of other employees.

Further, the embodiments and examples herein provide improvements in the technology of motion detection and tracking systems. In addition, embodiments and examples herein provide improvements to the functioning of a computer by providing enhanced correlation of motion signals to pre-determined tasks, thereby creating a specific purpose computer by adding such technology. Thus, the improvements herein provide for technical advantages, such as providing a system in which a user's physical activity can be monitored and tracked for the purpose of determining employee efficiencies, for detecting a need for training of employees, for auditing and confirming time sheets, for detecting potentially hazardous activities, and for detecting or confirming potentially illegal activities (such as theft by maintenance personnel). For example, the system may detect extra travel to and from a location (or a period of time in which the communication badge device 102 appears to be perfectly stationary), during which time other members of the team cannot confirm the employee's whereabouts. If something is reported stolen, such data may present a red flag to potentially identify the thief, for example.

In certain embodiments, the systems and processes described herein can be particularly useful to any system or service in which motion tracking may be of value, such as in fragile package tracking, exercise training, service industries, and so on. Further, the improvements herein provide additional technical advantages, such as providing a system in which actions can be detected and monitored and in which potentially dangerous or undesired actions can be detected. In certain embodiments, the system may send an alert to a manager or other user to alert the user to the potentially dangerous or undesired actions. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
    a plurality of communication badge devices, each communication badge device including a communication device having a network transceiver and including a holding clip configured to secure the communication device to a garment of a user, each communication badge device configured to display name tag data when in a first orientation and to display a user interface when in a second orientation, the user interface including a plurality of data and at least one user-selectable element accessible by a user to request assistance; and
    a computing system configured to communicate with the plurality of communication badge devices through a network.

2. The system of claim 1, wherein the name tag data includes a name of an employee, an assigned role, and at least one of a progress indicator, an experience indicator, and an achievement indicator.

3. The computing device of claim 1, further comprising a microphone configured to determine audio data corresponding to interactions between a user and a customer.

4. The computing device of claim 1, further comprising:
    a rechargeable battery; and
    a communication interface configured to send and receive data.

5. The system of claim 1, wherein each communication badge device includes at least one sensor configured to generate a signal related to an orientation of the communication badge device.

6. The system of claim 5, wherein each communication badge device further includes a processor coupled to the at least one sensor and to the network transceiver, the processor configured to determine the orientation in response to the at least one sensor.

7. The system of claim 6, wherein the processor is further configured to determine at least one physical action performed by a user based on motion data determined from the at least one sensor.

8. The system of claim 1, wherein the user interface includes at least one user-selectable element accessible by a user to respond to at least one of a notification and a mission.

9. The system of claim 1, further comprising a base unit including:
    a first opening configured to receive the communication badge device;
    a recharger interface configured to recharge the rechargeable battery and to communicate data to and from the communication badge device via the communication interface; and
    a second opening configured to dispense the communication badge device in response to a successful authentication.

10. The system of claim 9, wherein the base unit further comprises:
    an input interface; and
    a processor coupled to the input interface and configured to receive input data corresponding to a user, the processor configured to compare the input data to stored credentials and to selectively authenticate a user when the input data match at least one of the stored credentials, the processor configured to generate a signal indicating the successful authentication in response to determining the match.

11. The system of claim 9, wherein the computing system includes a human resources system configured to communicate with the communication badge device and the base unit through the network.

12. The system of claim 10, wherein the input interface comprises at least one of a set including a touchscreen interface, a camera, and a biometric interface configured to capture the input data.

13. A system comprising:
    a plurality of communication badge devices, each communication badge device including a communication device comprising:
        a touchscreen interface;
        at least one sensor configured to generate a signal related to an orientation of the communication badge device; and
        a processor coupled to the touchscreen interface and the at least one sensor, the processor configured to determine a first mode and a second mode based on the orientation, the processor configured to provide name tag data to the touchscreen interface in the first mode and to provide a user interface to the touchscreen interface in the second mode; and
    a human resources system configured to communicate with each of the plurality of communication badge devices to receive data including activity data, progress data, location data, and timing data, the human resources system configured to provide a social media portal through which users may selectively share data.

14. The system of claim 13, wherein each communication badge device further comprises a holding clip configured to couple to the communication device and including a clip element configured to couple the holding clip to a garment of a user.

15. The system of claim 13, wherein each communication badge device further comprises at least one transceiver configured to communicate with one or more devices wirelessly.

16. The system of claim 13, wherein the user interface includes a plurality of data and at least one user-selectable element accessible by a user to respond to at least one of a notification and a mission.

17. The system of claim 13, wherein the user interface including a plurality of data and at least one user-selectable element accessible by a user to request assistance.

18. The system of claim 13, wherein the name tag data includes a name of an employee, an assigned role, and at least one of a set including a progress indicator, an experience indicator, and an achievement indicator.

19. The system of claim 13, wherein the user interface includes a plurality of data and at least one user-selectable element accessible by a user to request assistance.

* * * * *